US009542091B2

(12) United States Patent
Missig

(10) Patent No.: US 9,542,091 B2
(45) Date of Patent: Jan. 10, 2017

(54) DEVICE, METHOD, AND GRAPHICAL USER INTERFACE FOR NAVIGATING THROUGH A USER INTERFACE USING A DYNAMIC OBJECT SELECTION INDICATOR

(75) Inventor: Julian Missig, Redwood City, CA (US)

(73) Assignee: APPLE INC., Cupertino, CA (US)

( * ) Notice: Subject to any disclaimer, the term of this patent is extended or adjusted under 35 U.S.C. 154(b) by 435 days.

(21) Appl. No.: 12/794,625

(22) Filed: Jun. 4, 2010

(65) Prior Publication Data

US 2011/0302532 A1    Dec. 8, 2011

(51) Int. Cl.
*G06F 3/048* (2013.01)
*G06F 3/0488* (2013.01)
*G06F 3/041* (2006.01)

(52) U.S. Cl.
CPC ......... *G06F 3/04883* (2013.01); *G06F 3/0416* (2013.01); *G06F 3/0488* (2013.01)

(58) Field of Classification Search
USPC ............... 715/767, 764, 769, 772, 779, 802, 817,715/859, 823
See application file for complete search history.

(56) References Cited

U.S. PATENT DOCUMENTS

| | | | |
|---|---|---|---|
| 5,905,497 A | 5/1999 | Vaughan et al. | |
| 6,947,062 B2 | 9/2005 | Cuijpers et al. | |
| 6,995,746 B2 * | 2/2006 | Aymeric | 345/156 |
| 7,299,424 B2 | 11/2007 | Jarrett et al. | |
| 7,383,517 B2 | 6/2008 | Baudisch et al. | |
| 7,634,263 B2 | 12/2009 | Louch et al. | |
| 8,330,715 B2 * | 12/2012 | Yadavalli et al. | 345/157 |
| 2006/0048072 A1 * | 3/2006 | Jarrett et al. | 715/784 |
| 2007/0060228 A1 * | 3/2007 | Akasaka et al. | 463/1 |
| 2007/0067744 A1 * | 3/2007 | Lane et al. | 715/860 |
| 2008/0165141 A1 | 7/2008 | Christie | |
| 2008/0229254 A1 * | 9/2008 | Warner | 715/856 |
| 2009/0015559 A1 * | 1/2009 | Day et al. | 345/167 |
| 2009/0064047 A1 * | 3/2009 | Shim et al. | 715/835 |
| 2009/0122018 A1 * | 5/2009 | Vymenets et al. | 345/173 |
| 2009/0125824 A1 * | 5/2009 | Andrews et al. | 715/764 |

(Continued)

OTHER PUBLICATIONS

Grossman, T. et al., "The Bubble Cursor: Enhancing Target Acquisition by Dynamic Resizing of the Cursor's Activation Area," CHI '05 Proceedings of the SIGCHI Conference on Human Factors in Computing Systems, Apr. 2-7, 2005, 10 pages.

(Continued)

*Primary Examiner* — Hien Duong
(74) *Attorney, Agent, or Firm* — Morrison & Foerster LLP

(57) ABSTRACT

A device that is in communication with a display and a touch-sensitive surface sends instructions to the display for displaying at least a portion of a user interface, the user interface having one or more selectable objects. The device receives an input that corresponds to a first gesture detected on the touch-sensitive surface; and sends instructions to the display for displaying an object selection indicator. In response to receiving the input that corresponds to the first gesture: the device searches for a target selectable object; and sends instructions to the display for moving the object selection indicator. When a target selectable object is identified, the device moves the object selection towards the target selectable object. When a target selectable object is not identified, the device moves the object selection indicator in accordance with the first gesture.

19 Claims, 70 Drawing Sheets

(56) References Cited

U.S. PATENT DOCUMENTS

| | | | |
|---|---|---|---|
| 2009/0140986 A1* | 6/2009 | Karkkainen et al. | 345/173 |
| 2009/0249257 A1* | 10/2009 | Bove et al. | 715/858 |
| 2010/0064261 A1* | 3/2010 | Andrews et al. | 715/863 |
| 2010/0127972 A1* | 5/2010 | Yadavalli et al. | 345/157 |
| 2010/0169766 A1* | 7/2010 | Duarte et al. | 715/244 |
| 2010/0188352 A1* | 7/2010 | Ikeda | 345/173 |
| 2011/0106439 A1* | 5/2011 | Huang et al. | 701/208 |
| 2011/0231796 A1* | 9/2011 | Vigil | 715/810 |

OTHER PUBLICATIONS

Hertzum et al., "Input techniques that dynamically change their cursor activation area: A comparison of bubble and cell cursors," International Journal of Human-Computer Studies, vol. 65 Issue 10, Oct. 2007, 38 pages.

Ren et al., "The Adaptive Hybrid Cursor: A Pressure-Based Target Selection Technique for Pen-Based User Interfaces," Interact '07 Proceedings of the 11th IFIP TC 13 International Conference on Human-Computer Interaction, Sep. 2007, pp. 310-323.

\* cited by examiner

GETTYSBURG ADDRESS

Four score and seven years ago our fa[thers] brought forth on this continent, a new nation, conceived in Liberty, and dedic[ated] to the proposition that all men are crea[ted] equal.

Now we are engaged in a great civil wa[r,] testing whether that nation, or any nati[on] conceived and so dedicated, can long endure. We are met on a great battle-fi[eld] of that war. We have come to dedicate [a] portion of that field, as a final resting pl[ace] for those who here gave their lives tha[t that] nation might live. It is altogether fitting [and] proper that we should do this.

But, in a larger sense, we can not dedi[cate] -- we can not consecrate -- we can not hallow -- this ground. The brave men, l[iving] and dead, who struggled here, have "A house divided against itself cannot stand."

I believe this government cannot endure, permanently half slave and half free.
I do not expect the Union to be dissolved --
I do not expect the house to fall -- but I do expect it will cease to be divided.

It will become all one thing or all the other.

Either the opponents of slavery, will arrest the further spread of it, and place it where the public mind shall rest in the belief that it is in the course of ultimate extinction; or its advocates will push it forward, till it shall become alike lawful in all the States, old as well as new -- North as well as South.

Have we no tendency to the latter condition?

Advertisement 2

Advertisement 3

Touch Screen 112

DEVICE, METHOD, AND GRAPHICAL USER INTERFACE FOR NAVIGATING THROUGH A USER INTERFACE USING A DYNAMIC OBJECT SELECTION INDICATOR

TECHNICAL FIELD

The disclosed embodiments relate generally to electronic devices with touch-sensitive surfaces, including but not limited to electronic devices with touch-sensitive surfaces that are used to navigate through a user interface.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to navigate through user interfaces.

Exemplary user interface navigation operations include scrolling through a user interface, selecting selectable objects within a user interface as well as activating selected objects within the user interface. Exemplary selectable objects include digital images, video, text blocks, hyperlinks, icons, and other objects with which a user is able to interact. A user may need to perform user interface navigation operations in virtually any computer program. For example, such operations may be performed in: an operating system (e.g., Mac OS X or iPhone OS from Apple Inc. of Cupertino, Calif.); a media display program (e.g., Front Row from Apple Inc. of Cupertino, Calif.); a set-top box application (e.g., the Apple TV user interface from Apple Inc. of Cupertino, Calif.); a file management program (e.g., Finder from Apple Inc. of Cupertino, Calif.), an image management application (e.g., Aperture or iPhoto from Apple Inc. of Cupertino, Calif.), a digital content (e.g., videos and music) management application (e.g., iTunes from Apple Inc. of Cupertino, Calif.), a drawing application, a presentation application (e.g., Keynote from Apple Inc. of Cupertino, Calif.), a word processing application (e.g., Pages from Apple Inc. of Cupertino, Calif.), a website creation application (e.g., iWeb from Apple Inc. of Cupertino, Calif.), a disk authoring application (e.g., iDVD from Apple Inc. of Cupertino, Calif.), or a spreadsheet application (e.g., Numbers from Apple Inc. of Cupertino, Calif.).

But existing methods for performing these navigation operations are cumbersome and inefficient. For example, using a sequence of mouse-based inputs to select one or more selectable objects and perform one or more actions on the selected selectable objects is tedious and creates a significant cognitive burden on a user. In addition, existing methods take longer than necessary, thereby wasting energy. This latter consideration is particularly important in battery-operated devices.

SUMMARY

Accordingly, there is a need for computing devices with faster, more efficient methods and interfaces for navigating through user interfaces. Such methods and interfaces may complement or replace conventional methods for navigating through user interfaces. Such methods and interfaces reduce the cognitive burden on a user and produce a more efficient human-machine interface. For battery-operated computing devices, such methods and interfaces conserve power and increase the time between battery charges.

The above deficiencies and other problems associated with user interfaces for computing devices that are in communication with one or more displays and touch-sensitive surfaces are reduced or eliminated by the disclosed devices, which navigate via control of a dynamic object selection indicator. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions may include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a computer readable storage medium or other computer program product configured for execution by one or more processors.

In accordance with some embodiments, a computing device that is in communication with a display and a touch-sensitive surface includes one or more processors, memory, and one or more programs. The one or more programs are stored in the memory and configured to be executed by the one or more processors. The one or more programs include instructions for: sending instructions to the display for displaying at least a portion of a user interface, the user interface having one or more selectable objects; receiving an input that corresponds to a first gesture detected on the touch-sensitive surface; and sending instructions to the display for displaying an object selection indicator. The one or more programs further include instructions for, in response to receiving the input that corresponds to the first gesture: searching for a target selectable object and sending instructions to the display for moving the object selection indicator. When a target selectable object is identified, moving the object selection indicator includes moving the object selection indicator towards the target selectable object. When a target selectable object is not identified, moving the object selection indicator includes moving the object selection indicator in accordance with the first gesture.

In accordance with some embodiments, a method is performed at a computing device with one or more processors and memory that is in communication with a display and a touch-sensitive surface. The method includes: sending instructions to the display for displaying at least a portion of a user interface, the user interface having one or more selectable objects; receiving an input that corresponds to a first gesture detected on the touch-sensitive surface; and sending instructions to the display for displaying an object selection indicator. The method further includes, in response to receiving the input that corresponds to the first gesture: searching for a target selectable object; and sending instructions to the display for moving the object selection indicator. When a target selectable object is identified, moving the object selection indicator includes moving the object selection indicator towards the target selectable object. When a target selectable object is not identified, moving the object selection indicator includes moving the object selection indicator in accordance with the first gesture.

In accordance with some embodiments, a graphical user interface on display that is in communication with a computing device that is in communication with a touch-sensitive surface and includes memory, and one or more processors to execute one or more programs stored in the memory includes: an object selection indicator; and a portion of a user interface having one or more selectable objects. An input is received that corresponds to a first gesture detected on the touch-sensitive surface and the object selection indicator is displayed. In response to receiving the input that corresponds to the first gesture: a target selectable object is searched for; and the object selection indicator is moved. When a target selectable object is identified, the object selection indicator is moved towards the target selectable object. When a target selectable object is not identified, the object selection indicator is moved in accordance with the first gesture.

In accordance with some embodiments, a computer readable storage medium has stored therein instructions which when executed by a computing device that is in communication with display and a touch-sensitive surface, cause the device to: send instructions to the display for displaying at least a portion of a user interface, the user interface having one or more selectable objects; receive an input that corresponds to a first gesture detected on the touch-sensitive surface; and send instructions to the display for displaying an object selection indicator. The instructions further cause the device to, in response to receiving the input that corresponds to the first gesture: search for a target selectable object; and send instructions to the display for moving the object selection indicator. When a target selectable object is identified, moving the object selection indicator includes moving the object selection indicator towards the target selectable object. When a target selectable object is not identified, moving the object selection indicator includes moving the object selection indicator in accordance with the first gesture.

In accordance with some embodiments, a computing device includes: means for communicating with a display; means for communicating with a touch-sensitive surface; means for sending instructions to the display for displaying at least a portion of a user interface, the user interface having one or more selectable objects; means for receiving an input that corresponds to a first gesture detected on the touch-sensitive surface; and means for sending instructions to the display for displaying an object selection indicator. The computing device further includes means, responsive to receiving the input that corresponds to the first gesture, for: searching for a target selectable object; and sending instructions to the display for moving the object selection indicator. When a target selectable object is identified, moving the object selection indicator includes moving the object selection indicator towards the target selectable object. When a target selectable object is not identified, moving the object selection indicator includes moving the object selection indicator in accordance with the first gesture.

In accordance with some embodiments, an information processing apparatus for use in a computing device that is in communication with a display and a touch-sensitive surface, the information processing apparatus including means for sending instructions to the display for displaying at least a portion of a user interface, the user interface having one or more selectable objects; means for receiving an input that corresponds to a first gesture detected on the touch-sensitive surface; and means for sending instructions to the display for displaying an object selection indicator. The information processing apparatus further includes means, responsive to receiving the input that corresponds to the first gesture, for: searching for a target selectable object; and sending instructions to the display for moving the object selection indicator. When a target selectable object is identified, moving the object selection indicator includes moving the object selection indicator towards the target selectable object. When a target selectable object is not identified, moving the object selection indicator includes moving the object selection indicator in accordance with the first gesture.

In accordance with some embodiments, a computing device that is in communication with a display and a touch-sensitive surface includes one or more processors, memory, and one or more programs. The one or more programs are stored in the memory and configured to be executed by the one or more processors. The one or more programs include instructions for: sending instructions to the display for displaying at least a portion of a user interface, the user interface having one or more selectable objects; receiving an input that corresponds to a first gesture detected on the touch-sensitive surface; and sending instructions to the display for displaying an object selection indicator at a first size. The one or more programs further include instructions for, in response receiving the input that corresponds to the first gesture, sending instructions to the display for moving the object selection indicator towards a target selectable object of the one or more selectable objects in accordance with the first gesture; and after receiving an input that corresponds to detecting an end of the first gesture, sending instructions to the display for resizing the object selection indicator to a second size. The second size is based on a size of the target selectable object, and the second size is distinct from the first size.

In accordance with some embodiments, a method is performed at a computing device with one or more processors and memory that is in communication with a display and a touch-sensitive surface. The method includes: sending instructions to the display for displaying at least a portion of a user interface, the user interface having one or more selectable objects; receiving an input that corresponds to a first gesture detected on the touch-sensitive surface; and sending instructions to the display for displaying an object selection indicator at a first size. The method further includes, in response receiving the input that corresponds to the first gesture, sending instructions to the display for moving the object selection indicator towards a target selectable object of the one or more selectable objects in accordance with the first gesture; and after receiving an input that corresponds to detecting an end of the first gesture, sending instructions to the display for resizing the object selection indicator to a second size. The second size is based on a size of the target selectable object, and the second size is distinct from the first size.

In accordance with some embodiments, a graphical user interface on display that is in communication with a computing device that is in communication with a touch-sensitive surface and includes memory, and one or more processors to execute one or more programs stored in the memory includes an object selection indicator; and at least a portion of a user interface having one or more selectable objects. An input is received that corresponds to a first gesture detected on the touch-sensitive surface. The object selection indicator is displayed at a first size. In response to receiving the input that corresponds to the first gesture, the object selection indicator is moved towards a target selectable object of the one or more selectable objects in accordance with the first gesture. After receiving an input that corresponds to detecting an end of the first gesture, the object selection indicator is resized to a second size. The second size is based on a size of the target selectable object, and the second size is distinct from the first size.

In accordance with some embodiments, a computer readable storage medium has stored therein instructions which when executed by a computing device that is in communication with display and a touch-sensitive surface, cause the device to: send instructions to the display for displaying at least a portion of a user interface, the user interface having one or more selectable objects; receive an input that corresponds to a first gesture detected on the touch-sensitive surface; and send instructions to the display for displaying an object selection indicator at a first size. The instructions further cause the device to, in response receiving the input that corresponds to the first gesture, send instructions to the display for moving the object selection indicator towards a target selectable object of the one or more selectable objects in accordance with the first gesture; and after receiving an input that corresponds to detecting an end of the first gesture, send instructions to the display for resizing the object selection indicator to a second size. The second size is based on a size of the target selectable object, and the second size is distinct from the first size.

In accordance with some embodiments, a computing device includes: means for communicating with a display; means for communicating with a touch-sensitive surface; means for sending instructions to the display for displaying at least a portion of a user interface, the user interface having one or more selectable objects; means for receiving an input that corresponds to a first gesture detected on the touch-sensitive surface; means for sending instructions to the display for displaying an object selection indicator at a first size. The computing device further includes means, responsive to receiving the input that corresponds to the first gesture, for sending instructions to the display for moving the object selection indicator towards a target selectable object of the one or more selectable objects in accordance with the first gesture; and means for, after receiving an input that corresponds to detecting an end of the first gesture, sending instructions to the display for resizing the object selection indicator to a second size. The second size is based on a size of the target selectable object, and the second size is distinct from the first size.

In accordance with some embodiments, an information processing apparatus for use in a computing device that is in communication with a display and a touch-sensitive surface, the information processing apparatus including means for sending instructions to the display for displaying at least a portion of a user interface, the user interface having one or more selectable objects; means for receiving an input that corresponds to a first gesture detected on the touch-sensitive surface; means for sending instructions to the display for displaying an object selection indicator at a first size. The information processing apparatus further includes means, responsive to receiving the input that corresponds to the first gesture, for sending instructions to the display for moving the object selection indicator towards a target selectable object of the one or more selectable objects in accordance with the first gesture; and means for, after receiving an input that corresponds to detecting an end of the first gesture, sending instructions to the display for resizing the object selection indicator to a second size. The second size is based on a size of the target selectable object, and the second size is distinct from the first size.

In accordance with some embodiments, a computing device that is in communication with a display and a touch-sensitive surface includes one or more processors, memory, and one or more programs. The one or more programs are stored in the memory and configured to be executed by the one or more processors. The one or more programs include instructions for: sending instructions to the display for displaying a portion of a user interface, the user interface having one or more selectable objects; receiving an input that corresponds to a first gesture detected on the touch-sensitive surface; and sending instructions to the display for displaying an object selection indicator. The one or more programs further include instructions for, in response to receiving the input that corresponds to the first gesture, determining an updated location for the object selection indicator within the user interface in accordance with the first gesture. When the updated location is within a portion of the user interface that corresponds to a predefined region of the display, the predefined region being a subset of the display, the one or more programs further include instructions for sending instructions to the display for moving the object selection indicator to the updated location without scrolling the user interface. When the updated location is outside of the portion of the user interface that corresponds to the predefined region of the display, the one or more programs further include instructions for sending instructions to the display for moving the object selection indicator to the updated location and sending instructions to the display for scrolling the user interface so as to display the updated location within the predefined region of the display.

In accordance with some embodiments, a method is performed at a computing device with one or more processors and memory that is in communication with a display and a touch-sensitive surface. The method includes: sending instructions to the display for displaying a portion of a user interface, the user interface having one or more selectable objects; receiving an input that corresponds to a first gesture detected on the touch-sensitive surface; and sending instructions to the display for displaying an object selection indicator. The method further includes, in response to receiving the input that corresponds to the first gesture, determining an updated location for the object selection indicator within the user interface in accordance with the first gesture. When the updated location is within a portion of the user interface that corresponds to a predefined region of the display, the predefined region being a subset of the display, the method further includes sending instructions to the display for moving the object selection indicator to the updated location without scrolling the user interface. When the updated location is outside of the portion of the user interface that corresponds to the predefined region of the display, the method further includes sending instructions to the display for moving the object selection indicator to the updated location and sending instructions to the display for scrolling the user interface so as to display the updated location within the predefined region of the display.

In accordance with some embodiments, a graphical user interface on display that is in communication with a computing device that is in communication with a touch-sensitive surface and includes memory, and one or more processors to execute one or more programs stored in the memory includes an object selection indicator; and a portion of a user interface having one or more selectable objects. An input is received that corresponds to a first gesture detected on the touch-sensitive surface and the object selection indicator is displayed. In response to receiving the input that corresponds to the first gesture, an updated location for the object selection indicator within the user interface is determined in accordance with the first gesture. When the updated location is within a portion of the user interface that corresponds to a predefined region of the display, the predefined region being a subset of the display, the object selection indicator is moved to the updated location without the user interface being scrolled. When the updated location is outside of the portion of the user interface that corresponds to the predefined region of the display, the object selection indicator is moved to the updated location and the user interface is scrolled so as to display the updated location within the predefined region of the display.

In accordance with some embodiments, a computer readable storage medium has stored therein instructions which when executed by a computing device that is in communication with display and a touch-sensitive surface, cause the device to: send instructions to the display for displaying a portion of a user interface, the user interface having one or more selectable objects; receive an input that corresponds to a first gesture detected on the touch-sensitive surface; and send instructions to the display for displaying an object selection indicator. The instructions further cause the device to, in response to receiving the input that corresponds to the first gesture, determine an updated location for the object selection indicator within the user interface in accordance with the first gesture. When the updated location is within a portion of the user interface that corresponds to a predefined region of the display, the predefined region being a subset of the display, the instructions further cause the device to send instructions to the display for moving the object selection indicator to the updated location without scrolling the user interface. When the updated location is outside of the portion of the user interface that corresponds to the predefined region of the display, the instructions further cause the device to send instructions to the display for moving the object selection indicator to the updated location and send instructions to the display for scrolling the user interface so as to display the updated location within the predefined region of the display.

In accordance with some embodiments, a computing device includes: means for communicating with a display; means for communicating with a touch-sensitive surface; means for sending instructions to the display for displaying a portion of a user interface, the user interface having one or more selectable objects; means for receiving an input that corresponds to a first gesture detected on the touch-sensitive surface; means for sending instructions to the display for displaying an object selection indicator. The computing device further includes means, responsive to receiving the input that corresponds to the first gesture, for determining an updated location for the object selection indicator within the user interface in accordance with the first gesture. The computing device further includes means for, when the updated location is within a portion of the user interface that corresponds to a predefined region of the display, the predefined region being a subset of the display, sending instructions to the display for moving the object selection indicator to the updated location without scrolling the user interface. The computing device further includes means for, when the updated location is outside of the portion of the user interface that corresponds to the predefined region of the display, sending instructions to the display for moving the object selection indicator to the updated location and sending instructions to the display for scrolling the user interface so as to display the updated location within the predefined region of the display.

In accordance with some embodiments, an information processing apparatus for use in a computing device that is in communication with a display and a touch-sensitive surface, the information processing apparatus including means for sending instructions to the display for displaying a portion of a user interface, the user interface having one or more selectable objects; means for receiving an input that corresponds to a first gesture detected on the touch-sensitive surface; means for sending instructions to the display for displaying an object selection indicator. The information processing apparatus further includes means, responsive to receiving the input that corresponds to the first gesture, for determining an updated location for the object selection indicator within the user interface in accordance with the first gesture. The information processing apparatus further includes means for, when the updated location is within a portion of the user interface that corresponds to a predefined region of the display, the predefined region being a subset of the display, sending instructions to the display for moving the object selection indicator to the updated location without scrolling the user interface. The information processing apparatus further includes means for, when the updated location is outside of the portion of the user interface that corresponds to the predefined region of the display, sending instructions to the display for moving the object selection indicator to the updated location and sending instructions to the display for scrolling the user interface so as to display the updated location within the predefined region of the display.

In accordance with some embodiments, a computing device that is in communication with a display and a touch-sensitive surface includes one or more processors, memory, and one or more programs. The one or more programs are stored in the memory and configured to be executed by the one or more processors. The one or more programs include instructions for: sending instructions to the display for displaying, concurrently, an object selection indicator and a portion of a user interface, the user interface having one or more selectable objects; sending instructions to the display for ceasing to display the object selection indicator; and after sending instructions to the display for ceasing to display the object selection indicator, receiving an input that corresponds to a first gesture detected on the touch-sensitive surface. The one or more programs further include instructions for, in response to receiving the input that corresponds to the first gesture: when the first gesture meets predefined navigation criteria, sending instructions to the display for translating the user interface in accordance with the first gesture without redisplaying the object selection indicator, the navigation criteria including a requirement that the first gesture has a duration that is less than a predefined time threshold; and when the first gesture meets predefined object selection indicator movement criteria, sending instructions to the display for redisplaying the object selection indicator and moving the object selection indicator in accordance with the first gesture, the object selection indicator movement criteria including a requirement that the first gesture has a duration that is greater than the predefined time threshold.

In accordance with some embodiments, a method is performed at a computing device with one or more processors and memory that is in communication with a display and a touch-sensitive surface. The method includes: sending instructions to the display for displaying, concurrently, an object selection indicator and a portion of a user interface, the user interface having one or more selectable objects; sending instructions to the display for ceasing to display the object selection indicator; and after sending instructions to the display for ceasing to display the object selection indicator, receiving an input that corresponds to a first gesture detected on the touch-sensitive surface. The method further includes, in response to receiving the input that corresponds to the first gesture: when the first gesture meets predefined navigation criteria, sending instructions to the display for translating the user interface in accordance with the first gesture without redisplaying the object selection indicator, the navigation criteria including a requirement that the first gesture has a duration that is less than a predefined time threshold; and when the first gesture meets predefined object selection indicator movement criteria, sending instructions to the display for redisplaying the object selection indicator and moving the object selection indicator in accordance with the first gesture, the object selection indicator movement criteria including a requirement that the first gesture has a duration that is greater than the predefined time threshold.

In accordance with some embodiments, a graphical user interface on display that is in communication with a computing device that is in communication with a touch-sensitive surface and includes memory, and one or more processors to execute one or more programs stored in the memory includes an object selection indicator; and a portion of a user interface having one or more selectable objects. The object selection indicator ceases to be displayed. After the object selection indicator ceases to be displayed, an input is received that corresponds to a first gesture detected on the touch-sensitive surface. In response to receiving the input that corresponds to the first gesture: when the first gesture meets predefined navigation criteria, the user interface is translated in accordance with the first gesture without redisplaying the object selection indicator, the navigation criteria including a requirement that the first gesture has a duration that is less than a predefined time threshold; and when the first gesture meets predefined object selection indicator movement criteria, the object selection indicator is redisplayed and the object selection indicator is moved in accordance with the first gesture, the object selection indicator movement criteria including a requirement that the first gesture has a duration that is greater than the predefined time threshold.

In accordance with some embodiments, a computer readable storage medium has stored therein instructions which when executed by a computing device that is in communication with display and a touch-sensitive surface, cause the device to: send instructions to the display for displaying, concurrently, an object selection indicator and a portion of a user interface, the user interface having one or more selectable objects; send instructions to the display for ceasing to display the object selection indicator; and after sending instructions to the display for ceasing to display the object selection indicator, receive an input that corresponds to a first gesture detected on the touch-sensitive surface. The instructions further cause the device to, in response to receiving the input that corresponds to the first gesture: when the first gesture meets predefined navigation criteria, send instructions to the display for translating the user interface in accordance with the first gesture without redisplaying the object selection indicator, the navigation criteria including a requirement that the first gesture has a duration that is less than a predefined time threshold; and when the first gesture meets predefined object selection indicator movement criteria, send instructions to the display for redisplaying the object selection indicator and moving the object selection indicator in accordance with the first gesture, the object selection indicator movement criteria including a requirement that the first gesture has a duration that is greater than the predefined time threshold.

In accordance with some embodiments, a computing device includes: means for communicating with a display; means for communicating with a touch-sensitive surface; means for sending instructions to the display for displaying, concurrently, an object selection indicator and a portion of a user interface, the user interface having one or more selectable objects; means for sending instructions to the display for ceasing to display the object selection indicator; and means for, after sending instructions to the display for ceasing to display the object selection indicator, receiving an input that corresponds to a first gesture detected on the touch-sensitive surface. The computing device further includes means, responsive to receiving the input that corresponds to the first gesture, for: when the first gesture meets predefined navigation criteria, sending instructions to the display for translating the user interface in accordance with the first gesture without redisplaying the object selection indicator, the navigation criteria including a requirement that the first gesture has a duration that is less than a predefined time threshold; and when the first gesture meets predefined object selection indicator movement criteria, sending instructions to the display for redisplaying the object selection indicator and moving the object selection indicator in accordance with the first gesture, the object selection indicator movement criteria including a requirement that the first gesture has a duration that is greater than the predefined time threshold.

In accordance with some embodiments, an information processing apparatus for use in a computing device that is in communication with a display and a touch-sensitive surface, the information processing apparatus including means for sending instructions to the display for displaying, concurrently, an object selection indicator and a portion of a user interface, the user interface having one or more selectable objects; means for sending instructions to the display for ceasing to display the object selection indicator; and means for, after sending instructions to the display for ceasing to display the object selection indicator, receiving an input that corresponds to a first gesture detected on the touch-sensitive surface. The information processing apparatus further includes means, responsive to receiving the input that corresponds to the first gesture, for: when the first gesture meets predefined navigation criteria, sending instructions to the display for translating the user interface in accordance with the first gesture without redisplaying the object selection indicator, the navigation criteria including a requirement that the first gesture has a duration that is less than a predefined time threshold; and when the first gesture meets predefined object selection indicator movement criteria, sending instructions to the display for redisplaying the object selection indicator and moving the object selection indicator in accordance with the first gesture, the object selection indicator movement criteria including a requirement that the first gesture has a duration that is greater than the predefined time threshold.

Thus, computing devices that are in communication with and/or include one or more displays and touch-sensitive surfaces are provided with faster, more efficient methods and interfaces for navigating through user interfaces, thereby increasing the effectiveness, efficiency, and user satisfaction with such devices. Such methods and interfaces may complement or replace conventional methods for navigating through user interfaces.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

FIG. 4C illustrates an exemplary user interface for a multifunction device with a touch-sensitive surface that is combined with a display in accordance with some embodiments.

DESCRIPTION OF EMBODIMENTS

Figure 1A:
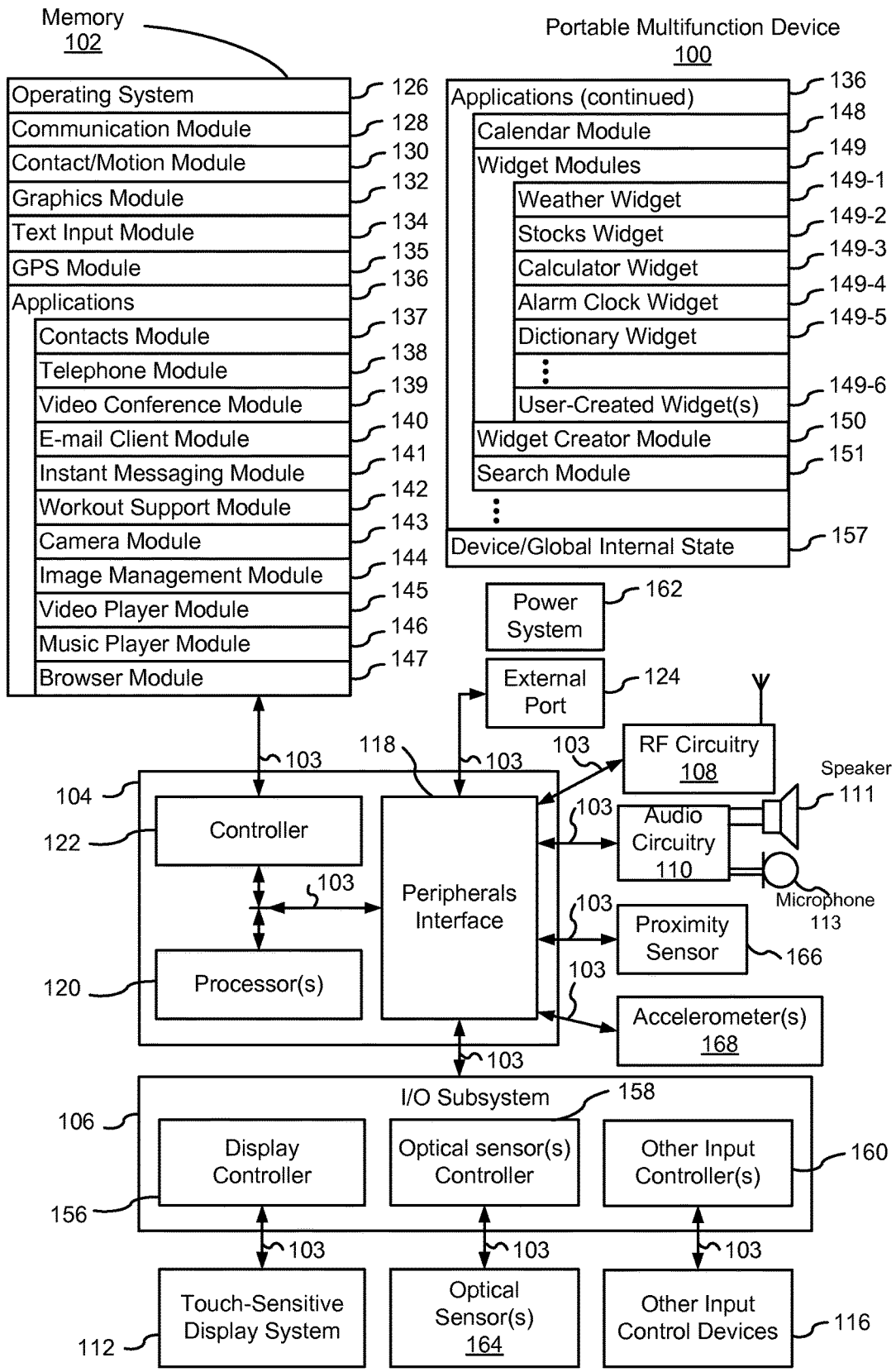
FIGS. 1A and 1B are block diagrams illustrating portable multifunction devices with touch-sensitive displays in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

As used herein, the term "resolution" of a display refers to the number of pixels (also called "pixel counts" or "pixel resolution") along each axis or in each dimension of the display. For example, a display may have a resolution of 320×480 pixels. Furthermore, as used herein, the term "resolution" of a multifunction device refers to the resolution of a display in the multifunction device. The term "resolution" does not imply any limitations on the size of each pixel or the spacing of pixels. For example, compared to a first display with a 1024×768-pixel resolution, a second display with a 320×480-pixel resolution has a lower resolution. However, it should be noted that the physical size of a display depends not only on the pixel resolution, but also on many other factors, including the pixel size and the spacing of pixels. Therefore, the first display may have the same, smaller, or larger physical size, compared to the second display.

As used herein, the term "video resolution" of a display refers to the density of pixels along each axis or in each dimension of the display. The video resolution is often measured in a dots-per-inch (DPI) unit, which counts the number of pixels that can be placed in a line within the span of one inch along a respective dimension of the display.

Embodiments of computing devices, user interfaces for such devices, and associated processes for using such devices are described. In some embodiments, the computing device is a portable communications device, such as a mobile telephone, that also contains other functions, such as PDA and/or music player functions. Exemplary embodiments of portable multifunction devices include, without limitation, the iPhone® iPod Touch® and iPad® devices from Apple Inc. of Cupertino, Calif. Other portable devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad).

In the discussion that follows, a computing device that communicates with and/or includes a display and a touch-sensitive surface is described. It should be understood, however, that the computing device may include one or more other physical user-interface devices, such as a physical keyboard, a mouse and/or a joystick.

The device supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. No. 11/459,606, "Keyboards For Portable Electronic Devices," filed Jul. 24, 2006, and Ser. No. 11/459,615, "Touch Screen Keyboards For Portable Electronic Devices," filed Jul. 24, 2006, the contents of which are hereby incorporated by reference in their entireties. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Figure 1B:
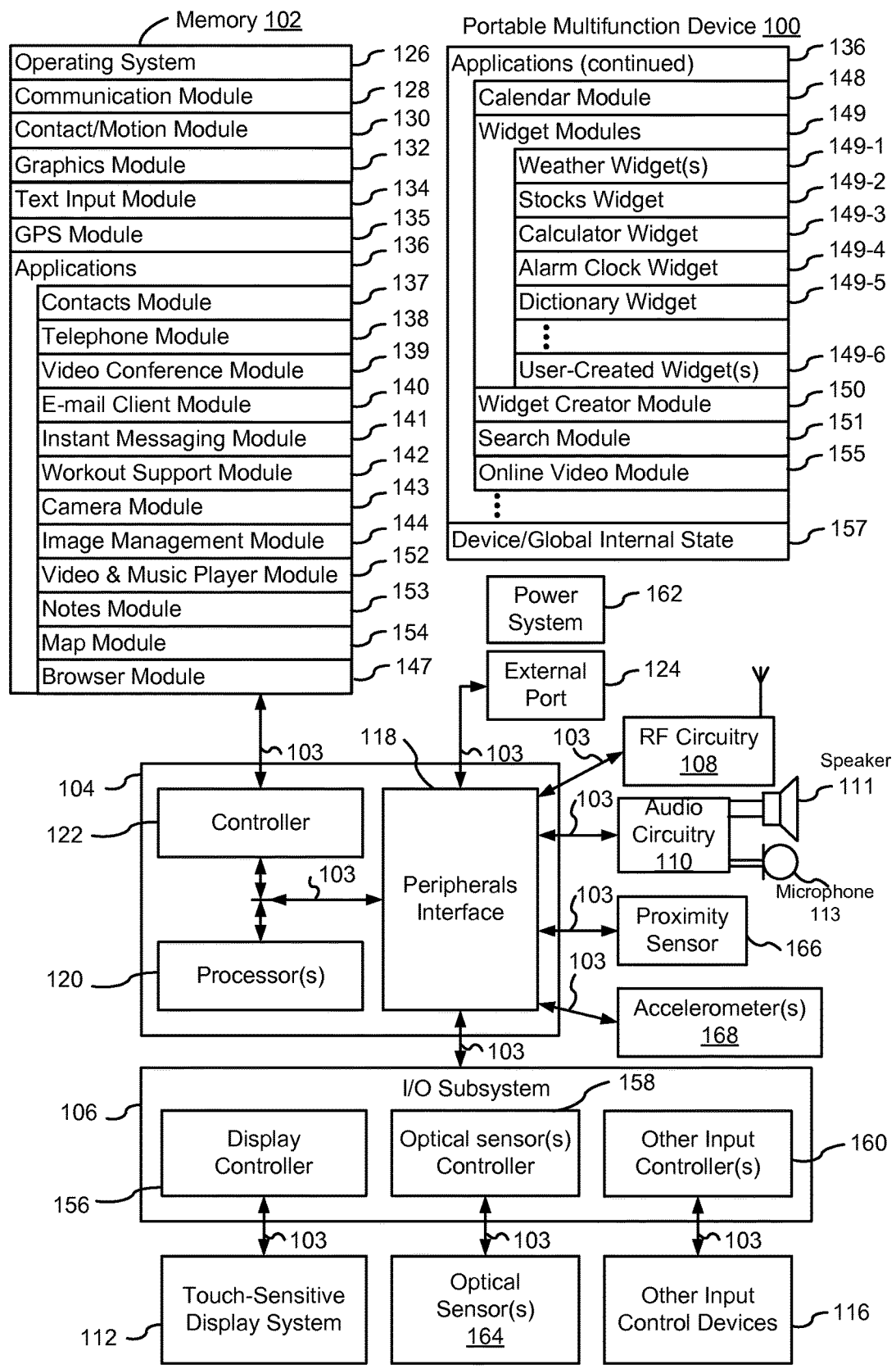

Attention is now directed toward embodiments of portable devices with touch-sensitive displays. FIGS. 1A and 1B are block diagrams illustrating portable multifunction devices 100 with touch-sensitive displays 112 in accordance with some embodiments. Touch-sensitive display 112 is sometimes called a "touch screen" for convenience, and may also be known as or called a touch-sensitive display system.

Device 100 may include memory 102 (which may include one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIGS. 1A and 1B may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2). A quick press of the push button may disengage a lock of touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button (e.g., 206) may turn power to device 100 on or off. The user may be able to customize a functionality of one or more of the buttons. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 may be analogous to the multi-touch sensitive touchpads described in the following U.S. Patents: U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from portable device 100, whereas touch sensitive touchpads do not provide visual output.

A touch-sensitive display in some embodiments of touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output.

The touchpad may be a touch-sensitive surface that is separate from touch screen 112 or an extension of the touch-sensitive surface formed by the touch screen.

In some embodiments, device 100 may include a physical or virtual wheel (e.g., a click wheel) as input control device 116. A user may navigate among and interact with one or more graphical objects (e.g., icons) displayed in touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by input controller 160 as well as one or more of the modules and/or sets of instructions in memory 102. For a virtual click wheel, the click wheel and click wheel controller may be part of touch screen 112 and display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIGS. 1A and 1B show an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, an optical sensor is located on the front of the device so that the user's image may be obtained for videoconferencing while the user views the other video conference participants on the touch screen display. In some embodiments, the position of optical sensor 164 can be changed by the user (e.g., by rotating the lens and the sensor in the device housing) so that a single optical sensor 164 may be used along with the touch screen display for both video conferencing and still and/or video image acquisition.

Device 100 may also include one or more proximity sensors 166. FIGS. 1A and 1B show proximity sensor 166 coupled to peripherals interface 118. Alternately, proximity sensor 166 may be coupled to input controller 160 in I/O subsystem 106. Proximity sensor 166 may perform as described in U.S. patent application Ser. No. 11/241,839, "Proximity Detector In Handheld Device"; Ser. No. 11/240, 788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 may also include one or more accelerometers 168. FIGS. 1A and 1B show accelerometer 168 coupled to peripherals interface 118. Alternately, accelerometer 168 may be coupled to an input controller 160 in I/O subsystem 106. Accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
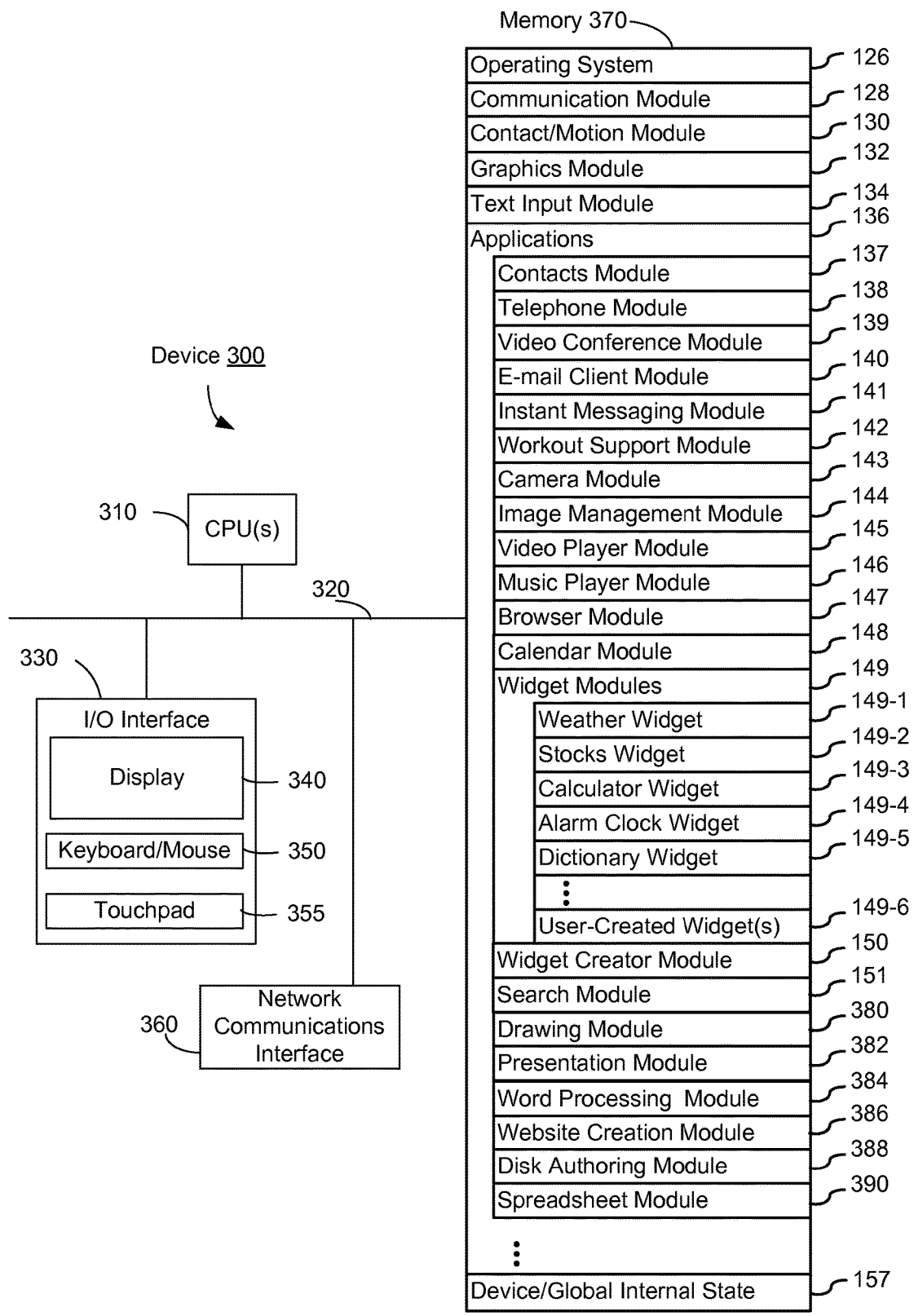
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A, 1B and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detects contact on a touchpad. In some embodiments, contact/motion module 130 and controller 160 detects contact on a click wheel.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
 contacts module 137 (sometimes called an address book or contact list);
 telephone module 138;
 video conferencing module 139;
 e-mail client module 140;
 instant messaging (IM) module 141;
 workout support module 142;
 camera module 143 for still and/or video images;
 image management module 144;
 video player module 145;
 music player module 146;
 browser module 147;
 calendar module 148;
 widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
 widget creator module 150 for making user-created widgets 149-6;
 search module 151;
 video and music player module 152, which merges video player module 145 and music player module 146;
 notes module 153;
 map module 154; and/or
 online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with touch screen 112, display controller 156, contact module 130, graphics module 132, audio circuitry 110, and speaker 111, video player module 145 includes executable instructions to display, present or otherwise play back videos (e.g., on touch screen 112 or on an external, connected display via external port 124).

In conjunction with touch screen 112, display system controller 156, contact module 130, graphics module 132, audio circuitry 110, speaker 111, RF circuitry 108, and browser module 147, music player module 146 includes executable instructions that allow the user to download and play back recorded music and other sound files stored in one or more file formats, such as MP3 or AAC files. In some embodiments, device 100 may include the functionality of an MP3 player, such as an iPod (trademark of Apple Inc.).

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the content of which is hereby incorporated by reference in its entirety.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. For example, video player module 145 may be combined with music player module 146 into a single module (e.g., video and music player module 152, FIG. 1B). In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

Figure 1C:
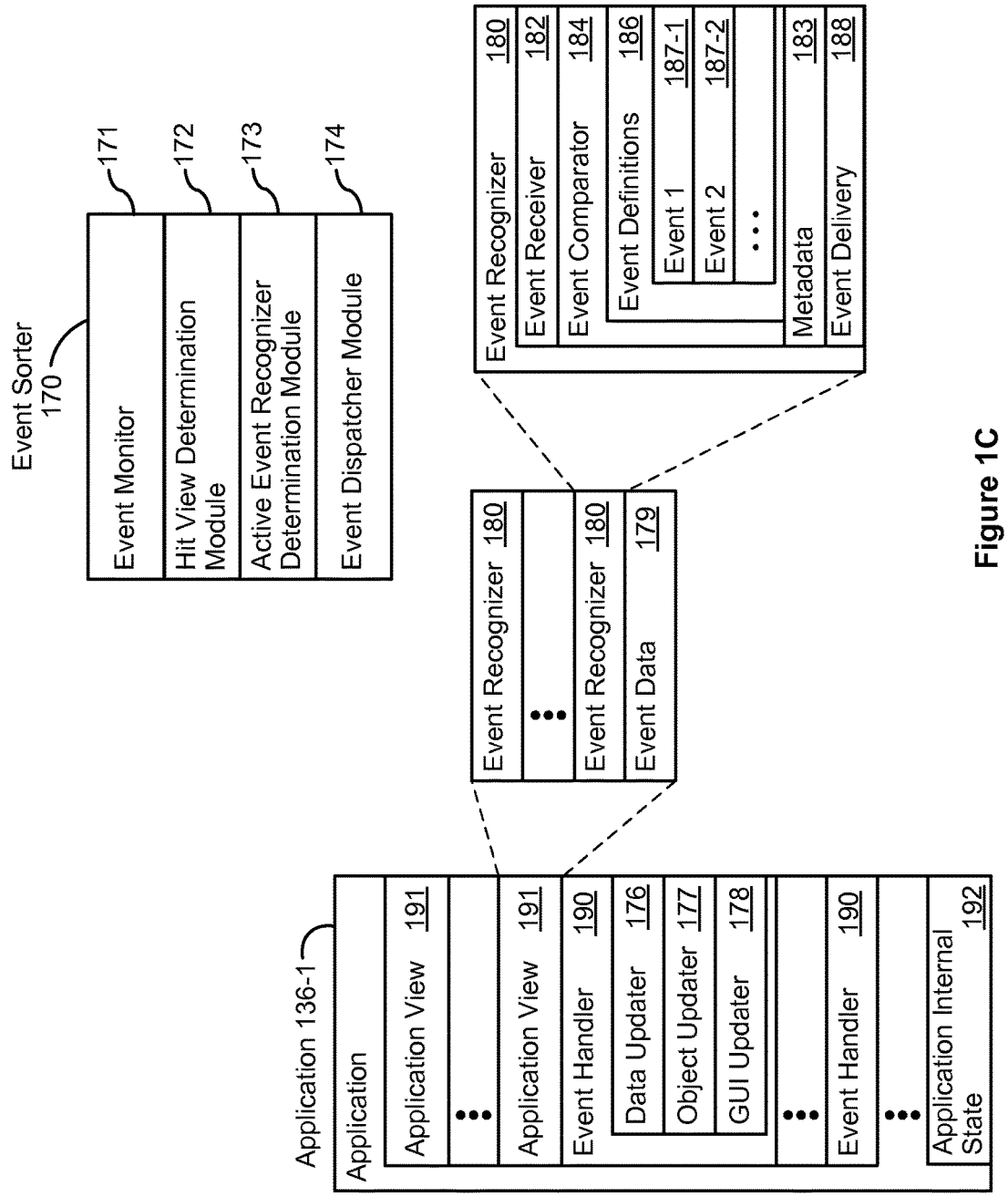
FIG. 1C is a block diagram illustrating exemplary components for event handling in accordance with some embodiments.

FIG. 1C is a block diagram illustrating exemplary components for event handling in accordance with some embodiments. In some embodiments, memory 102 (in FIGS. 1A and 1B) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is(are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens, e.g., coordinating mouse movement and mouse button presses with or without single or multiple keyboard presses or holds, user movements taps, drags, scrolls, etc., on touch-pads, pen stylus inputs, movement of the device, oral instructions, detected eye movements, biometric inputs, and/or any combination thereof, which may be utilized as inputs corresponding to sub-events which define an event to be recognized.

Figure 2:
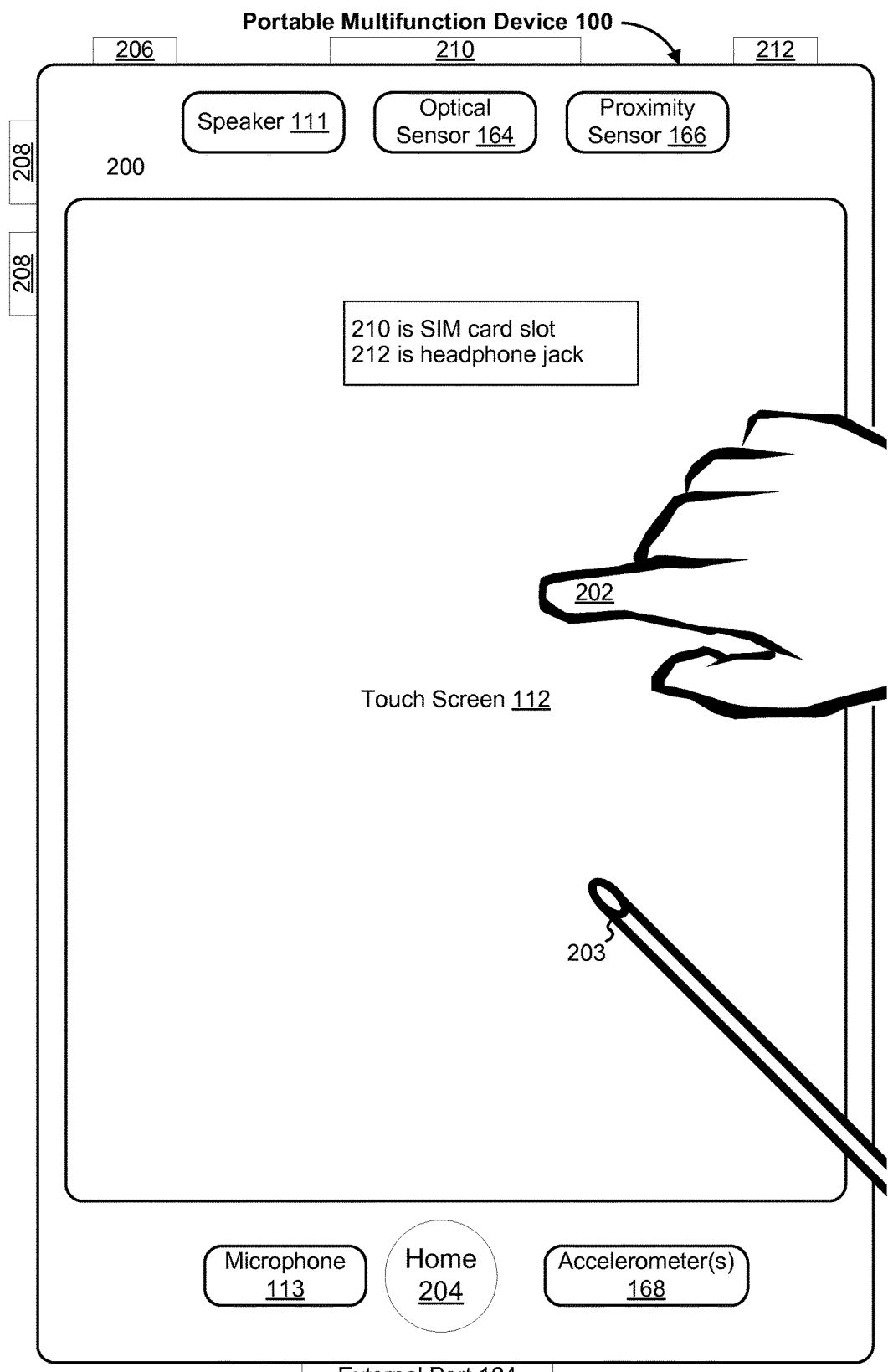
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making contact or touching the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with device 100. In some embodiments, inadvertent contact with a graphic may not select the graphic. For example, a swipe gesture that sweeps over an application icon may not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also may accept verbal input for activation or deactivation of some functions through microphone 113.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, a set-top box, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 may include circuitry (sometimes called a chipset) that interconnects and controls communications between system components. Device 300 includes input/output (I/O) interface 330 comprising display 340, which is typically a touch screen display. I/O interface 330 also may include a keyboard and/or mouse (or other pointing device) 350 and touchpad 355. Memory 370 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 370 may optionally include one or more storage devices remotely located from CPU(s) 310. In some embodiments, memory 370 stores programs, modules, and data structures analogous to the programs, modules, and data structures stored in memory 102 of portable multifunction device 100 (FIGS. 1A-1B), or a subset thereof. Furthermore, memory 370 may store additional programs, modules, and data structures not present in memory 102 of portable multifunction device 100. For example, memory 370 of device 300 may store drawing module 380, presentation module 382, word processing module 384, website creation module 386, disk authoring module 388, and/or spreadsheet module 390, while memory 102 of portable multifunction device 100 (FIGS. 1A-1B) may not store these modules.

Each of the above identified elements in FIG. 3 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Attention is now directed towards embodiments of user interfaces ("UI") that may be implemented on portable multifunction device 100.

Figure 4A:
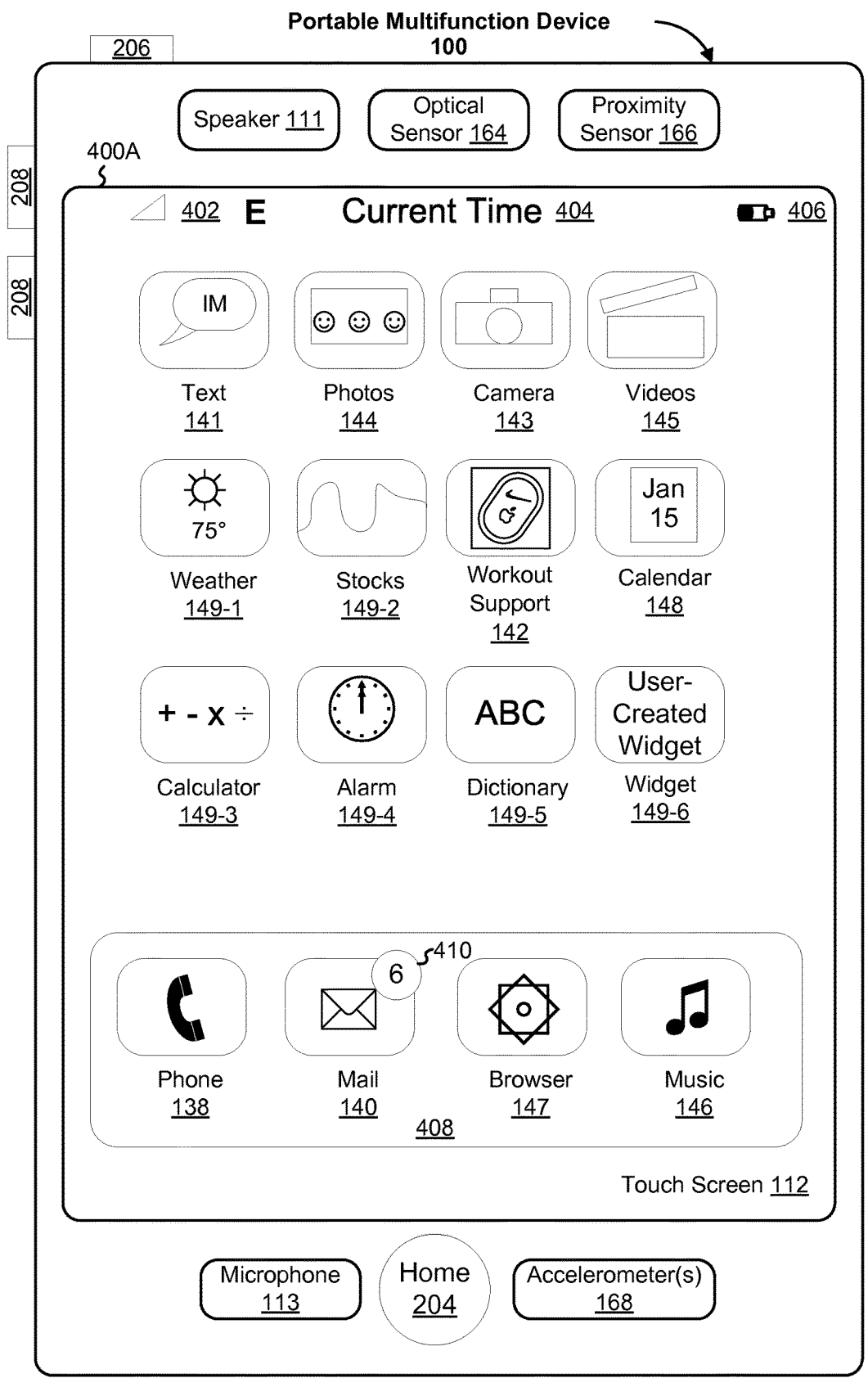
FIGS. 4A and 4B illustrate exemplary user interfaces for a menu of applications on a portable multifunction device in accordance with some embodiments.
Figure 4B:
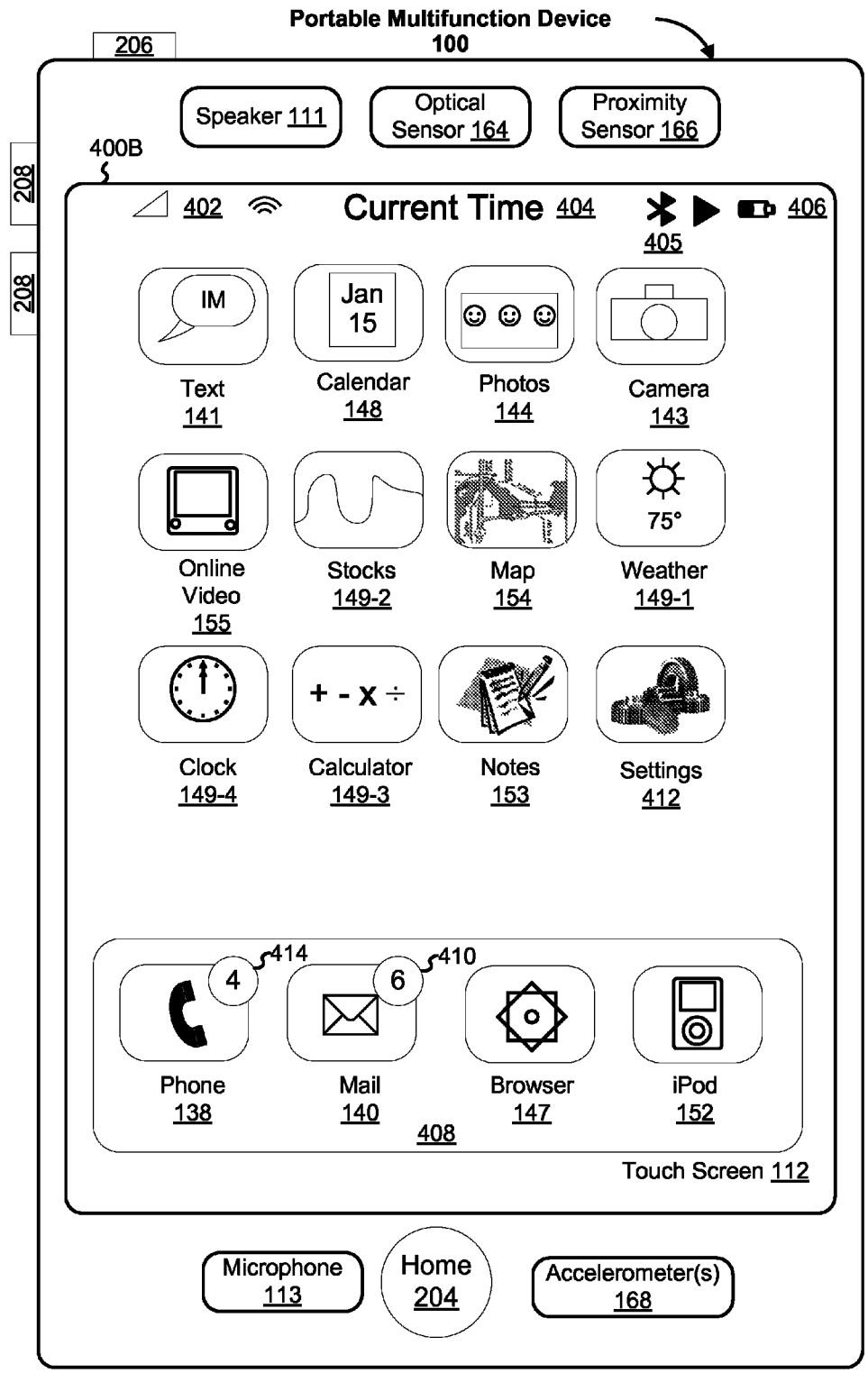

FIGS. 4A and 4B illustrate exemplary user interfaces for a menu of applications on portable multifunction device 100 in accordance with some embodiments. Similar user interfaces may be implemented on device 300. In some embodiments, user interface 400A includes the following elements, or a subset or superset thereof:
Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
Phone 138, which may include an indicator 414 of the number of missed calls or voicemail messages;
E-mail client 140, which may include an indicator 410 of the number of unread e-mails;
Browser 147; and
Music player 146; and
Icons for other applications, such as:
IM 141;
Image management 144;
Camera 143;
Video player 145;
Weather 149-1;
Stocks 149-2;
Workout support 142;
Calendar 148;
Calculator 149-3;
Alarm clock 149-4;
Dictionary 149-5; and
User-created widget 149-6.
In some embodiments, user interface 400B includes the following elements, or a subset or superset thereof:
402, 404, 405, 406, 141, 148, 144, 143, 149-3, 149-2, 149-1, 149-4, 410, 414, 138, 140, and 147, as described above;
Map 154;
Notes 153;
Settings 412, which provides access to settings for device 100 and its various applications 136, as described further below;
Video and music player module 152, also referred to as iPod (trademark of Apple Inc.) module 152; and
Online video module 155, also referred to as YouTube (trademark of Google Inc.) module 155.

FIG. 4C illustrates an exemplary user interface on a device (e.g., portable multifunction device 100 in FIGS. 1A-1B or device 300, FIG. 3) with a touch screen display (e.g., touch screen display 112) that incorporates both a display and a touch-sensitive surface. Although many of the examples which follow will be given with reference to inputs on a touch-sensitive surface that is separate from a computing device (where the computing device is in communication with a display), it should be understood that, in some embodiments, the device detects inputs on a touch-sensitive surface that is combined with the display, as shown in FIG. 4C. Thus, in these embodiments, inputs on the touch-sensitive surface (e.g., touch screen 112) are received by the computing device, interpreted and used to generate instructions for the display (e.g., touch screen 112). For example, in FIG. 4C in response to a swipe gesture including contact 440 and subsequent movement 442 of the contact 440 across the touch screen 112, the computing device the object selection indicator 444 is moved across the touch screen 112. It should be understood that similar methods may be used for other user interfaces described herein.

Figure 4D:
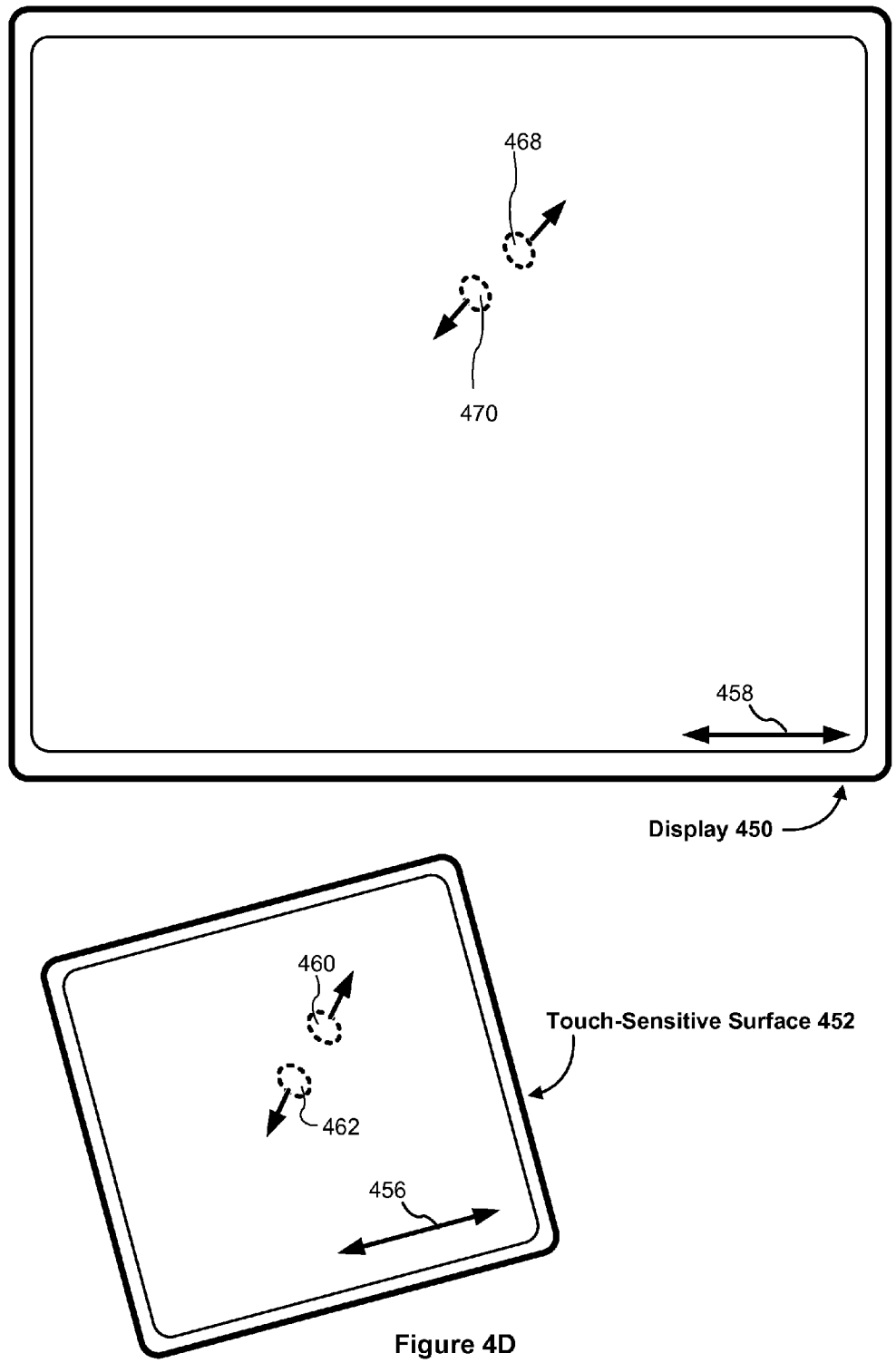
FIG. 4D illustrates an exemplary user interface for a multifunction device with a touch-sensitive surface that is separate from a display in accordance with some embodiments.

FIG. 4D illustrates an exemplary user interface on a display (e.g., 450 in FIG. 4D) that is separate from the touch-sensitive surface (e.g., 452 in FIG. 4D). In some of these embodiments, the touch-sensitive surface 452 has a primary axis (e.g., 456 in FIG. 4D) that corresponds to a primary axis (e.g., 458 in FIG. 4D) on the display 450. In accordance with these embodiments, a device that is in communication with the display 450 and the touch-sensitive surface 452 receives an input that corresponds to detection of contacts (e.g., 460 and 462 in FIG. 4D) with the touch-sensitive surface 452 at locations that correspond to respective locations on the display 450 (e.g., a contact 460 on the touch-sensitive surface 452 corresponds to a location 468 on the display 450 and a contact 462 on the touch-sensitive surface 452 corresponds to a location 470 on the display 450 in FIG. 4D) and the device sends instructions to the display 450 to perform operations on the display 450 in response to corresponding movements of the contacts on the touch-sensitive surface 452.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture may be replaced with a mouse click (e.g., instead of a contact) followed by movement of the cursor along the path of the swipe (e.g., instead of movement of the contact). Alternatively, a swipe gesture may be replaced by movement of a mouse where an object selection indicator moves in accordance with the movement of the mouse (e.g., the object selection indicator replaces a conventional cursor). As another example, a tap gesture may be replaced with a mouse click while the cursor is located over the location of the tap gesture (e.g., instead of detection of the contact followed by ceasing to detect the contact). Similarly, when multiple user inputs are simultaneously detected, it should be understood that multiple computer mice may be used simultaneously, or a mouse and finger contacts may be used simultaneously.

While the examples described in greater detail below are described with reference to a touch-sensitive surface 452 and a display 450 that are in communication with a computing device (e.g., portable multifunction device 100 in FIGS. 1A-1B or device 300 in FIG. 3), it should be understood that in accordance with some embodiments, the touch-sensitive surface and/or the display are integrated with the computing device, while in other embodiments one or more of the touch-sensitive surface and the display are separate from the computing device. Additionally, in some embodiments the computing device has an integrated display and/or an integrated touch-sensitive surface and is in communication with one or more additional displays and/or touch-sensitive surfaces that are separate from the computing device.

In some embodiments, all of the operations described below with reference to FIGS. 5A-5SS, 6A-6C, 7A-7C, 8A-8E and 9A-9D are performed on a single computing device with user interface navigation logic 480 (e.g., Computing Device A described below with reference to FIG. 4E). However, it should be understood that frequently multiple different computing devices are linked together to perform the operations described below with reference to FIGS. 5A-5SS, 6A-6C, 7A-7C, 8A-8E and 9A-9D (e.g., a computing device with user interface navigation logic 480 communicates with a separate computing device with a display 450 and/or a separate computing device with a touch-sensitive surface 452). In any of these embodiments, the computing device that is described below with reference to FIGS. 5A-5SS, 6A-6C, 7A-7C, 8A-8E and 9A-9D is the computing device (or devices) that contain(s) the user interface navigation logic 480. Additionally, it should be understood that the user interface navigation logic 480 could be divided between a plurality of distinct modules or computing devices in various embodiments; however, for the purposes of the description herein, the user interface navigation logic 480 will be primarily referred to as residing in a single computing device so as not to unnecessarily obscure other aspects of the embodiments.

In some embodiments, the user interface navigation logic 480 includes one or more modules (e.g., one or more event handlers 190, including one or more object updaters 177 and one or more GUI updaters 178 as described in greater detail above with reference to FIG. 1C) that receive interpreted inputs and, in response to these interpreted inputs, generate instructions for updating a graphical user interface in accordance with the interpreted inputs which are subsequently used to update the graphical user interface on a display. In some embodiments, an interpreted input in an input that has been detected (e.g., by a contact motion 130 in FIGS. 1A-1B and 3), recognized (e.g., by an event recognizer 180 in FIG. 1C) and/or prioritized (e.g., by event sorter 170 in FIG. 1C). In some embodiments, the interpreted inputs are generated by modules at the computing device (e.g., the computing device receives raw contact input data so as to identify gestures from the raw contact input data). In some embodiments, some or all of the interpreted inputs are received by the computing device as interpreted inputs (e.g., a computing device that includes the touch-sensitive surface 452 processes raw contact input data so as to identify gestures from the raw contact input data and sends information indicative of the gestures to the computing device that includes the user interface navigation logic 480).

In some embodiments, both the display 450 and the touch-sensitive surface 452 are integrated with the computing device (e.g., Computing Device A in FIG. 4E) that contains the user interface navigation logic 480. For example, the computing device may be a desktop computer or laptop computer with an integrated display (e.g., 340 in FIG. 3) and touchpad (e.g., 335 in FIG. 3). As another example, the computing device may be a portable multifunction device 100 (e.g., a smartphone, PDA, tablet computer, etc.) with a touch screen (e.g., 112 in FIG. 2).

In some embodiments, the touch-sensitive surface 452 is integrated with the computing device while the display 450 is not integrated with the computing device (e.g., Computing Device B in FIG. 4E) that contains the user interface navigation logic 480. For example, the computing device may be a device 300 (e.g., a desktop computer or laptop computer) with an integrated touchpad (e.g., 335 in FIG. 3) connected (via wired or wireless connection) to a separate display (e.g., a computer monitor, television, etc.). As another example, the computing device may be a portable multifunction device 100 (e.g., a smartphone, PDA, tablet computer, etc.) with a touch screen (e.g., 112 in FIG. 2) connected (via wired or wireless connection) to a separate display (e.g., a computer monitor, television, etc.).

In some embodiments, the display 450 is integrated with the computing device while the touch-sensitive surface 452 is not integrated with the computing device (e.g., Computing Device C in FIG. 4E) that contains the user interface navigation logic 480. For example, the computing device may be a device 300 (e.g., a desktop computer, laptop computer, television with integrated set-top box) with an integrated display (e.g., 340 in FIG. 3) connected (via wired or wireless connection) to a separate touch-sensitive surface (e.g., a remote touchpad, a portable multifunction device, etc.). As another example, the computing device may be a portable multifunction device 100 (e.g., a smartphone, PDA, tablet computer, etc.) with a touch screen (e.g., 112 in FIG. 2) connected (via wired or wireless connection) to a separate touch-sensitive surface (e.g., a remote touchpad, another portable multifunction device with a touch screen serving as a remote touchpad, etc.).

In some embodiments, neither the display 450 nor the touch-sensitive surface 452 is integrated with the computing device (e.g., Computing Device D in FIG. 4E) that contains the user interface navigation logic 480. For example, the computing device may be a stand-alone computing device 300 (e.g., a desktop computer, laptop computer, console, set-top box, etc.) connected (via wired or wireless connection) to a separate touch-sensitive surface (e.g., a remote touchpad, a portable multifunction device, etc.) and a separate display (e.g., a computer monitor, television, etc.). As another example, the computing device may be a portable multifunction device 100 (e.g., a smartphone, PDA, tablet computer, etc.) with a touch screen (e.g., 112 in FIG. 2) connected (via wired or wireless connection) to a separate touch-sensitive surface (e.g., a remote touchpad, another portable multifunction device with a touch screen serving as a remote touchpad, etc.).

Figure 4E:
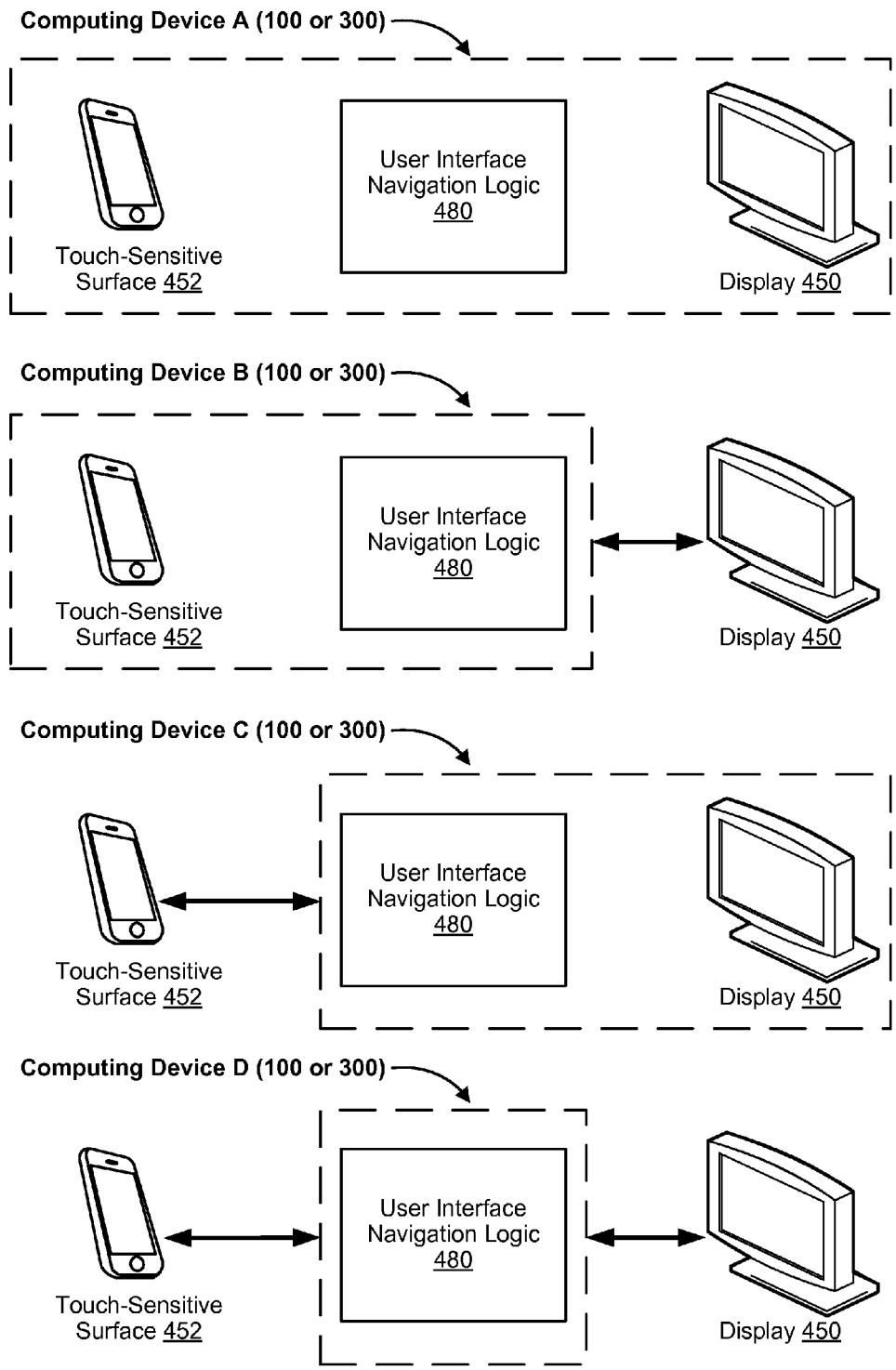
FIG. 4E illustrates exemplary computing devices that are in communication with a display and touch-sensitive surface where, for at least a subset of the computing devices the display and/or touch-sensitive surface is integrated into the computing device in accordance with some embodiments.

Attention is now directed towards embodiments of user interfaces ("UI") and associated processes that may be implemented with a computing device that communicates with and/or includes a display and a touch-sensitive surface, such as one of Computing Devices A-D in FIG. 4E.

Figure 5A:
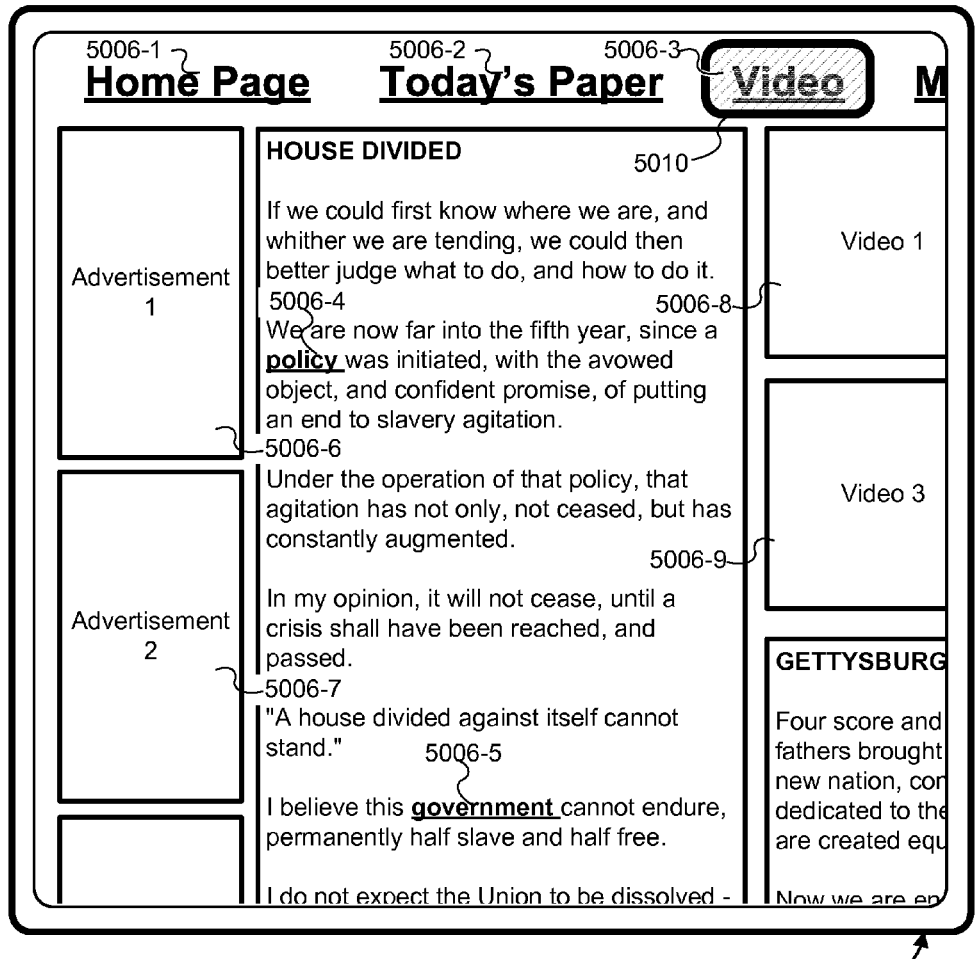
FIGS. 5A-5SS illustrate exemplary user interfaces for navigating through a user interface using a dynamic object selection indicator in accordance with some embodiments.
Figure 5B:
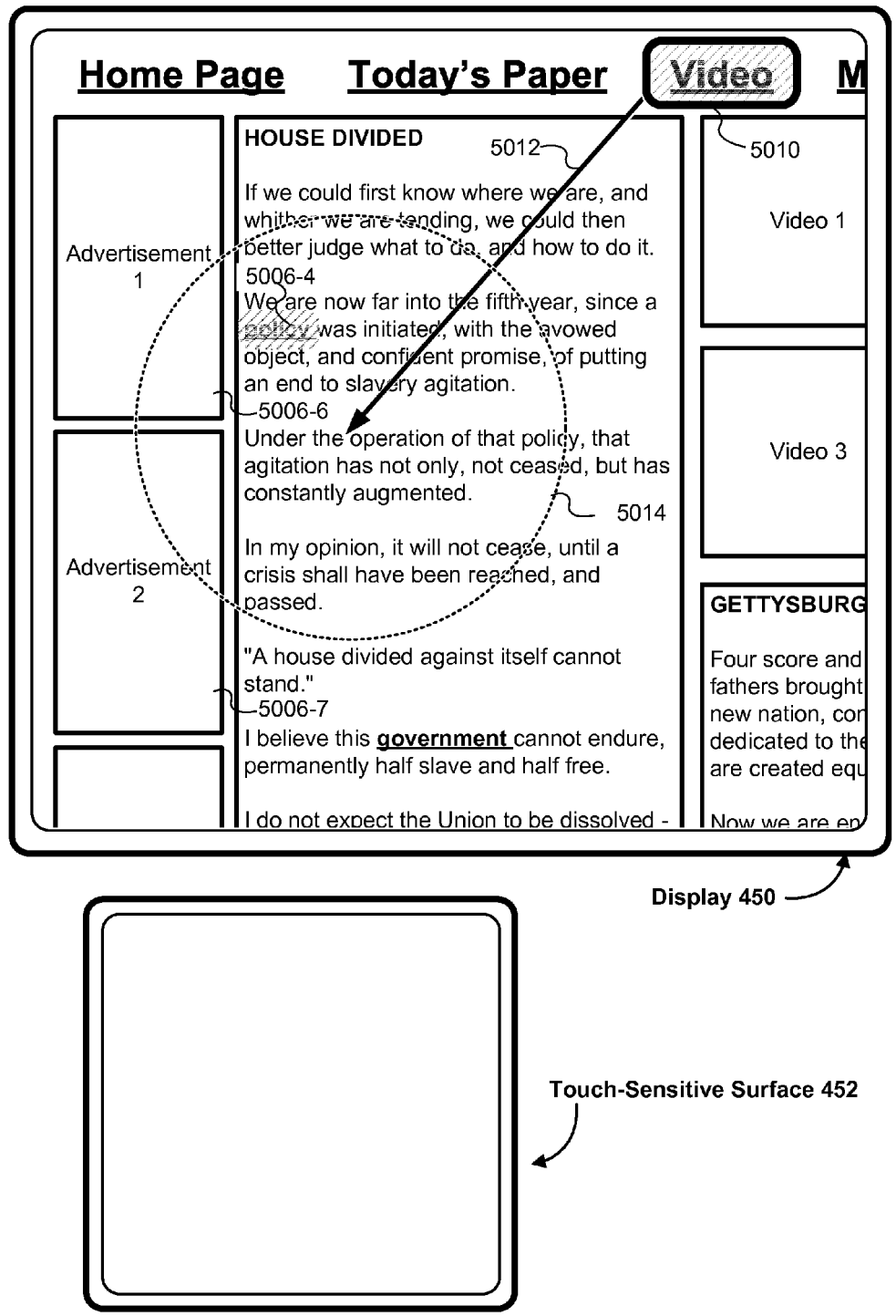
Figure 5C:
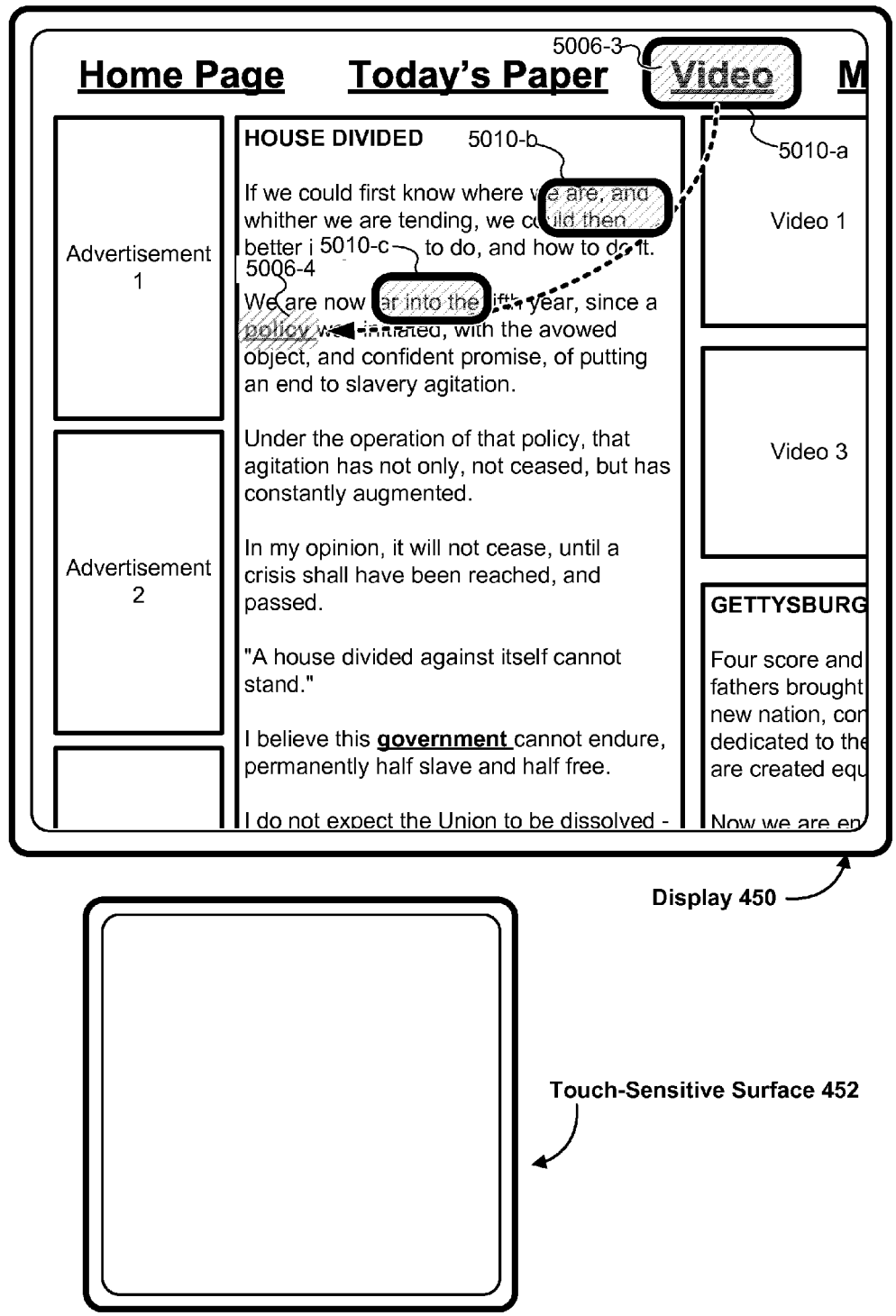
Figure 5D:
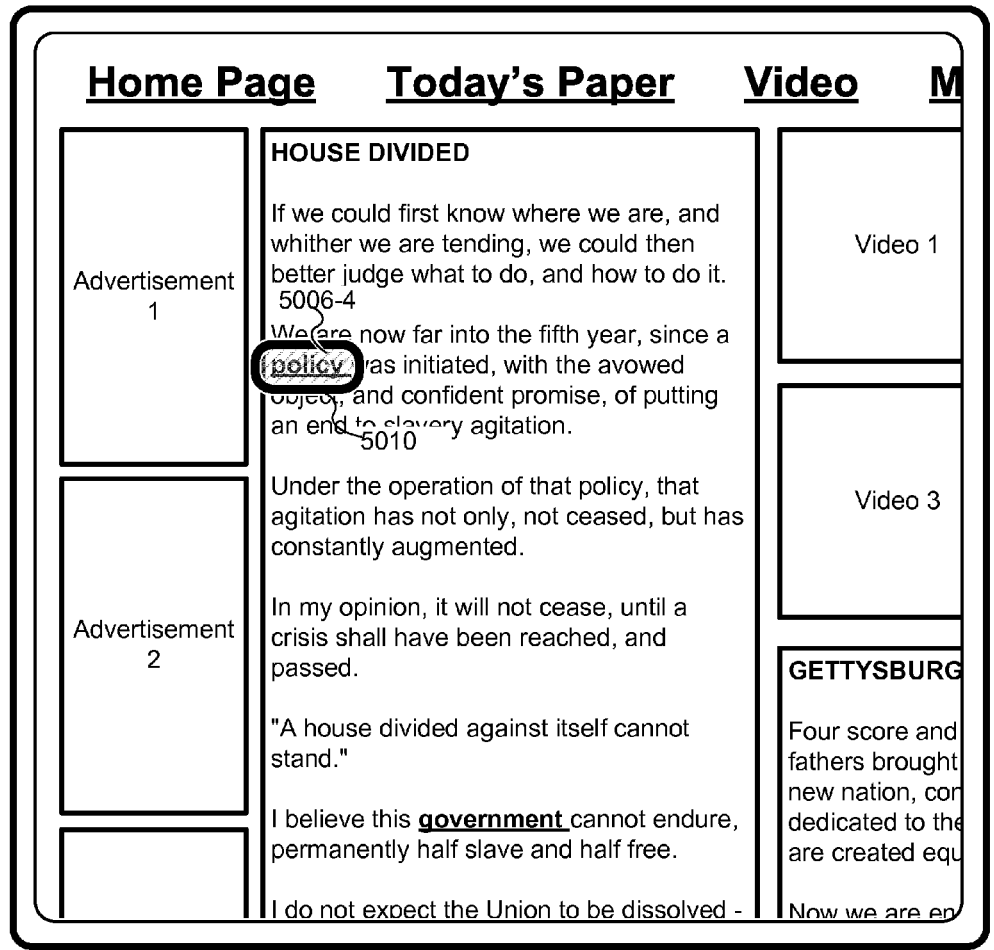
Figure 5D:
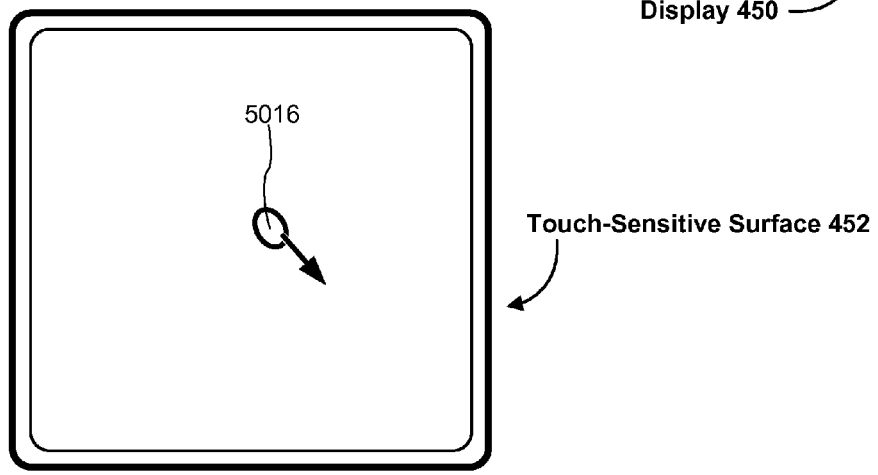
Figure 5E:
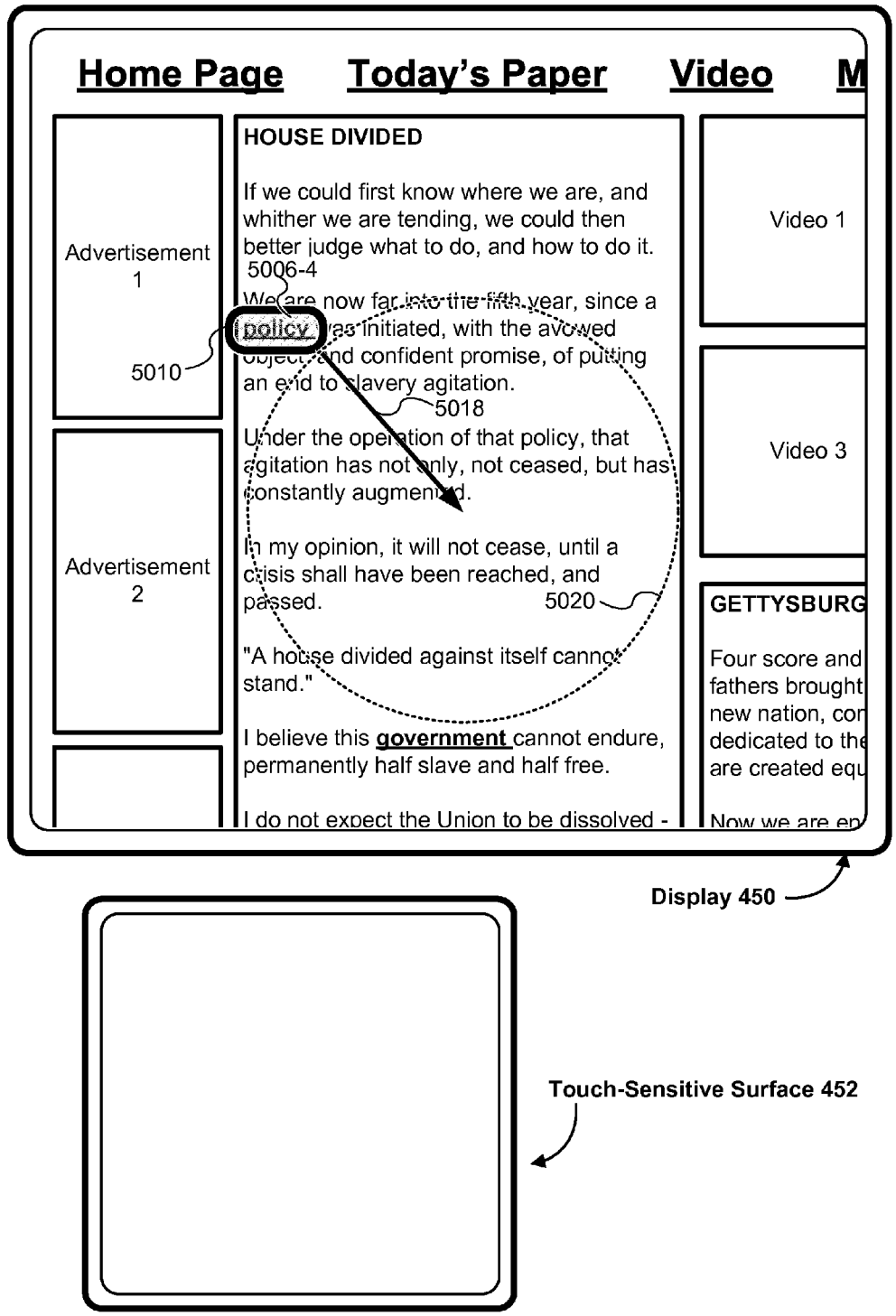
Figure 5F:
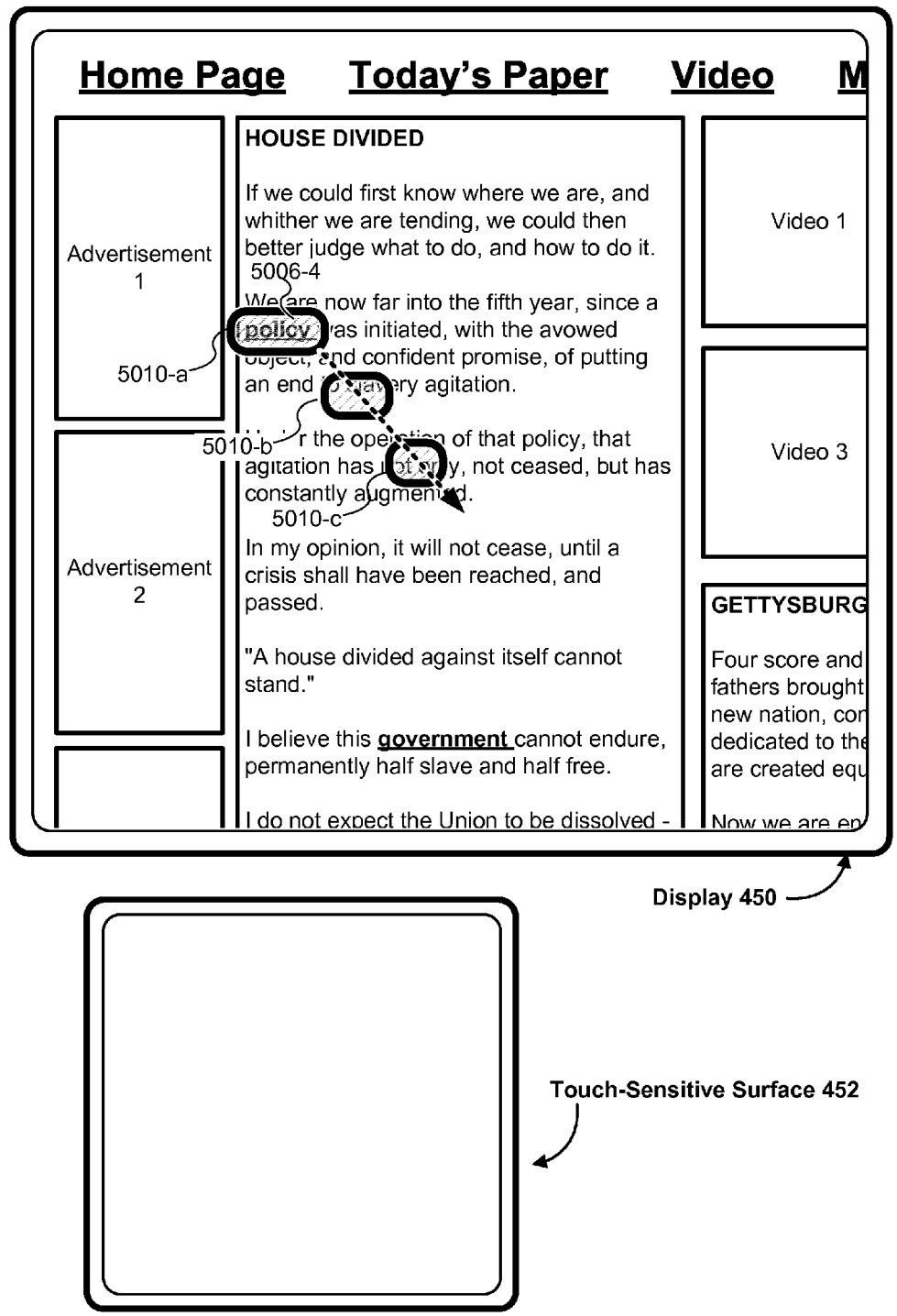
Figure 5G:
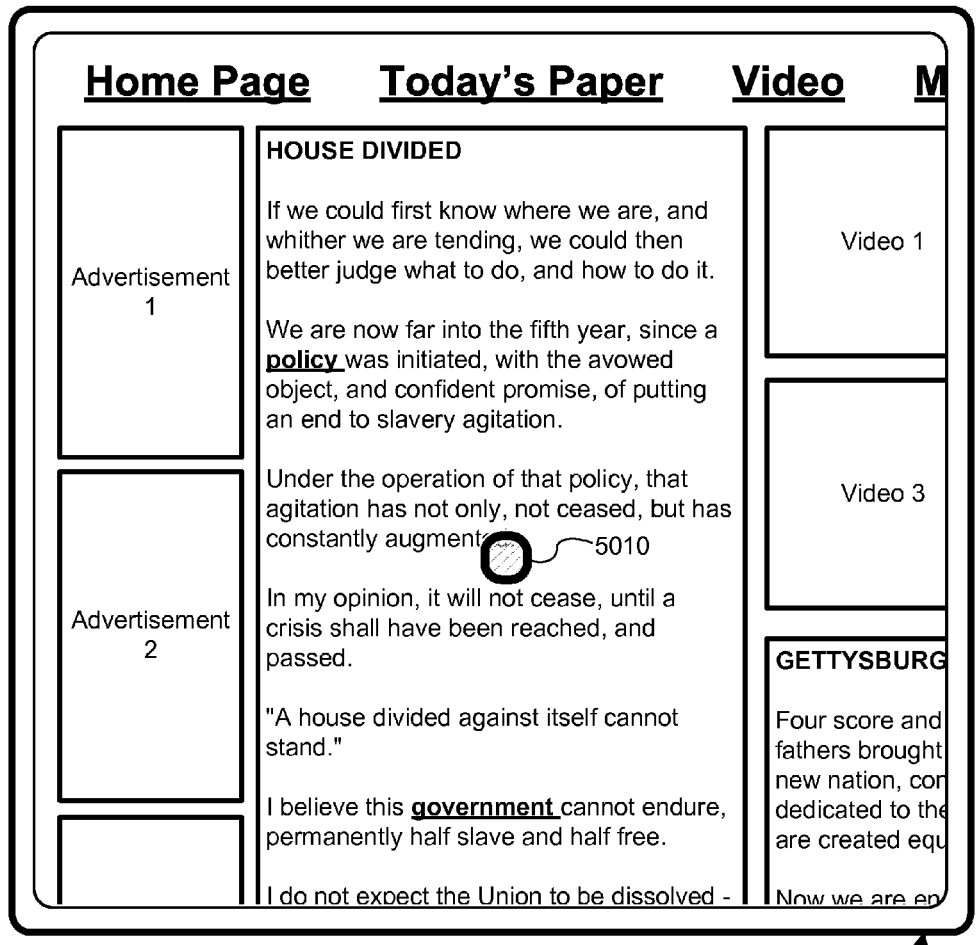
Figure 5G:
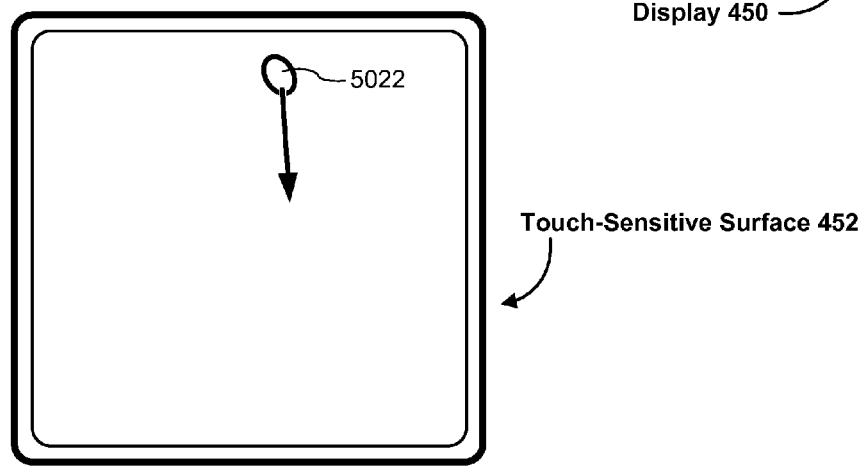
Figure 5H:
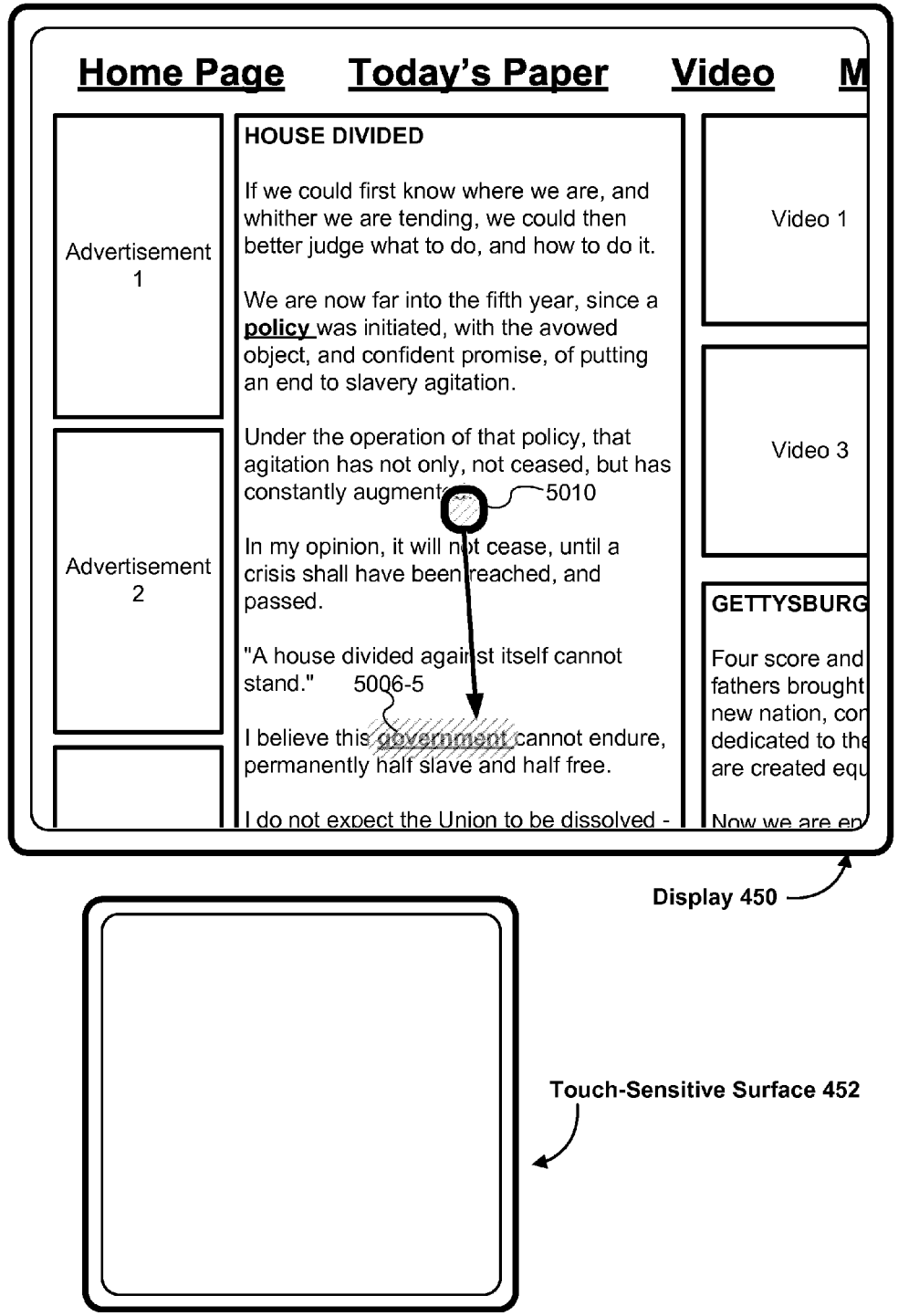
Figure 5I:
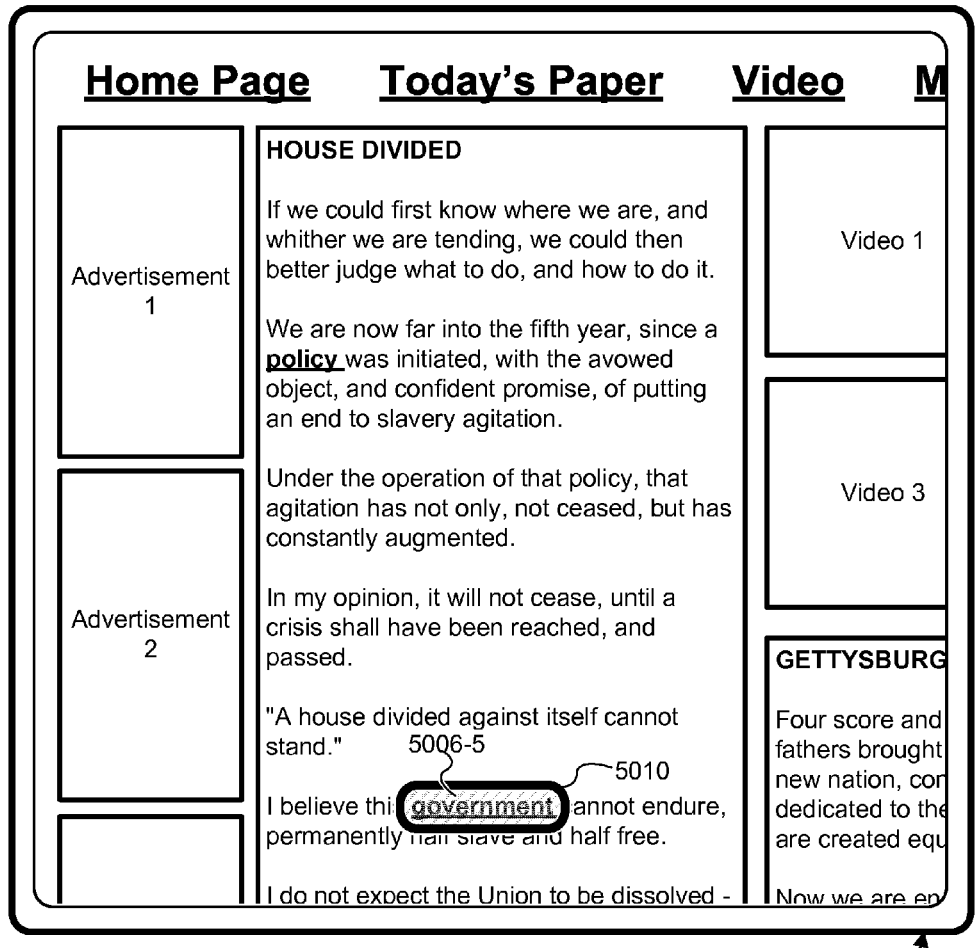
Figure 5J:
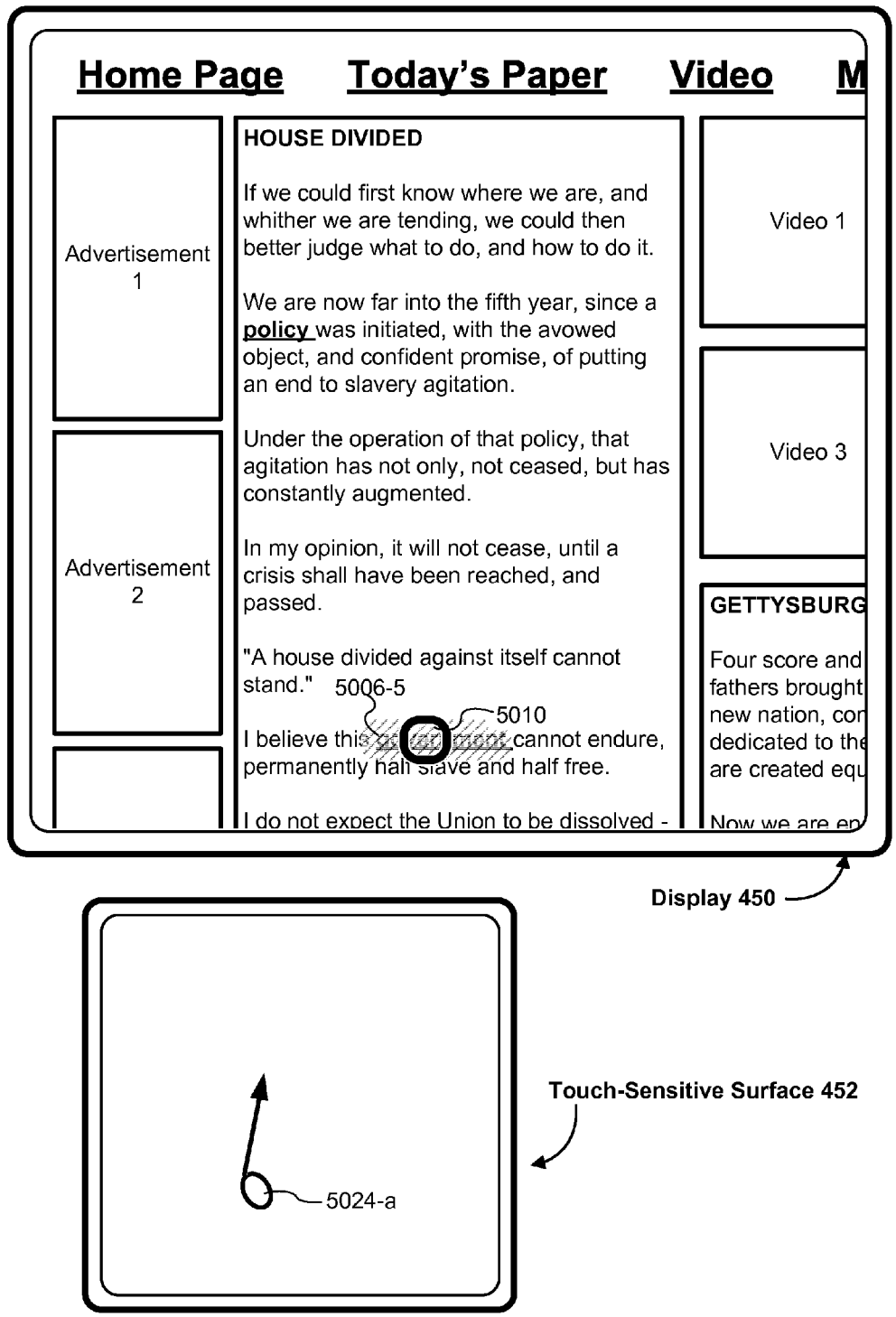
Figure 5K:
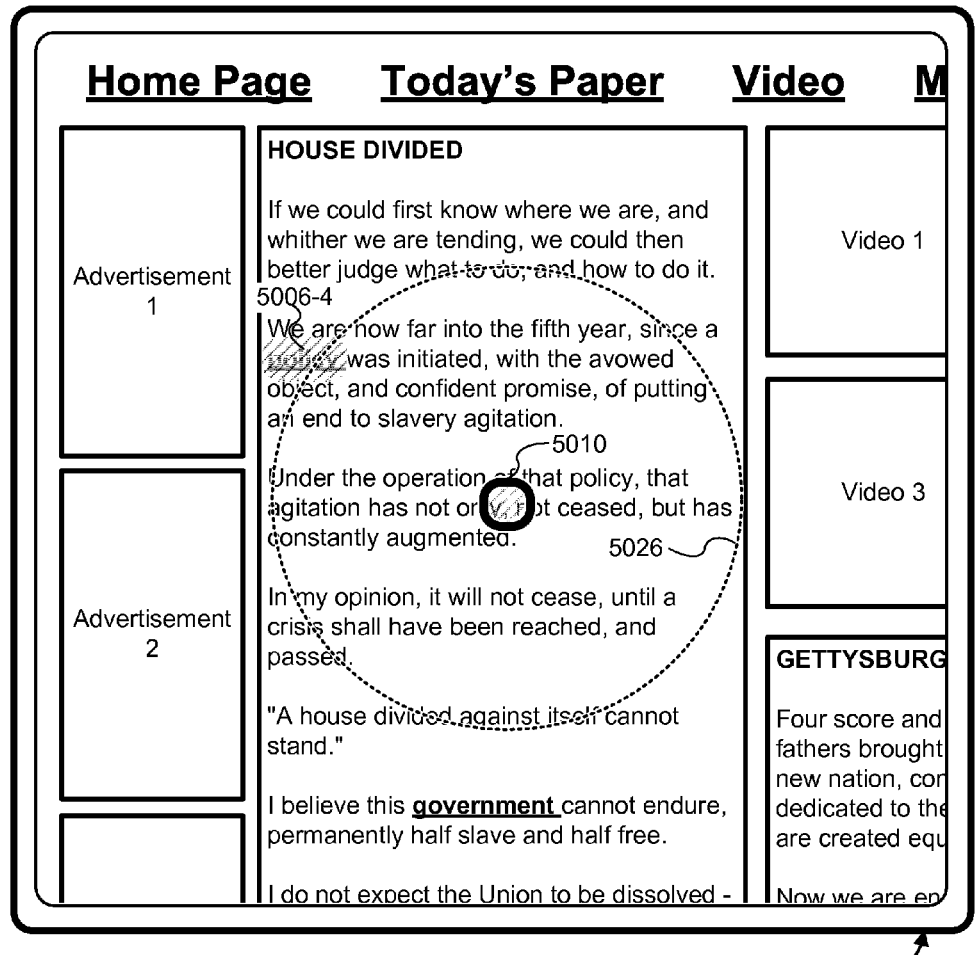
Figure 5K:
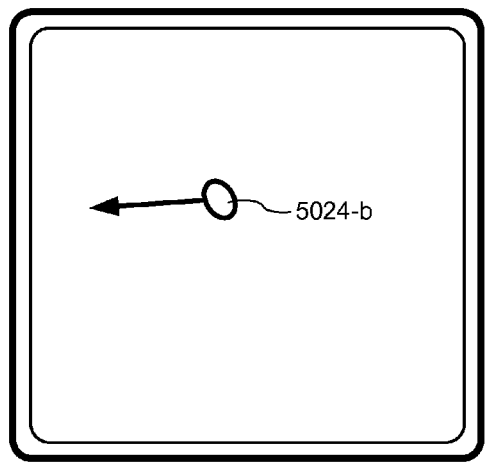
Figure 5L:
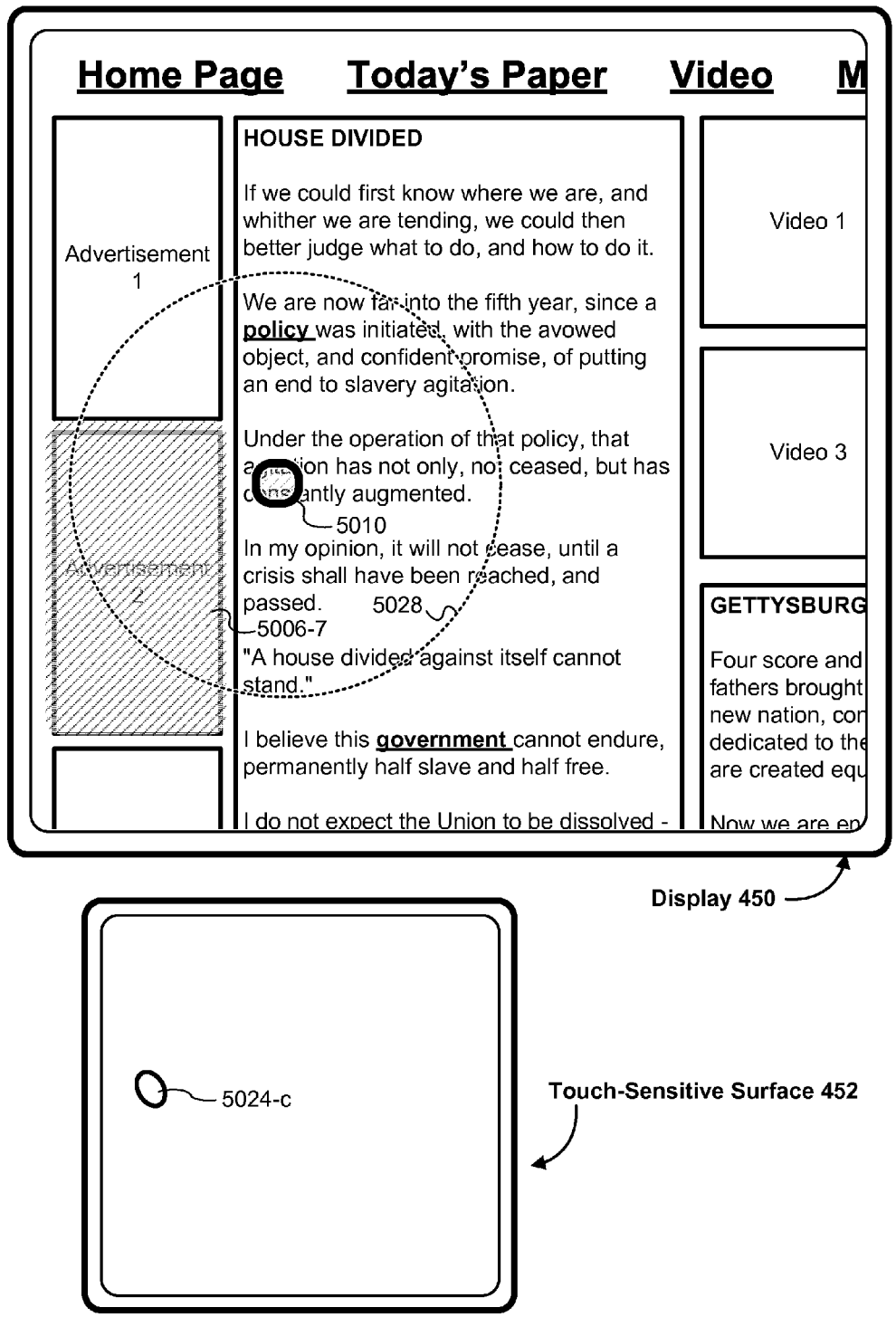
Figure 5M:
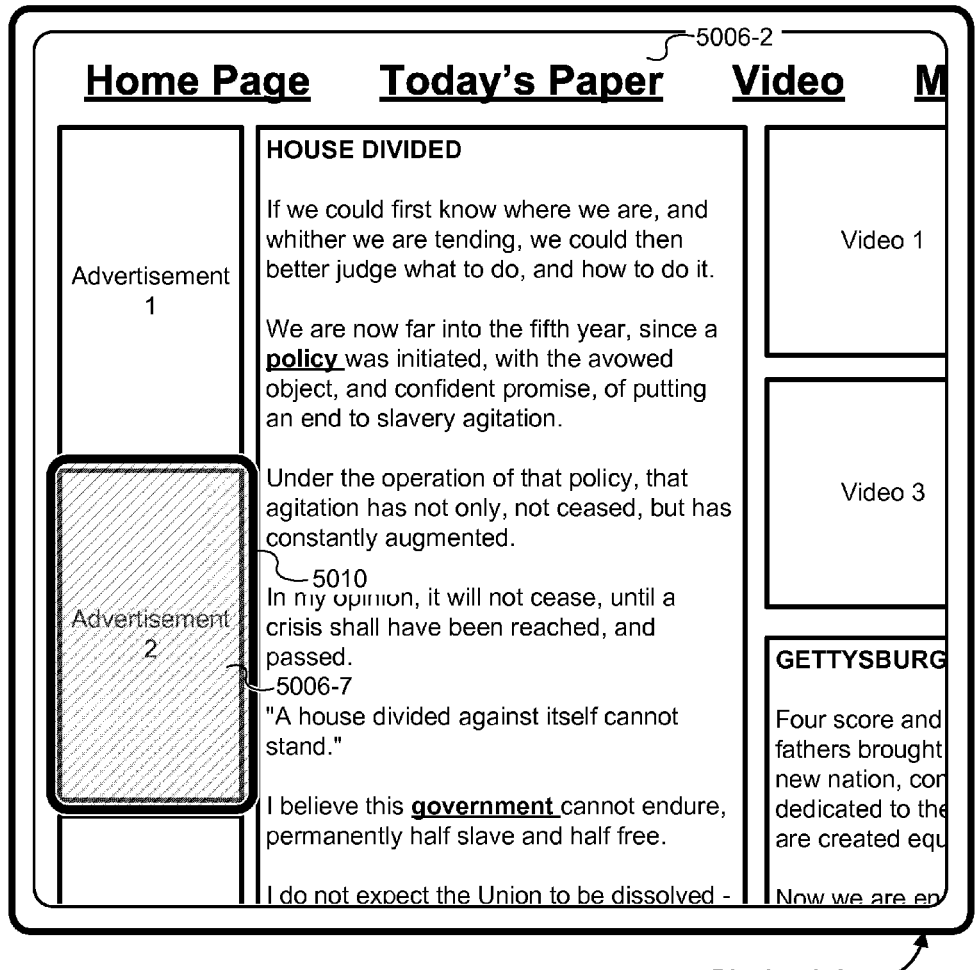
Figure 5M:
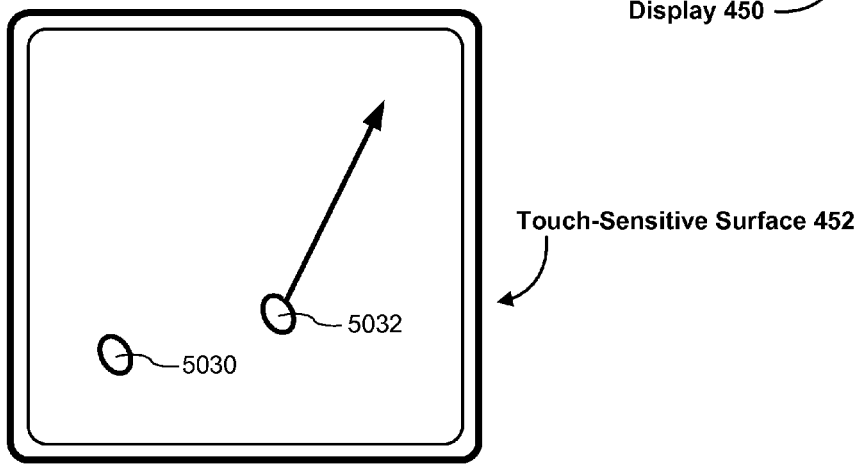
Figure 5N:
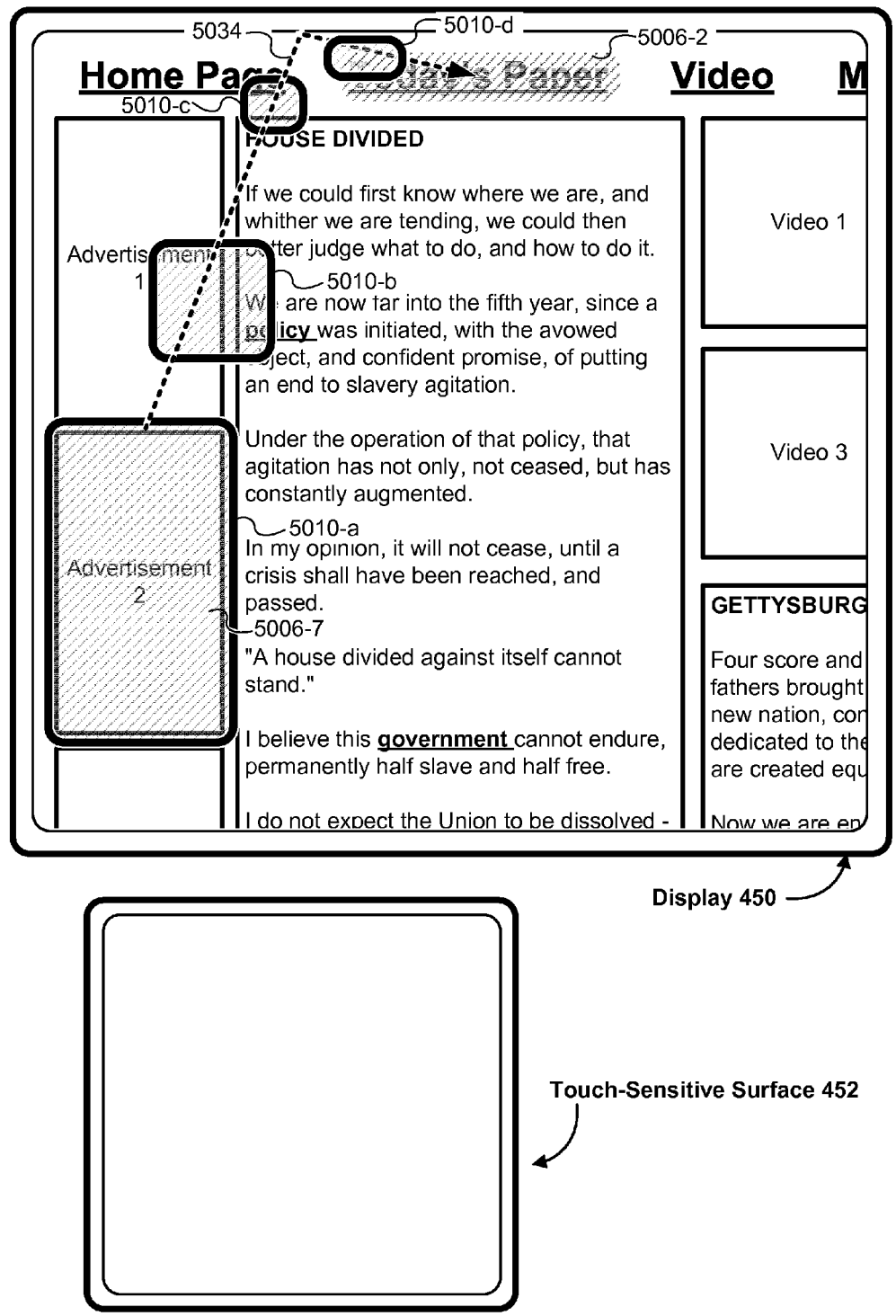
Figure 5O:
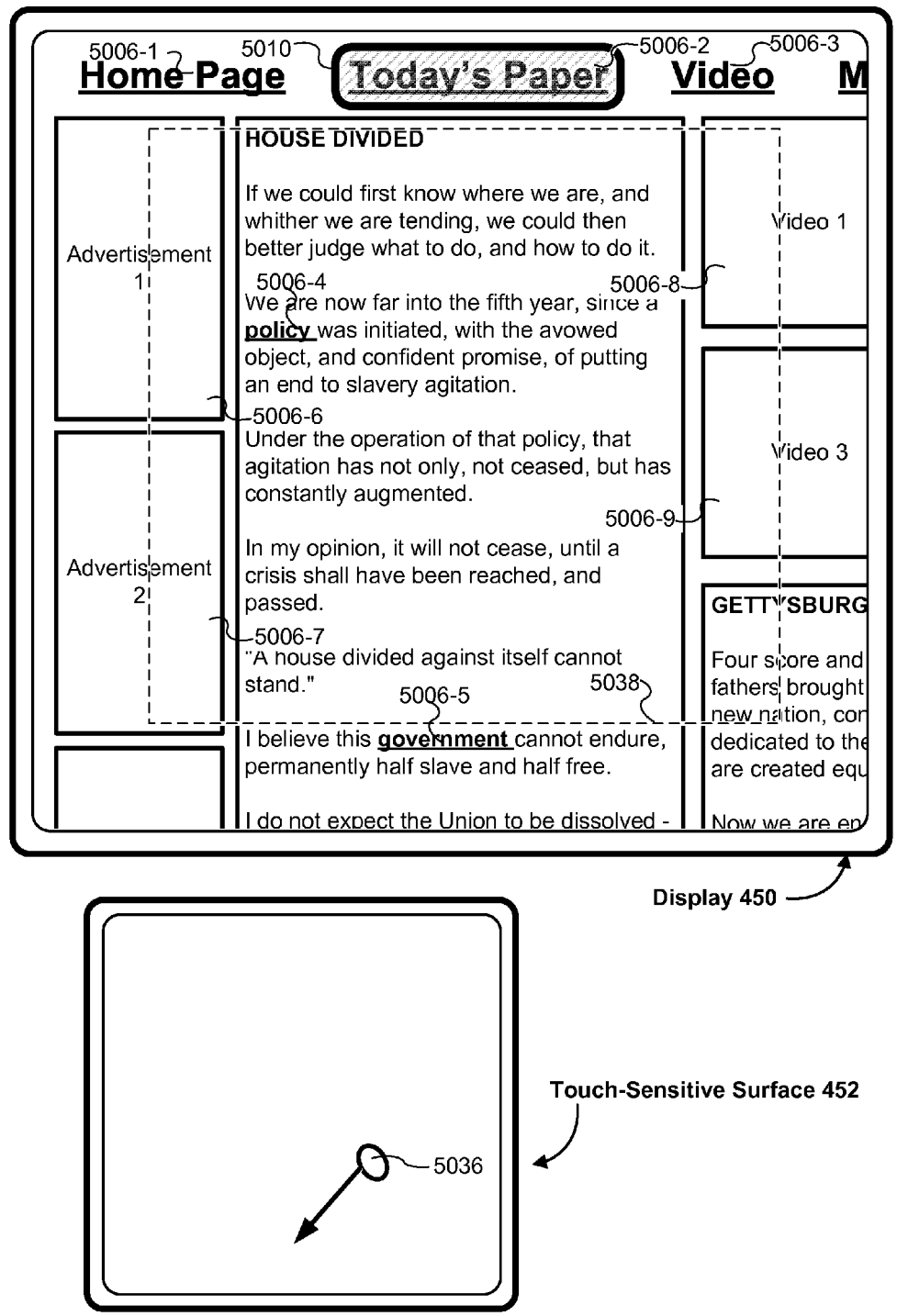
Figure 5P:
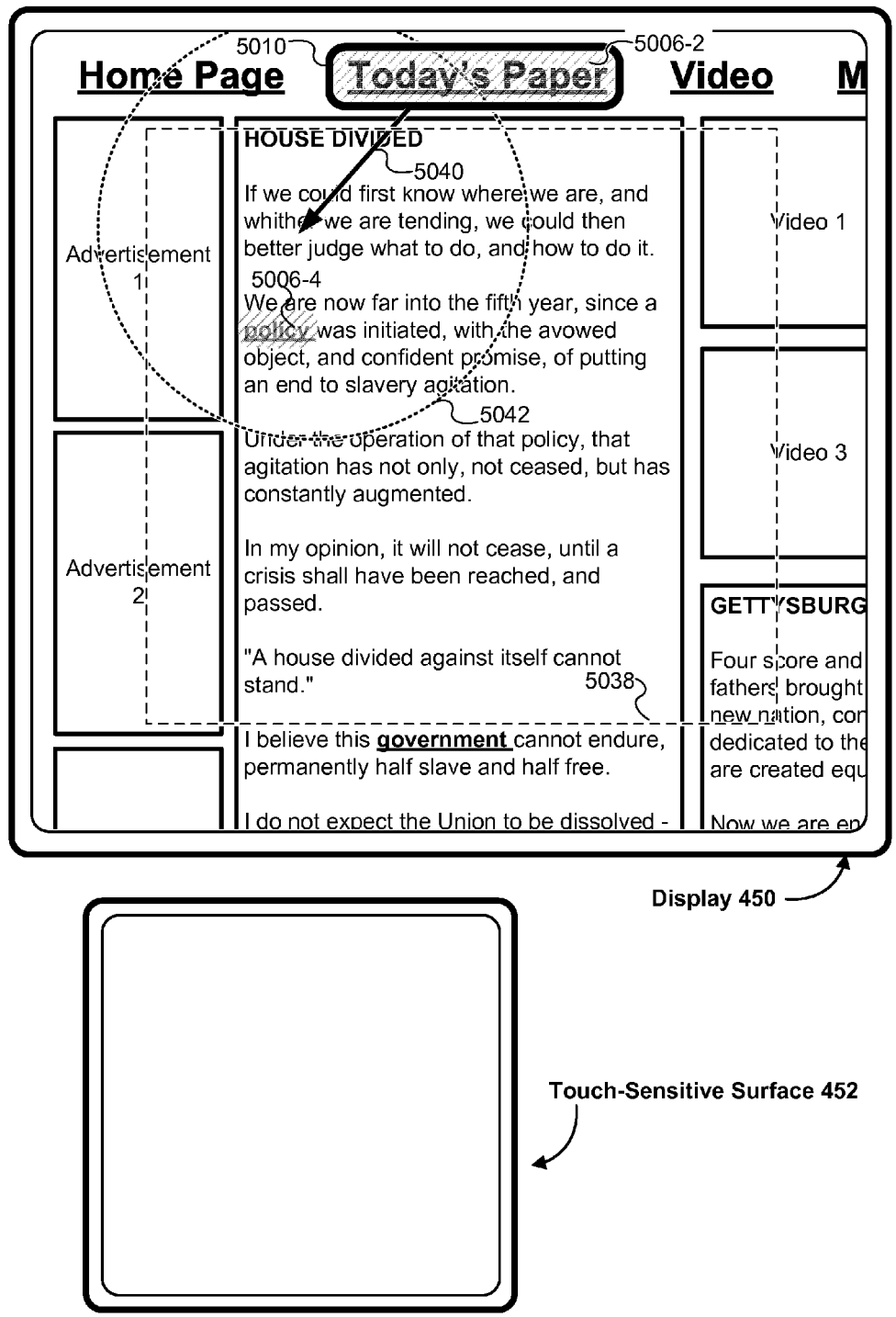
Figure 5Q:
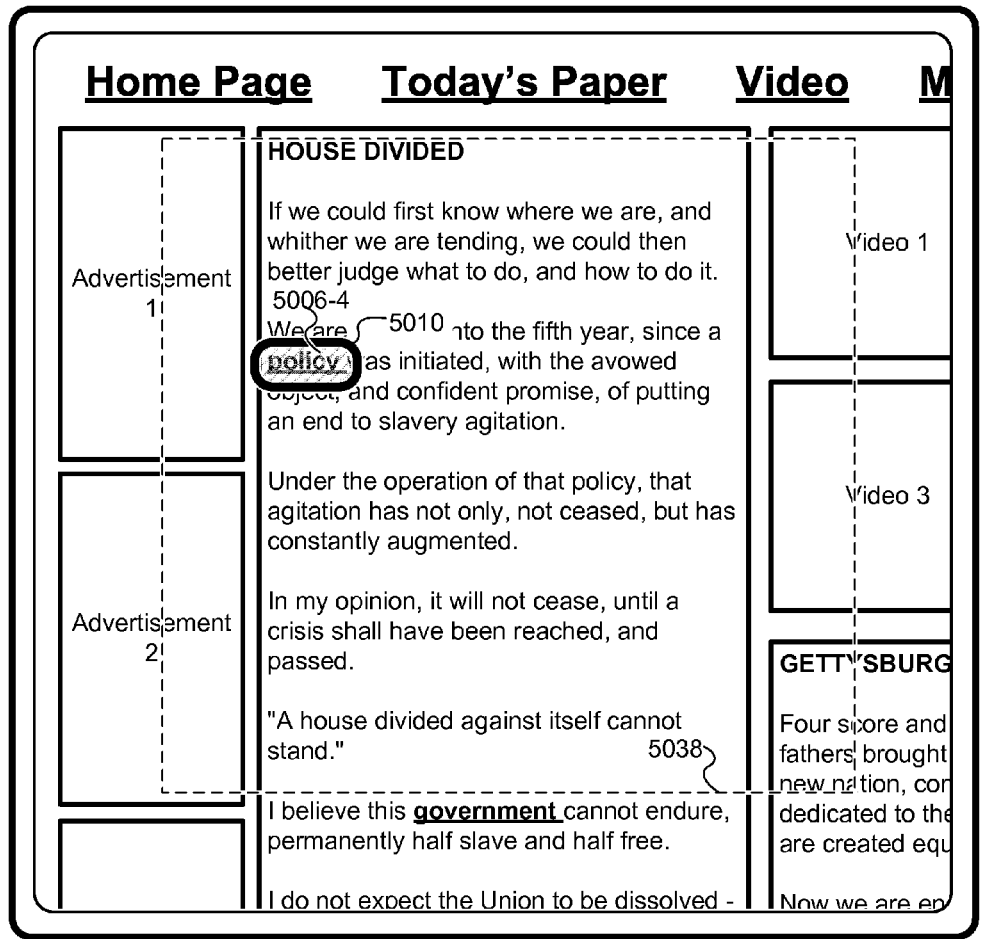
Figure 5Q:
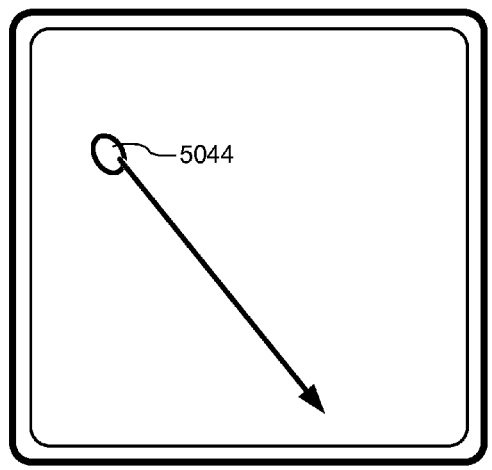
Figure 5R:
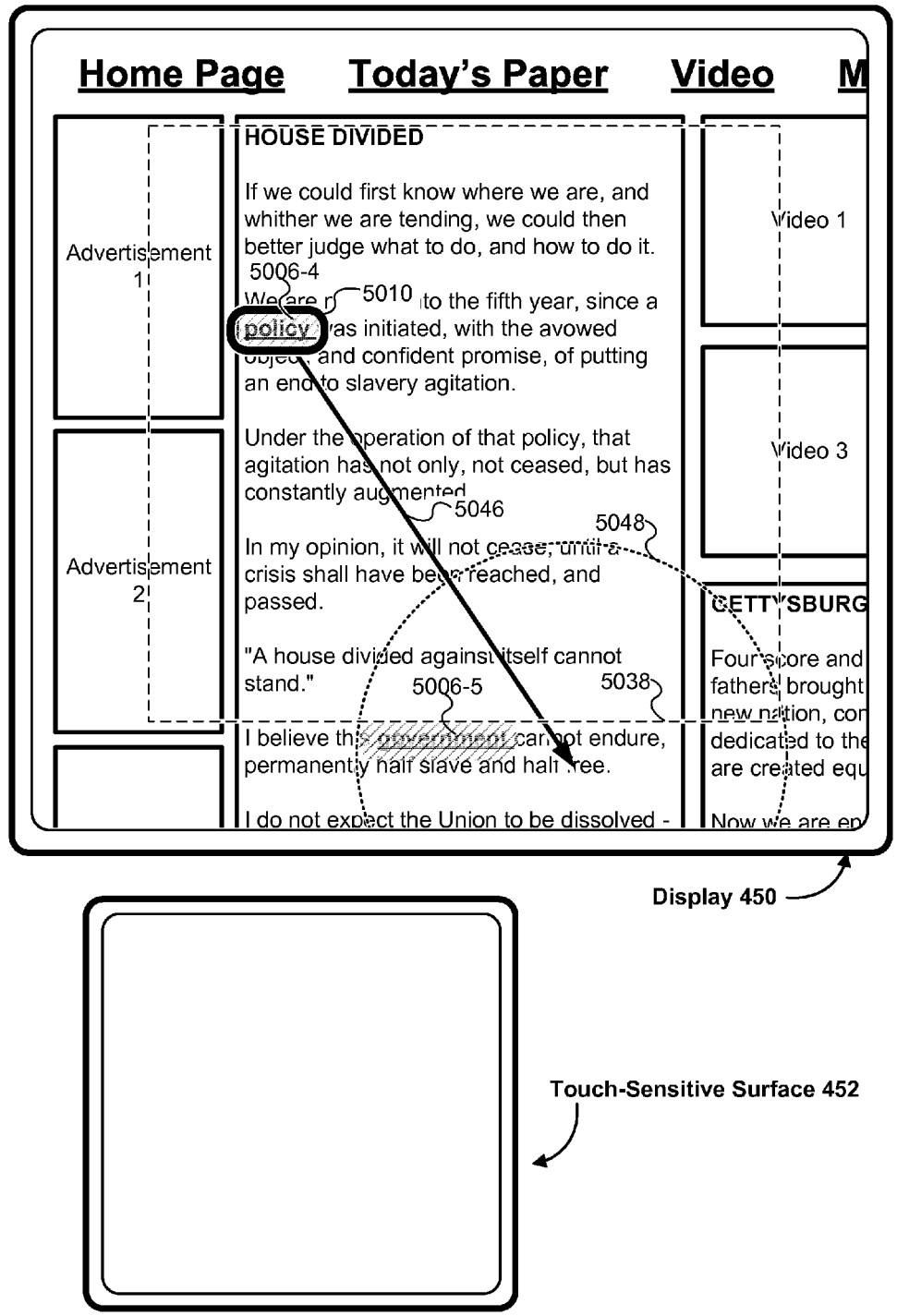
Figure 5S:
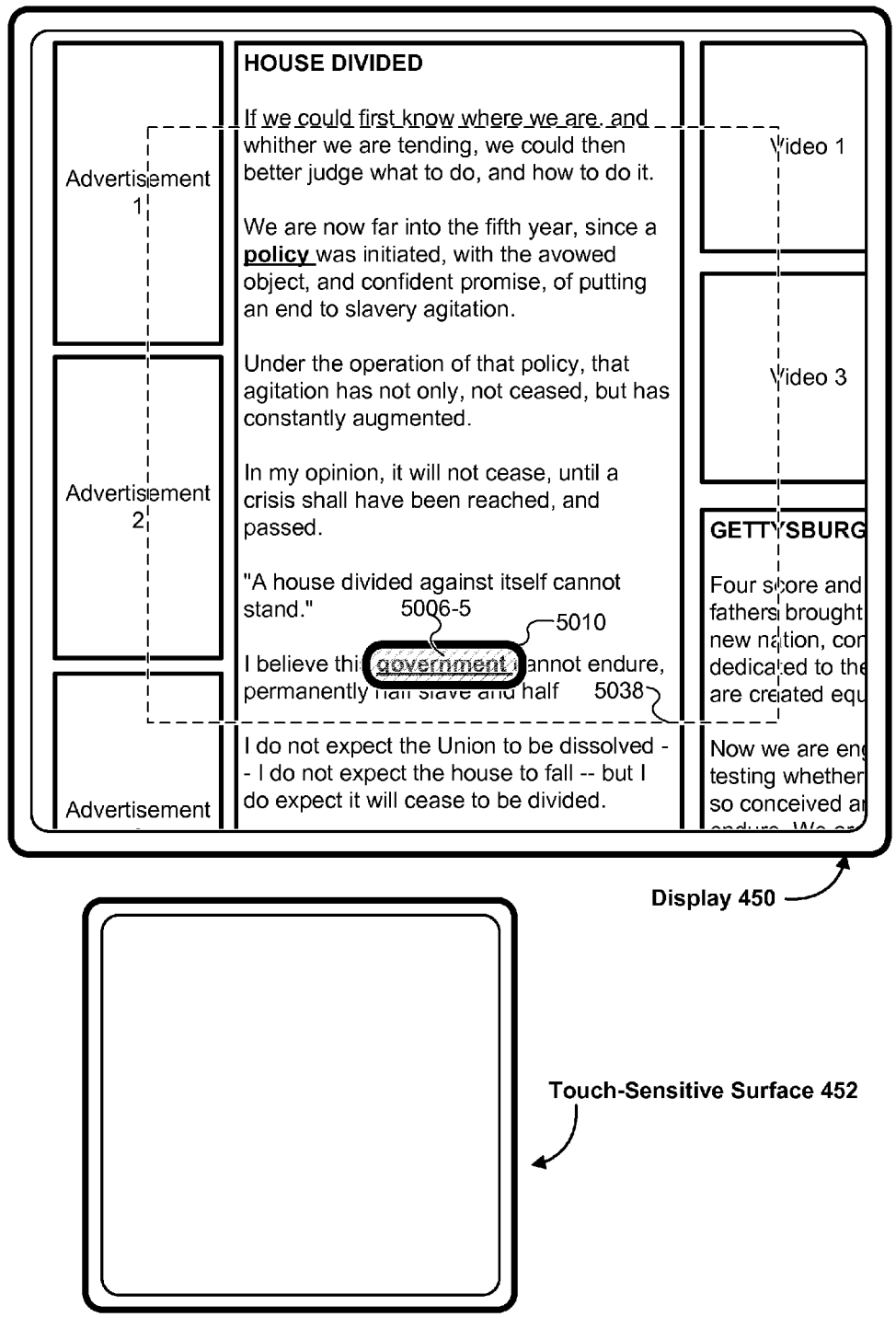

FIGS. 5A-5SS illustrate exemplary user interfaces for using a dynamic object selection indicator to navigate through a user interface in accordance with some embodiments. The user interfaces in these figures are used to illustrate the processes described below, including the processes in FIGS. 6A-6C, 7A-7C, 8A-8E and 9A-9D.

FIG. 5A illustrates a user interface (e.g., a webpage) having a plurality of selectable objects (e.g., 5006-1, 5006-2, 5006-3, 5006-4, 5006-5, 5006-6, 5006-7, 5006-8 and 5006-9) that is displayed on a display 450. FIGS. 5A-5D illustrate the movement of an object selection indicator 5010 across the display 450 from a first selectable object to a target selectable object. In response to a swipe gesture (e.g., contact 5008 and subsequent movement of the contact in FIG. 5A) that is detected on a touch-sensitive surface 452 a computing device instructs the display 450 to move an object selection indicator 5010 across the display 450. In FIG. 5A the object selection indicator 5010 is displayed at a first selectable object 5006-3. In FIG. 5B, after detecting the swipe gesture that includes contact 5008, the computing device determines a trajectory 5012 of the object selection indicator 5010, determines a radius 5014 around a termination point of the trajectory 5012 and identifies a target selectable object 5006-4 that is within the radius 5014. In FIGS. 5C-5D, the display shows an animation of the object selection indicator 5010 moving from the first selectable object 5006-3 to the target selectable object 5006-4 (e.g., from a first location of the object selection indicator 5010-*a* to a second location of the object selection indicator 5010-*b* to a third location of the object selection indicator 5010-*c* in FIG. 5C and finally to a fourth location of the object selection indicator 5010 in FIG. 5D).

FIGS. 5D-5G illustrate the movement of an object selection indicator from a location proximate to a selectable object to a location on the display 450 that is not associated with any selectable object. In response to a swipe gesture (e.g., contact 5016 and subsequent movement of the contact in FIG. 5D) that is detected on a touch-sensitive surface 452 a computing device instructs the display 450 to move an object selection indicator 5010 across the display 450. In FIG. 5D the object selection indicator 5010 is displayed at a location proximate to a selectable object 5006-4. In FIG. 5E, after detecting the swipe gesture that includes contact 5008, the computing device determines a trajectory 5018 of the object selection indicator 5010, determines a radius 5020 around a termination point of the trajectory 5018 and fails to identify any target selectable object that is within the radius 5020. In FIGS. 5F-5G, the display shows an animation of the object selection indicator 5010 moving from the selectable object 5006-3 towards a termination point of the trajectory 5018 (e.g., from a first location of the object selection indicator 5010-a to a second location of the object selection indicator 5010-b to a third location of the object selection indicator 5010-c in FIG. 5F and finally to a fourth location of the object selection indicator 5010 in FIG. 5G).

FIGS. 5G-5I illustrate the movement of an object selection indicator from a location on the display 450 that is not associated with any selectable object to a target selectable object. In response to a swipe gesture (e.g., contact 5022 and subsequent movement of the contact in FIG. 5G) that is detected on a touch-sensitive surface 452 a computing device instructs the display 450 to move an object selection indicator 5010 across the display 450. In FIG. 5G, the object selection indicator 5010 is displayed at a location on the display. In FIG. 5H, after detecting the swipe gesture that includes contact 5022, the computing device identifies a target selectable object (e.g., 5006-5 in FIG. 5H). In FIGS. 5H-5I, the display shows an animation of the object selection indicator 5010 moving from the location that does not correspond to any selectable object indicator (e.g., 5010 in FIG. 5H) to a location that corresponds to the target selectable object (e.g., the object selection indicator 5010 is displayed at a location proximate to the target selectable object 5006-5 in FIG. 5I).

FIGS. 5I-5M illustrate the movement of an object selection indicator 5010 across the display 450 from a first selectable object to a target selectable object. In response to a tap and drag gesture (e.g., contact 5024 and subsequent movement of the contact in FIGS. 5I-5L) that is detected on a touch-sensitive surface 452 a computing device instructs the display 450 to move an object selection indicator 5010 across the display 450. In FIG. 5I, the object selection indicator 5010 is displayed at a first selectable object 5006-5. In FIG. 5J, after the contact 5024 has been detected for more than a predetermined period of time, the object selection indicator 5010 is displayed at a predefined size. While the contact is moved around the touch-sensitive surface 452 (e.g., from a first location of the contact 5024-a in FIGS. 5I-5J to a second location of the contact 5024-b in FIG. 5K to a third location of the contact 5024-c in FIG. 5L), the object selection indicator continues to be displayed at the predefined size as it moves around the user interface on the display 450 in accordance with the movement of the contact (e.g., from a first location 5010 in FIG. 5J to a second location of the object selection indicator 5010 in FIG. 5K to a third location of the object selection indicator 5010 in FIG. 5L). As the object selection indicator 5010 is being moved around the user interface, the computing device identifies target selectable objects that are within a predefined radius from the object selection indicator (e.g., target selectable object 5006-4 that is within a predefined radius 5026 of the target selectable object 5010 in FIG. 5K and target selectable object 5006-7 that is within a predefined radius 5028 of the target selectable object 5010 in FIG. 5L). After detecting an end of the tap and drag gesture (e.g., detecting liftoff of the contact 5024-c in FIG. 5M, the display shows an animation of the object selection indicator moving and changing size so as to encompass the current target selectable object (e.g., the object selection indicator moves from a current location and size as illustrated by the object selection indicator 5010 in FIG. 5L to an updated location and size as illustrated by the object selection indicator 5010 in FIG. 5M).

In FIG. 5M, while the current target selectable object (e.g., 5006-7 in FIG. 5M) is selected, an activation input (e.g., tap gesture 5030 on the touch-sensitive surface 452) is detected and the computing device performs an action associated with the current target selectable object (e.g., display a webpage associated with the "advertisement 2" selectable object, not shown).

FIGS. 5M-5O illustrate the movement of an object selection indicator 5010 across the display 450 from a first selectable object to a target selectable object. In response to a swipe gesture (e.g., contact 5032 and subsequent movement of the contact in FIG. 5M) that is detected on a touch-sensitive surface 452 a computing device instructs the display to move an object selection indicator 5010 across the display 450. In FIG. 5M, the object selection indicator 5010 is displayed at a first selectable object 5006-7. In FIG. 5N, after detecting the swipe gesture that includes contact 5032, the computing device determines a trajectory 5034 of the object selection indicator 5010 and identifies a target selectable object 5006-2. In FIGS. 5N-5O, the display shows an animation of the object selection indicator 5010 moving from the first selectable object 5006-7 to the target selectable object 5006-2 (e.g., from a first location of the object selection indicator 5010-a to a second location of the object selection indicator 5010-b to a third location of the object selection indicator 5010-c to a fourth location of the object selection indicator 5010-d in FIG. 5N and finally to a fifth location of the object selection indicator 5010 in FIG. 5O).

FIGS. 5O-5Q illustrate the movement of an object selection indicator 5010 across the display 450 from a first selectable object to a target selectable object where the target selectable object is within a predefined region (e.g., region 5038 in FIGS. 5O-5Q) of the display 450. In response to a swipe gesture (e.g., contact 5036 and subsequent movement of the contact in FIG. 5O) that is detected on a touch-sensitive surface 452, a computing device instructs the display 450 to move an object selection indicator 5010 across the display 450. In FIG. 5O, the object selection indicator 5010 is displayed at a first selectable object 5006-2. In FIG. 5P, after detecting the swipe gesture that includes contact 5036, the computing device determines a trajectory 5040 of the object selection indicator 5010, determines a radius 5042 around a termination point of the trajectory 5040 and identifies a target selectable object 5006-4 that is within the radius 5042. In FIGS. 5P-5Q, the display shows an animation of the object selection indicator 5010 moving from the first selectable object 5006-2 to the target selectable object 5006-4 (e.g., from a first location of the object selection indicator 5010 in FIG. 5P a second location of the object selection indicator 5010 in FIG. 5Q), without scrolling the user interface on the display 450.

Figure 5T:
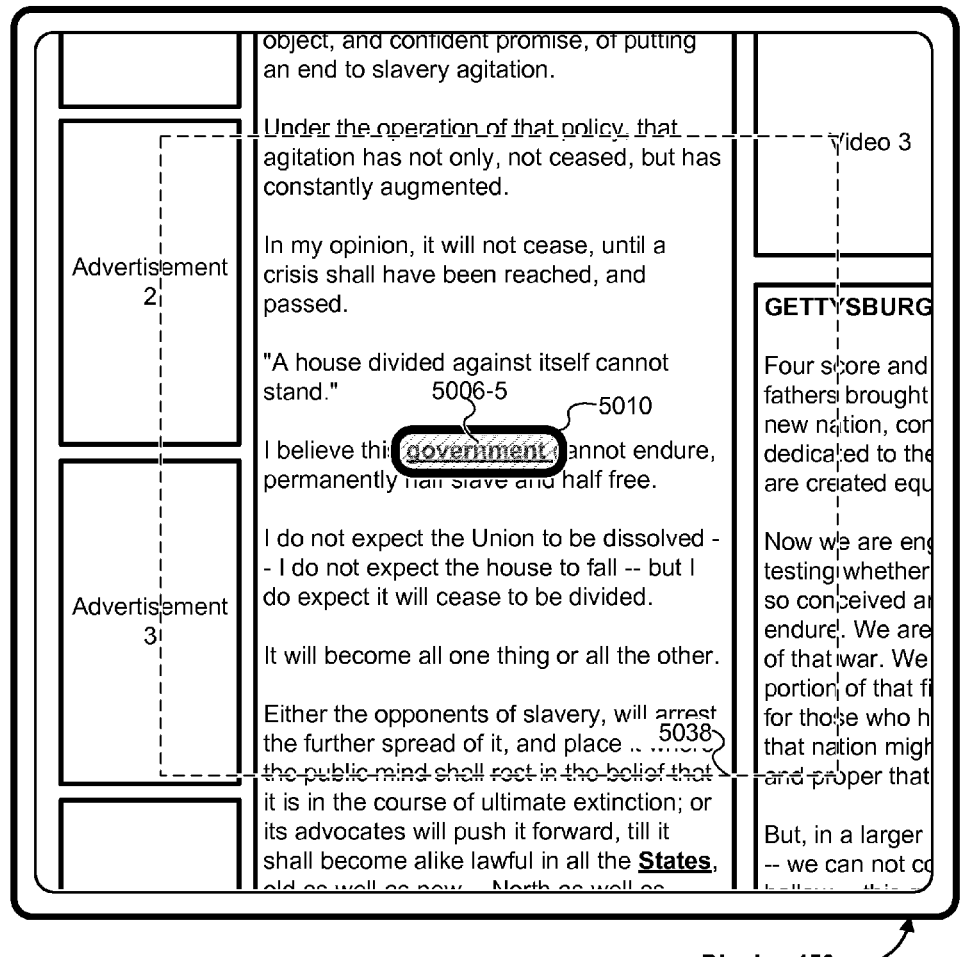
Figure 5T:
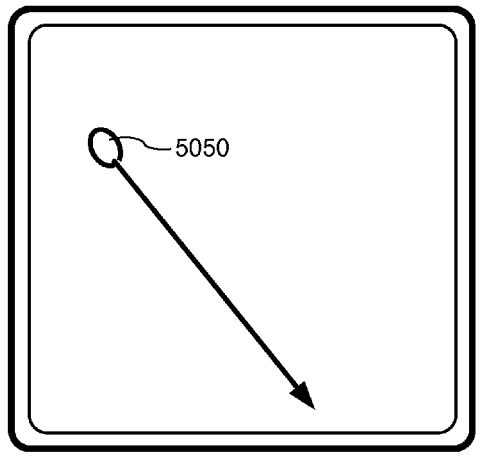

FIGS. 5Q-5T illustrate the movement of an object selection indicator 5010 across the display 450 from a first selectable object to a target selectable object where the target selectable object is outside of a predefined region (e.g., 5038 in FIGS. 5Q-5T) of the display 450. In response to a swipe gesture (e.g., contact 5044 and subsequent movement of the contact in FIG. 5Q) that is detected on a touch-sensitive surface 452, a computing device instructs the display 450 to move an object selection indicator 5010 across the display 450. In FIGS. 5Q-5R the object selection indicator 5010 is displayed at a first selectable object 5006-4. In FIG. 5R, after detecting the swipe gesture that includes contact 5044, the computing device determines a trajectory 5046 of the object selection indicator 5010, determines a radius 5048 around a termination point of the trajectory 5046 and identifies a target selectable object 5006-5 that is within the radius 5048. In FIGS. 5R-5S, the display 450 shows an animation of the object selection indicator 5010 moving from the first selectable object 5006-4 to the target selectable object 5006-5 (e.g., from a first location of the object selection indicator 5010 in FIG. 5R to an updated location of the object selection indicator 5010 in FIG. 5S), and scrolling the user interface on the display 450 so that the updated location of the object selection indicator (e.g., 5010 in FIG. 5S) is within the predefined region 5038 of the display 450. FIGS. 5S-5T illustrate displaying an animation of scrolling the user interface on the display 450 so that the updated location of the object selection indicator (e.g., 5010 in FIG. 5S) is displayed near a center of the predefined region 5038 of the display 450 (e.g., 5010 in FIG. 5T).

Figure 5U:
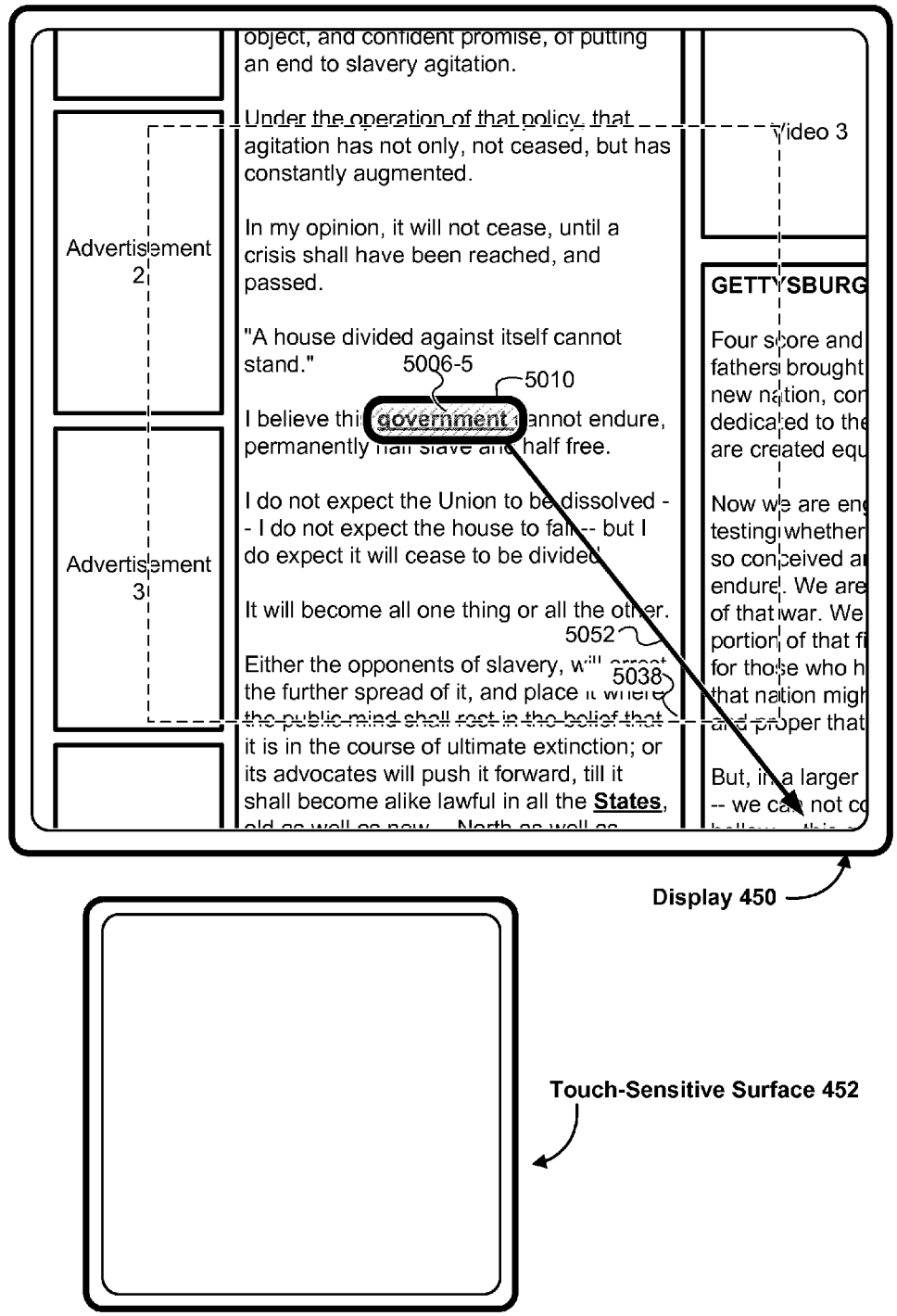
Figure 5V:
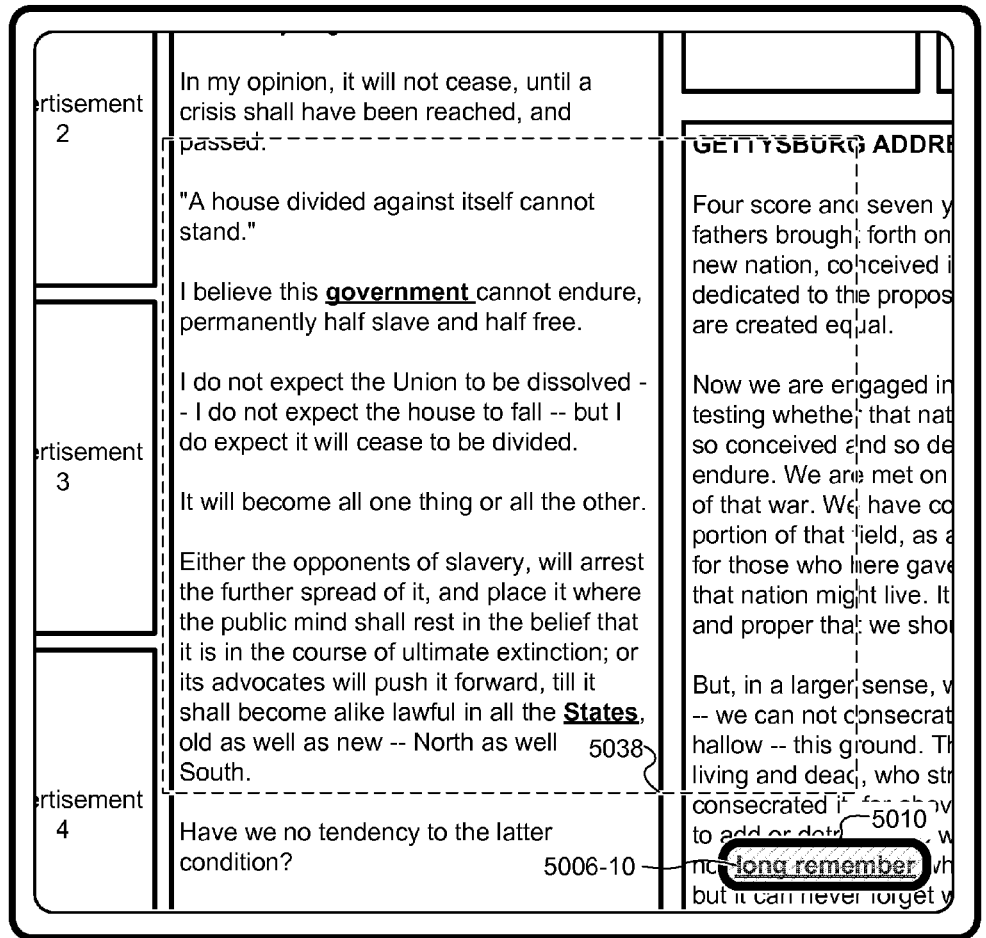
Figure 5W:
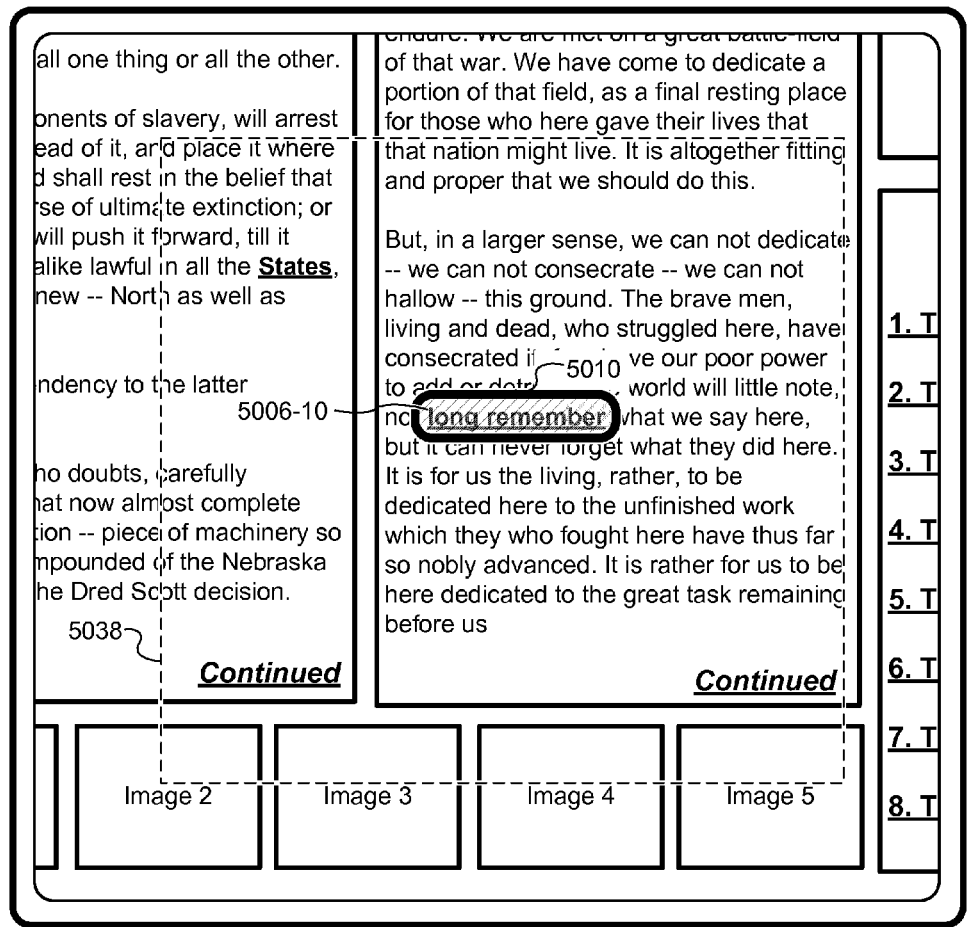
Figure 5W:
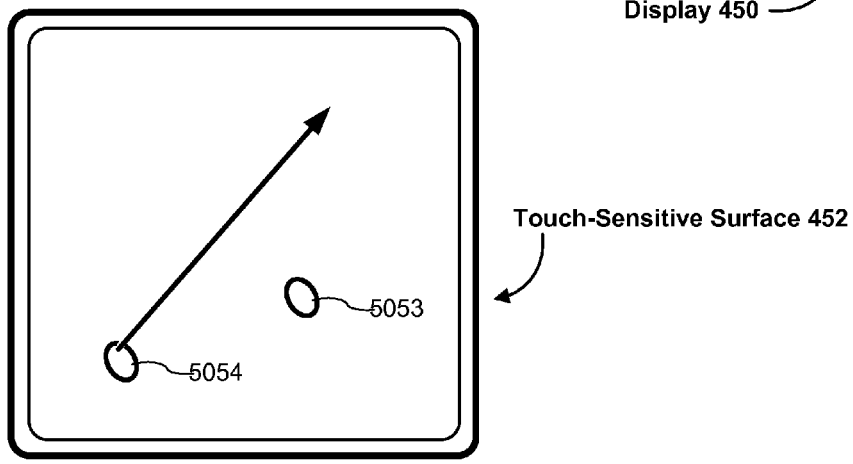

FIGS. 5T-5W illustrate the movement of an object selection indicator 5010 across the display 450 from a first selectable object to a target selectable object where the target selectable object is outside of a predefined region (e.g., 5038 in FIGS. 5T-5W) of the display 450. In response to a swipe gesture (e.g., contact 5050 and subsequent movement of the contact in FIG. 5T) that is detected on a touch-sensitive surface 452, a computing device instructs the display 450 to move an object selection indicator 5010 across the display 450. In FIGS. 5T-5U, the object selection indicator 5010 is displayed at a first selectable object 5006-5. In FIG. 5U, after detecting the swipe gesture that includes contact 5050, the computing device determines a trajectory 5052 of the object selection indicator 5010 and identifies a target selectable object 5006-10 that is proximate to a termination point of the trajectory 5052. In FIGS. 5U-5W, the display 450 shows an animation of the object selection indicator 5010 moving from the first selectable object 5006-5 to the target selectable object 5006-10 (e.g., from a first location of the object selection indicator 5010 in FIG. 5U to a second location of the object selection indicator 5010 in FIG. 5V and to an updated location of the object selection indicator 5010 in FIG. 5W), and scrolling the user interface on the display 450 so that the updated location of the object selection indicator (e.g., 5010 in FIG. 5W) is within the predefined region 5038 of the display 450.

In FIG. 5W, while the current target selectable object (e.g., 5006-10 in FIG. 5W) is selected, an activation input (e.g., tap gesture 5053 on the touch-sensitive surface 452) is detected and the computing device performs an action associated with the current target selectable object (e.g., loading a webpage associated with the "long remember" hyperlink, not shown).

Figure 5X:
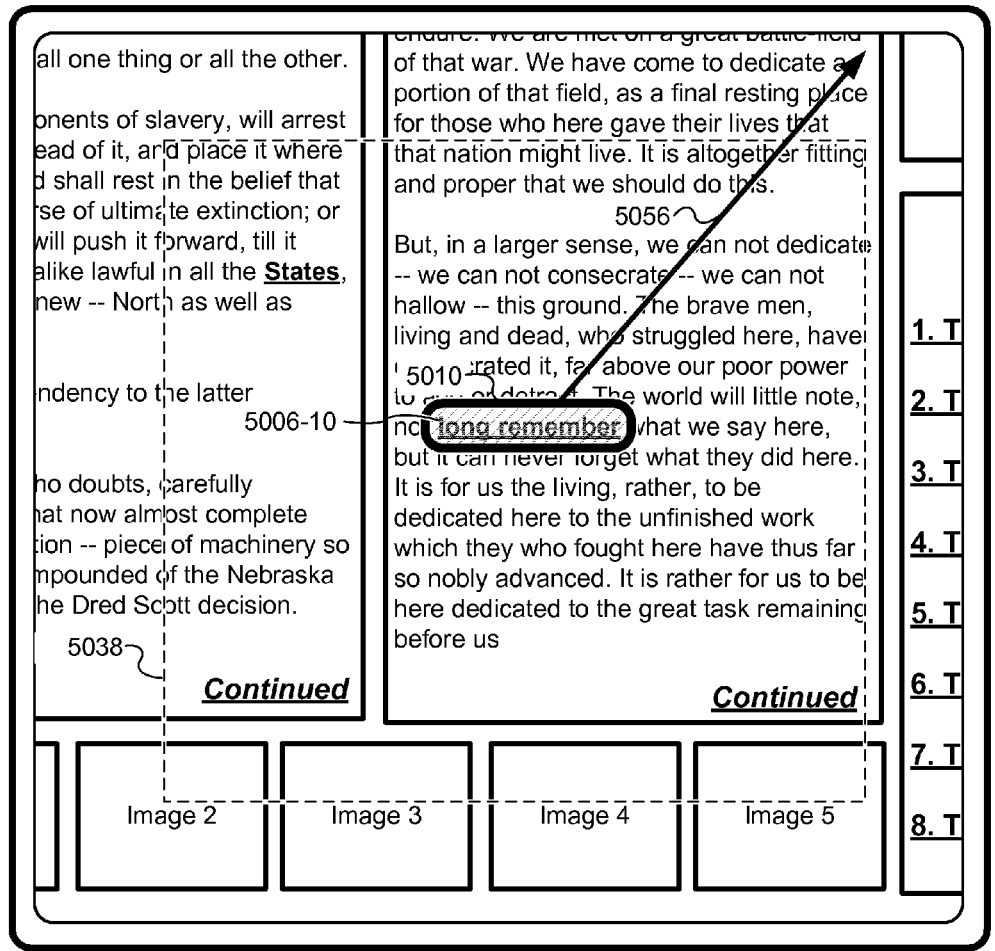
Figure 5X:
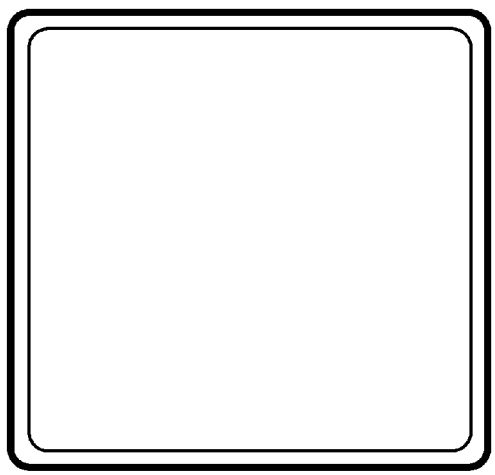
Figure 5Y:
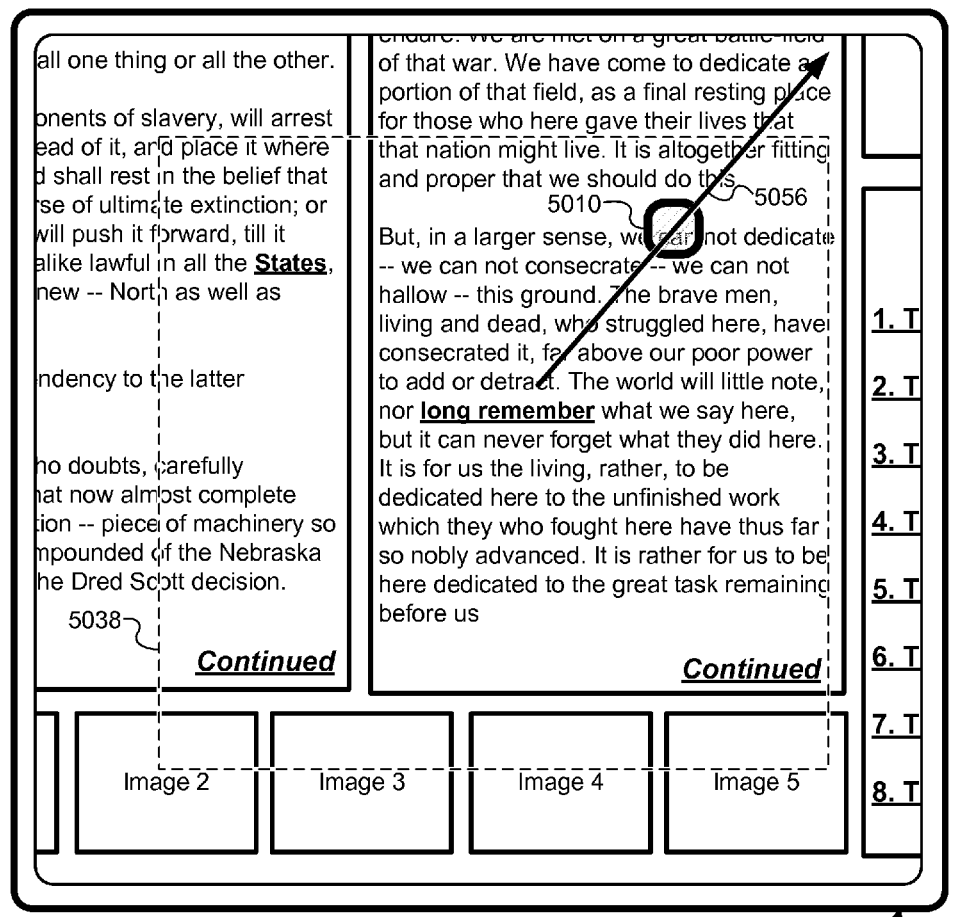
Figure 5Y:
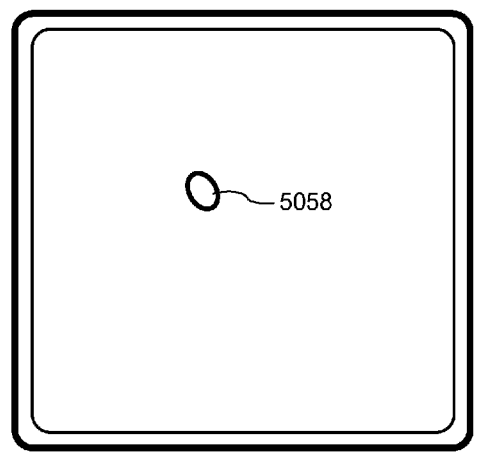

FIGS. 5W-5AA illustrate the movement of an object selection indicator 5010 across the display 450 from a first selectable object to a target selectable object where the computing device receives an input that corresponds to a stop input while the object selection indicator is being moved within the user interface. In response to a swipe gesture (e.g., contact 5054 and subsequent movement of the contact in FIG. 5W) that is detected on a touch-sensitive surface 452, a computing device instructs the display 450 to move an object selection indicator 5010 across the display 450. In FIGS. 5W-5X the object selection indicator 5010 is displayed at a first selectable object 5006-10. In FIG. 5X, after detecting the swipe gesture that includes contact 5054, the computing device determines a trajectory 5056 of the object selection indicator 5010 and identifies a target selectable object that is proximate to a termination point of the trajectory 5056. In FIGS. 5X-5Y, the display 450 shows an animation of the object selection indicator 5010 moving from the first selectable object 5006-10 towards the target selectable object (e.g., from a first location of the object selection indicator 5010 in FIG. 5X to a second location of the object selection indicator 5010 in FIG. 5Y). In one embodiment, in FIG. 5Y a stop input (e.g., tap gesture 5058 in FIG. 5Y) is detected while the object selection indicator (e.g., 5010 in FIG. 5Y) is within a predefined region 5038 of the display and the display ceases to move the object selection indicator within the user interface and does not scroll the user interface within the display. In another embodiment, the stop input (e.g., tap gesture 5058 in FIG. 5Y) is not detected while the object selection indicator (e.g., 5010 in FIG. 5Y) is within a predefined region 5038 of the display 450, and instead a stop input (e.g., tap gesture 5060 in FIG. 5Z) is detected while the object selection indicator (e.g., 5010 in FIG. 5Z) is outside of the predefined region 5038 of the display 450 and the display 450 ceases to move the object selection indicator within the user interface and scrolls the user interface within the display 450 so as to move the object selection indicator (e.g., 5010 in FIG. 5AA) into the predefined region 5038 of the display 450.

FIGS. 5AA-5CC illustrate exemplary user interfaces for scrubbing through the user interface (i.e., scrolling through content by moving a cursor, object selection indicator within a predefined region on the display 450 or moving a contact within a predefined region on the touch-sensitive-surface 452, where positions in the predefined region map to corresponding positions in the content). In FIGS. 5BB-5CC, a contact 5063 is detected within a scrubbing region 5061 on the touch-sensitive surface 452 as illustrated in FIG. 5BB, and the contact is subsequently moved within the scrubbing region 5061 from a first location 5063-a in FIG. 5BB to a second location 5063-b in FIG. 5CC. In response to receiving inputs that correspond to these movements of the contact on the touch-sensitive surface 452, the user interface is scrolled through in accordance with the position of the contact 5063 within the scrubbing region 5061, as illustrated in FIGS. 5BB-5CC. Alternatively, in FIGS. 5AA-5CC, a tap and drag gesture (e.g., including contact 5064 and movement from a first location of the contact 5064-a in FIG. 5AA to a second location of the contact 5064-b in FIG. 5BB to a third location of the contact 5064-c in FIG. 5CC) is detected that includes a request to move the object selection indicator into a scrubbing region (e.g., 5062 in FIGS. 5AA-5CC) of the display 450. In response to movements that correspond to movement of the object selection indicator within the scrubbing region (e.g., from a first location of the object selection indicator 5010 in FIG. 5BB to a second location of the object selection indicator 5010 in FIG. 5CC), the user interface is scrubbed through in accordance with the movements of the object selection indicator.

FIGS. 5DD-5HH illustrate exemplary user interfaces for scrolling through the user interface at a predefined speed. In FIGS. 5DD-5HH a tap and drag gesture (e.g., including contact 5065) is detected that includes a request to move the object selection indicator into a scroll speed control region (e.g., region 5066-1 in FIG. 5DD or region 5066-2 in FIGS. 5DD-5HH) of the display 450. In response to detecting the presence of the object selection indicator (e.g., 5010 in FIGS. 5EE-5GG) within the scroll speed control region (e.g., 5066-2 in FIGS. 5DD-5HH) the user interface is scrolled on the display 450 (e.g., as illustrated in FIGS. 5EE-5GG). In FIG. 5GG, in response to detecting an end of the input (e.g., liftoff of the contact 5065-*b* in FIGS. 5FF-5GG), the object selection indicator ceases to be moved within the user interface, and the user interface is scrolled so as to display the object selection indicator (e.g., 5010 in FIG. 5HH) within the predefined region 5038 of the display 450, as illustrated in FIG. 5HH.

FIGS. 5HH-5JJ illustrate exemplary embodiments for selecting a selectable object after an end of a gesture (e.g., the tap and drag gesture including contact 5065 FIGS. 5DD-5FF) has been detected. After detecting an end of the tap and drag gesture (e.g., detecting liftoff of the contact 5065-*b* in FIGS. 5FF-5GG), the display shows an animation of the object selection indicator moving and changing size so as to encompass the a target selectable object (e.g., the object selection indicator moves from a current location and size as illustrated by the object selection indicator 5010 in FIG. 5HH to an updated location and size as illustrated by the object selection indicator 5010 in FIGS. 5II-5JJ that encompasses the target selectable object 5006-11). In FIGS. 5HH-5II the user interface is scrolled on the display 450 so as to display the object selection indicator (e.g., 5010 in FIG. 5JJ) within the predefined region 5038 of the display 450, as illustrated in FIG. 5JJ.

FIGS. 5JJ-5LL illustrate movement of an object selection indicator from a location proximate to a selectable object to a location on the display 450 that is not associated with any selectable object and ceasing to display the object selection indicator after a predetermined period of time. In response to a swipe gesture (e.g., contact 5072 and subsequent movement of the contact in FIG. 5JJ) that is detected on a touch-sensitive surface 452, a computing device instructs the display 450 to move an object selection indicator 5010 across the display 450. In FIG. 5JJ, the object selection indicator 5010 is displayed at a location proximate to a selectable object 5006-11. In FIG. 5JJ, after detecting the swipe gesture that includes contact 5072, the computing device determines a trajectory 5074 of the object selection indicator 5010 and fails to identify any target selectable object that is proximate to an endpoint of the trajectory 5074. In FIGS. 5JJ-5KK, the display 450 shows an animation of the object selection indicator 5010 moving from the selectable object 5006-11 towards a termination point of the trajectory 5074 (e.g., from a first location of the object selection indicator 5010 in FIG. 5JJ to a second location of the object selection indicator 5010 in FIG. 5KK). After a predetermined period of time without further contacts being detected on the touch-sensitive surface 452, the object selection indicator ceases to be displayed on the display 450, as illustrated in FIG. 5LL.

FIG. 5LL illustrates detecting a swipe gesture (e.g., contact 5074 and subsequent movement of the contact in FIG. 5LL) that meets predefined navigation criteria (e.g., it has a duration less than a predetermined amount of time). In FIG. 5MM, in response to the detection of the swipe gesture the user interface is scrolled downwards on the display (e.g., so as to display a top portion of the user interface on the display 450) without redisplaying the object selection indicator. In FIG. 5NN, in response to the detection of the swipe gesture, the user interface is scrolled upwards on the display (e.g., so as to display a bottom portion of the user interface on the display 450) without redisplaying the object selection indicator.

FIG. 5LL also illustrates detecting a swipe gesture (e.g., contact 5076 and subsequent movement of the contact in FIG. 5LL) that meets object selection indicator movement criteria (e.g., it has a duration greater than the predetermined amount of time). In FIGS. 5OO-5PP, in response to the detection of the swipe gesture the object selection indicator (e.g., 5010 in FIG. 5OO) is redisplayed near a center of the display 450 and is subsequently moved in accordance with a trajectory 5078 that is determined based on the swipe gesture (e.g., the gesture including contact 5076 in FIG. 5LL) to a location that corresponds to a selectable object 5006-11, and the movement is performed without scrolling the user interface on the display 450. In FIGS. 5QQ-5SS, in response to the detection of the swipe gesture the object selection indicator (e.g., 5010 in FIG. 5QQ) is redisplayed at a last known location and is subsequently moved in accordance with a trajectory 5080 that is was determined based on the swipe gesture (e.g., the gesture including contact 5076 in FIG. 5LL) to a location and that corresponds to a selectable object (e.g., 5006-18 in FIGS. 5RR-5SS) and resized to a size that corresponds to a size of the selectable object, where the location that corresponds to the selectable object (e.g., the updated location of the object selection indicator) is outside of a predefined region 5038 of the display 450. Additionally, in FIGS. 5RR-5SS the user interface is scrolled on the display 450 so as to display the object selection indicator (e.g., 5010 in FIG. 5SS) within the predefined region 5038 of the display 450, as illustrated in FIG. 5SS.

Figure 6A:
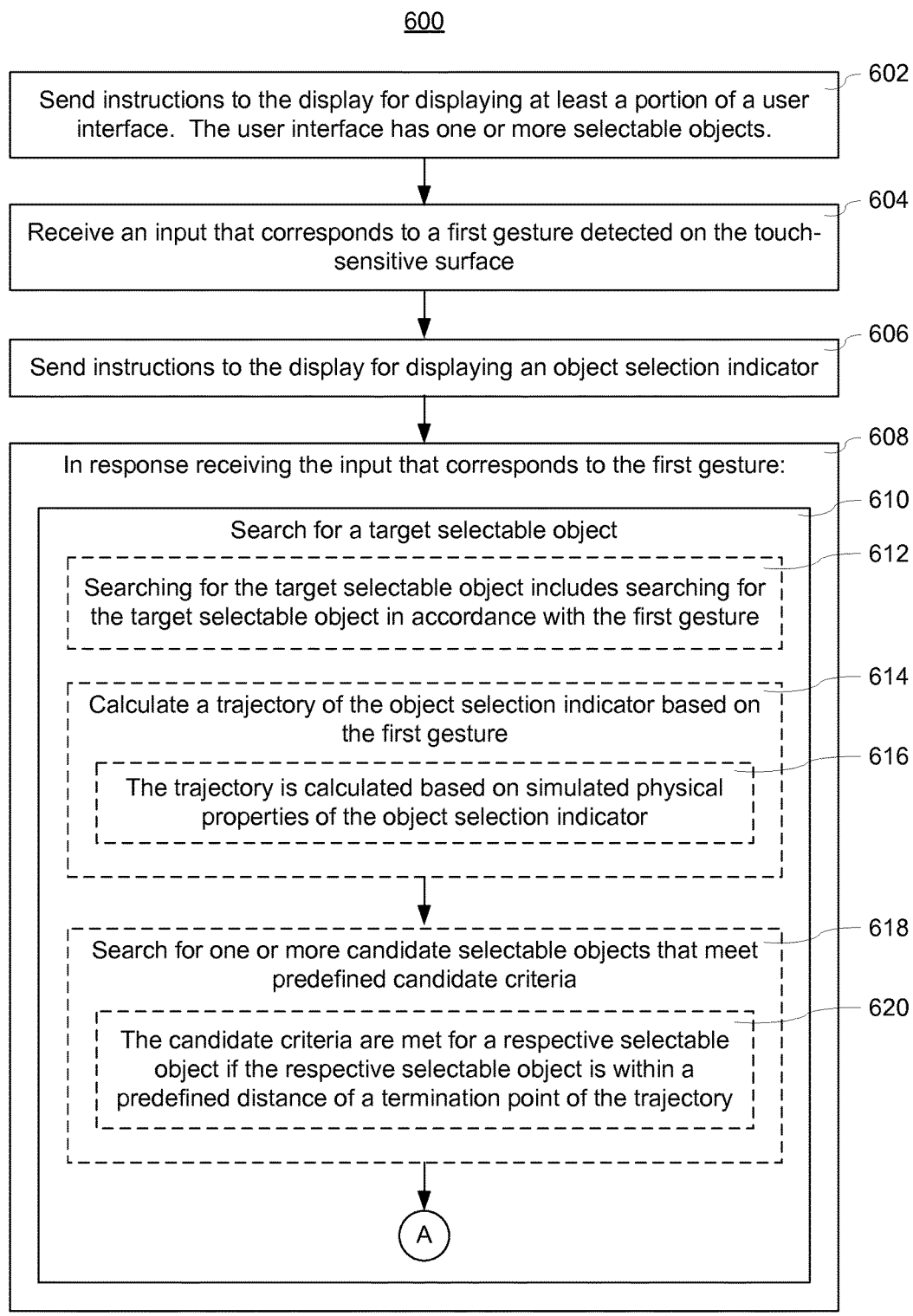
FIGS. 6A-6C are flow diagrams illustrating a method of identifying a target selectable object and moving an object selection indicator to the target selectable object in accordance with some embodiments.
Figure 6B:
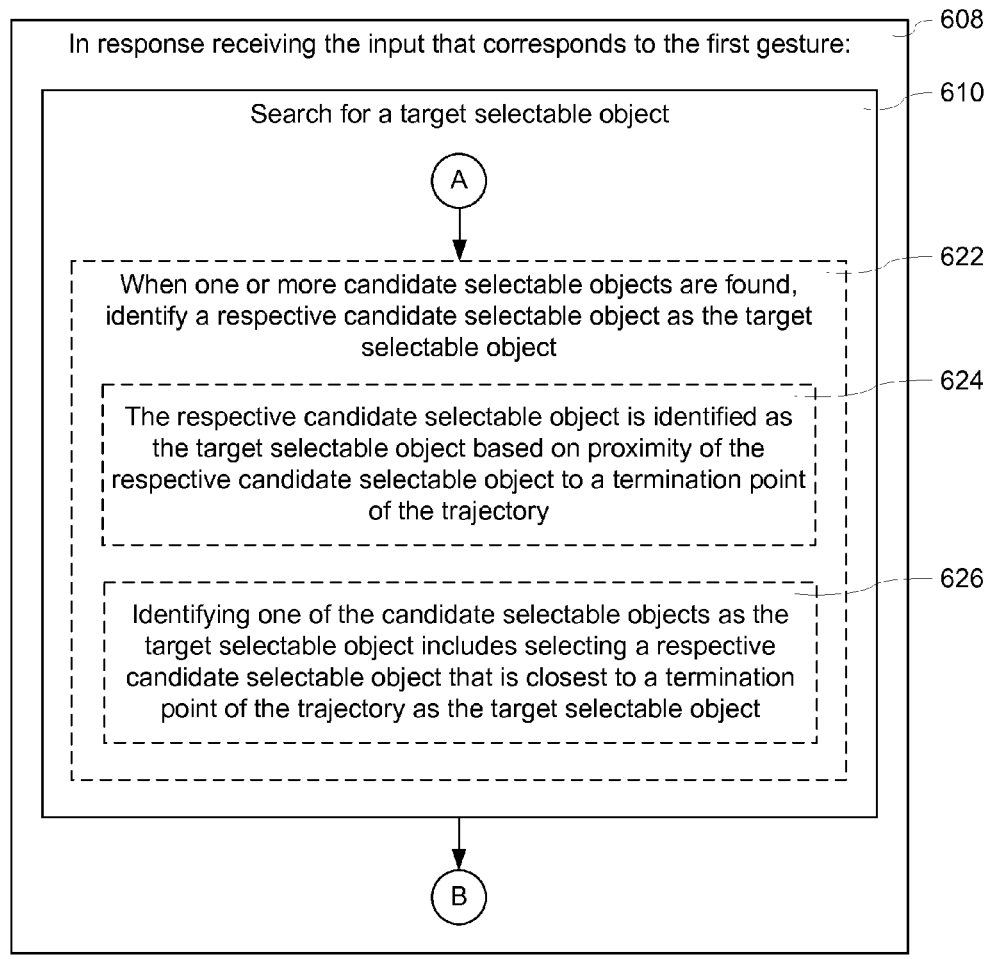
Figure 6C:
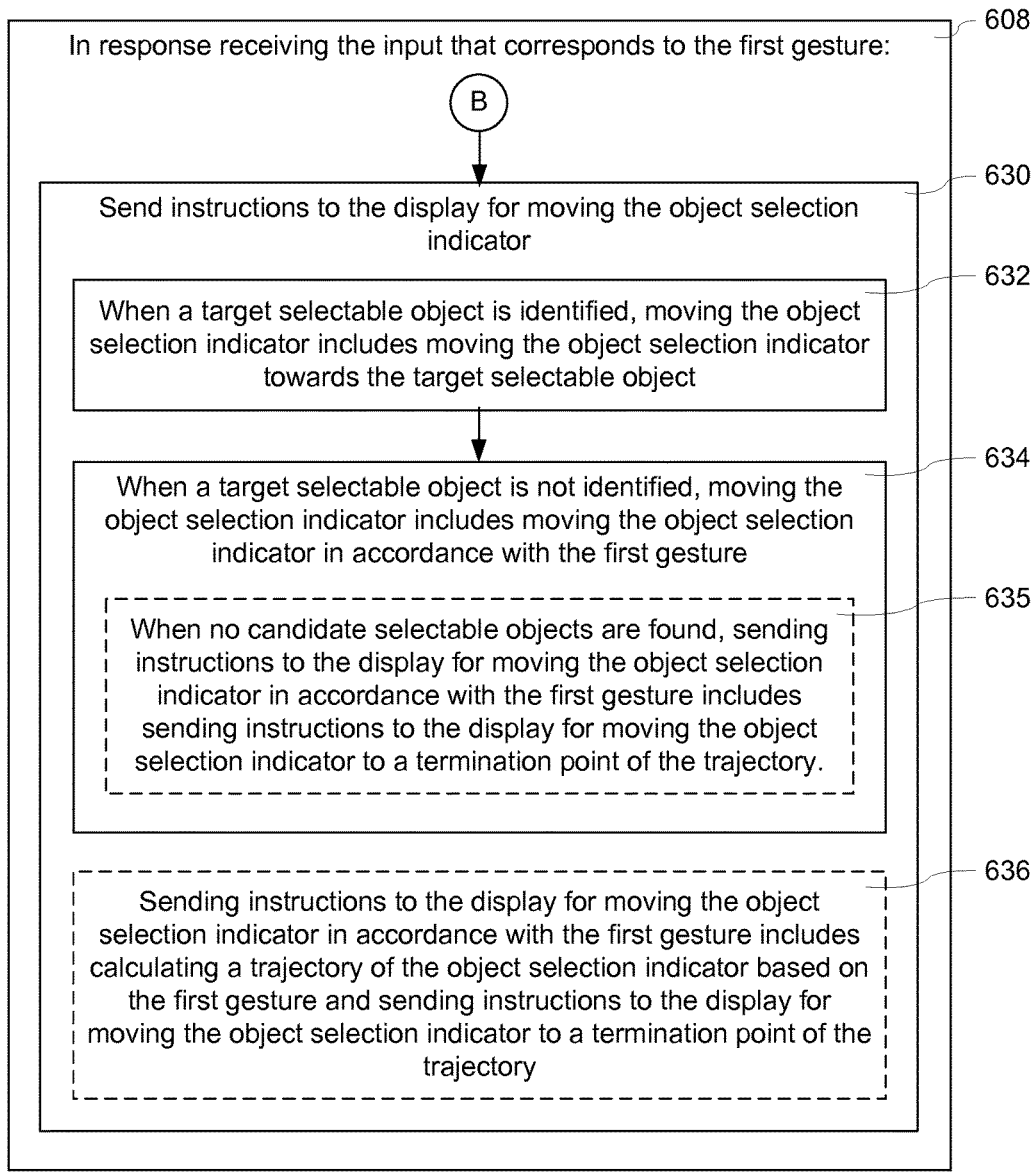

FIGS. 6A-6C are flow diagrams illustrating a method 600 of identifying a target selectable object and moving an object selection indicator to the target selectable object in accordance with some embodiments. The method 600 is performed at a computing device (e.g., device 300, FIG. 3, or portable multifunction device 100, FIGS. 1A-1B) that is in communication with a display (e.g., 450 in FIGS. 5A-5SS) and a touch-sensitive surface (e.g., 452 in FIGS. 5A-5SS). In some embodiments, the display and/or the touch-sensitive surface are separate from the device (e.g., either as part of separate computing devices or wirelessly connected to the computing device). In some embodiments, the display and/or the touch-sensitive surface are integrated into the computing device. In some embodiments, the display is a touch screen display and the touch-sensitive surface is on the display. In some embodiments, the display is separate from the touch-sensitive surface. Some operations in method 600 may be combined and/or the order of some operations may be changed.

As described below, the method 600 provides an intuitive way to identify a target selectable object and move an object selection indicator to the target selectable object, if any. The method reduces the cognitive burden on a user when navigating a user interface by moving an object selection indicator, thereby creating a more efficient human-machine interface. For battery-operated computing devices, enabling a user to select target selectable objects using an object selection indicator faster and more efficiently conserves power and increases the time between battery charges.

The computing device sends (602) instructions to the display 450 for displaying at least a portion of a user interface. For example, in FIG. 5A, a portion of a webpage is displayed on the display 450. It should be understood that, although only a portion of the user interface is displayed in this example, in some embodiments the entire user interface is displayed on the display 450 (e.g., by displaying a smaller user interface or by displaying the user interface at a lower magnification). Additionally, while the examples described herein primarily refer to the user interface as a webpage, it should be understood that the user interface could be any user interface that includes selectable objects (e.g., an application user interface, an electronic document, an operating system user interface, etc.) The user interface has one or more selectable objects (e.g., 5006 in FIGS. 5A-5SS). In some embodiments, the user interface includes a plurality of selectable objects. In some embodiments, the user interface includes an electronic document with a plurality of selectable objects. In some embodiments, the selectable objects include one or more hyperlinks (e.g., 5006-1, 5006-2, 5006-3, 5006-4, 5006-5 in FIG. 5A), photos, advertisements (e.g., 5006-7 and 5006-8 in FIG. 5A) blocks of text, videos (e.g., 5006-8, 5006-9 in FIG. 5A), icons, text fields, option selection interfaces or the like.

The computing device receives (604) an input that corresponds to a first gesture detected on the touch-sensitive surface 452. In some embodiments, the gesture is a tap and hold gesture, a tap and drag gesture, a flick gesture or other contact-based gesture. In some embodiments, the input is received at the computing device from a remote device (e.g., either raw contact data or processed gesture outputs). For example in FIG. 5A, the touch-sensitive surface 452 detects a gesture including a contact 5008 on the touch-sensitive surface 452 and subsequent movement of the contact across the touch-sensitive surface 452 and sends an input to the computing device that corresponds to the detected gesture. In some other embodiments, the input is received from a touch-sensitive surface 452 that is integrated with the computing device (e.g., a touchpad on a laptop or a touch screen display).

The computing device sends (606) instructions to the display 450 for displaying an object selection indicator. In some embodiments, the object selection indicator is displayed prior to detecting the input (e.g., object selection indicator 5010 in FIG. 5A). In some embodiments, the instructions for displaying the object selection indicator are sent to the display 450 in response to receiving the input that corresponds to the first gesture. As one example of these embodiments, in FIG. 5A, the object selection indicator 5010 would initially only be displayed in FIG. 5A after the contact 5008 had been detected on the touch-sensitive surface 452. In some embodiments, the object selection indicator is a dynamic object selection indicator (e.g., an object selection indicator that changes size and/or shape in response to inputs received from the user to conform to the size and/or shape of a target selectable object, as described in greater detail below with reference to method 700).

Operations 610-636 are performed (608) in response to receiving the input (e.g., contact 5008 in FIG. 5A and subsequent movement of the contact across the touch-sensitive surface 452) that corresponds to the first gesture.

The computing device searches (610) for a target selectable object. In some embodiments, the target selectable object is within the displayed portion of the user interface (e.g., the target selectable object is one of the selectable objects 5006-1, 5006-2, 5006-3, 5006-4, 5006-5, 5006-6, 5006-7, 5006-8, 5006-9 shown on the display 450 in FIG. 5A). In some embodiments, the target selectable object is outside of the displayed portion of the user interface (e.g., as illustrated in FIGS. 5U-5W where the "long remember" hyperlink selectable object 5006-10 is initially not in the portion of the webpage that is displayed on the display 450 in FIG. 5U, but the webpage is scrolled so as to display the "long remember" hyperlink selectable object 5006-10 on the display 450 in FIGS. 5V-5W).

In some embodiments, searching for the target selectable object includes searching (612) for the target selectable object in accordance with the first gesture (e.g., contact 5008 in FIG. 5A and subsequent movement of the contact across the touch-sensitive surface 452). In some embodiments, searching for the target selectable object includes calculating (614) a trajectory (e.g., 5012 in FIG. 5B) of the object selection indicator (e.g., 5010 in FIG. 5B) based on the first gesture (e.g., contact 5008 in FIG. 5A and subsequent movement of the contact across the touch-sensitive surface 452). In some embodiments, the trajectory is calculated (616) based on simulated physical properties of the object selection indicator (e.g., 5010 in FIG. 5B). For example, the object selection indicator has a simulated mass and coefficient of friction and the object selection indicator moves in a direction determined by a direction of the first gesture on the touch-sensitive surface 452 and moves a distance across the display 450 that is determined in accordance with a simulated "force" of the first gesture (e.g., a value determined based on the speed of the first input).

In some embodiments, searching for the target selectable object includes searching (618) for one or more candidate selectable objects that meet predefined candidate criteria. In some embodiments, the candidate criteria are met (620) for a respective selectable object if the respective selectable object is within a predefined distance of a termination point of the trajectory (e.g., when the respective selectable object is within a predefined, adjustable snapping radius). For example, in FIG. 5B, the computing device identifies a termination point of the trajectory (e.g., the end of arrow representing the trajectory 5012 in FIG. 5B), identifies a radius (e.g., 5014 in FIG. 5B) of 40 pixels around the termination point and identifies selectable objects (e.g., Advertisement 1 5006-6, Advertisement 2 5006-7 and "policy" hyperlink 5006-4) that are within the radius (e.g., 5014 in FIG. 5B). It should be understood that, in some embodiments, a selectable object is "within" the radius if any portion of object is within the radius, while in other embodiments a selectable object is "within" the radius only if a centroid of the object is within the radius or only if the entire object (i.e., every point contained within the object) is within the radius. Additionally, it should be understood that, in some embodiments, selectable objects are classified into a plurality of different classes of selectable objects, and certain classes of objects are selected preferentially based on their class status. As one example, selectable objects that are hyperlinks are selected preferentially over other selectable objects. This preferential selection may include determining if there are any hyperlinks within the radius, and, if so, selecting the hyperlink that is closest to the termination point of the trajectory as the target selectable object, and, if not, identifying another selectable object that is closest to the termination point of the trajectory as the target selectable object. For example, if a paragraph of text within a webpage and a hyperlink within the paragraph are both within a radius of 40 pixels from the termination point of the trajectory, the computing device would select the hyperlink as the target selectable object.

In some embodiments, when one or more candidate selectable objects (e.g., 5006-4, 5006-6 and 5006-7 in FIG. 5B) are found, the computing device identifies (622) a respective candidate selectable object (e.g., "policy" hyperlink 5006-4) as the target selectable object. In some embodiments, when no candidate selectable objects are found, the computing device fails to identify a target selectable object, as described in greater detail below with reference to FIGS. 5D-5G. In some embodiments, the respective candidate selectable object (e.g., 5006-4 in FIG. 5B) is identified (624) as the target selectable object based on proximity of the respective candidate selectable object to a termination point of the trajectory (e.g., 5012 in FIG. 5B). In some embodiments, identifying one of the candidate selectable objects as the target selectable object includes selecting (626) a respective candidate selectable object (e.g., 5006-4) that is closest to a termination point of the trajectory (e.g., 5012 in FIG. 5B) as the target selectable object. In some embodiments, the computing device selects a selectable object (e.g., 5006-4 in FIG. 5B) within the predefined, adjustable snapping radius (e.g., 5014 in FIG. 5B) that is closest to the termination point of the trajectory (e.g., 5012 in FIG. 5B).

The computing device sends (630) instructions to the display 450 for moving the object selection indicator. When a target selectable object (e.g., 5006-4 in FIGS. 5B-5C) is identified, moving the object selection indicator includes moving (632) the object selection indicator towards the target selectable object. For example, in FIG. 5C, the display 450 displays an animation of the object selection indicator 5010 moving from a first location 5010-*a* to a second location 5010-*b* to a third location 5010-*c*, as illustrated in FIG. 5C towards the target selectable object 5006-4. In some embodiments, moving the object selection indicator towards the target selectable object includes moving the object selection indicator to the target selectable object (e.g., so that the target selection indicator at least partly overlaps the target selectable object). For example, in FIG. 5D the object selection indicator 5010 is displayed surrounding the target selectable object 5006-4.

When a target selectable object is not identified, moving the object selection indicator includes moving (634) the object selection indicator in accordance with the first gesture (e.g., along a direction on the display 450 that corresponds to a direction of the first gesture on the touch-sensitive surface 452). For example in FIG. 5D a gesture is detected that includes a contact 5016 and movement of the contact across the touch-sensitive surface 452. In this example, the computing device determines a trajectory (e.g., 5018 in FIG. 5E) based on simulated physical properties of the object selection indicator, as described in greater detail above. The computing device determines a termination point (e.g., the end of the arrow representing the trajectory 5018 in FIG. 5E) of the trajectory and searches for a target selectable object within a predefined radius (e.g., 5020 in FIG. 5E) from the termination point of the trajectory (e.g., 5018 in FIG. 5E). However, in this example the computing device does not find any candidate selectable objects within the radius (e.g., 5020 in FIG. 5E).

It is advantageous to identify a target selectable object and move the object selection indicator towards the target selectable object, so that a user does not need to make precise movements in order to get the object selection indicator to a selectable object. Rather, the user can simply make a gesture in the general direction of a selectable object, and the object selection indicator will select the selectable object intended by the user (provided that the user's input is reasonably accurate), thereby improving the efficiency and ease of navigating through the user interface for the user. Additionally, it is advantageous that when no target selectable object is found within a radius of the trajectory, the object selection indicator is moved in accordance with the first gesture, because in these situations the user has not provided a reasonably accurate input (e.g., an input that puts the object selection indicator close to a selectable object). Here, the computing device has a higher likelihood of identifying the wrong selectable object as the target selectable object. Thus, it is more efficient not to select any target selectable object and wait for the user to enter additional inputs.

Consequently, in this example, because no candidate selectable objects are found, a target selectable object is not identified, and the object selection indicator is moved in accordance with the first gesture (e.g., along the trajectory 5018 that was identified based on the simulated physical properties of the object selection indicator 5010 in FIG. 5E). This example is illustrated in FIG. 5F, where the object selection indicator 5010 moves along the identified trajectory (e.g., from a first location 5010-*a* to a second location 5010-*b* to a third location 5010-*c*). It should be understood that operations that are performed in accordance with the first gesture are made in accordance with an input that corresponds to the first gesture (e.g., when the first gesture is detected at a touch-sensitive surface 452 that is distinct from the computing device and the touch-sensitive surface 452 sends the input to the computing device that is representative of the first gesture, which is then used to determine operations to perform at the computing device).

In some embodiments, when no candidate selectable objects are found, sending instructions to the display 450 for moving the object selection indicator in accordance with the first gesture includes sending (635) instructions to the display 450 for moving the object selection indicator to a termination point of the trajectory (e.g., 5018 in FIG. 5E). Continuing the example from above, the object selection indicator (e.g., 5010 in FIG. 5E) is moved from its previous location (e.g., proximate to selectable object 5006-4 in FIG. 5E) to a location (e.g., 5010 in FIG. 5G) that is proximate to a termination point of the trajectory (e.g., 5018 in FIG. 5E). In some embodiments, sending instructions to the display 450 for moving the object selection indicator in accordance with the first gesture includes calculating (636) a trajectory of the object selection indicator based on the first gesture and sending instructions to the display 450 for moving the object selection indicator to a termination point of the trajectory, as described in greater detail above.

Note that details of other processes described herein with respect to methods 700, 800, 900 (e.g., FIGS. 7A-7C, 8A-8E, 9A-9D and 5A-5SS) are also applicable in an analogous manner to the method 600 described above. For example, the selectable objects 5006 (e.g., hyperlinks, advertisements, images, videos) and object selection indicator 5010 described with reference to FIGS. 6A-6C may have one or more of the characteristics of the various selectable objects 5006 and object selection indicator 5010 described herein with reference to any of methods 700, 800 and/or 900. For brevity, these details are not repeated here.

Figure 7A:
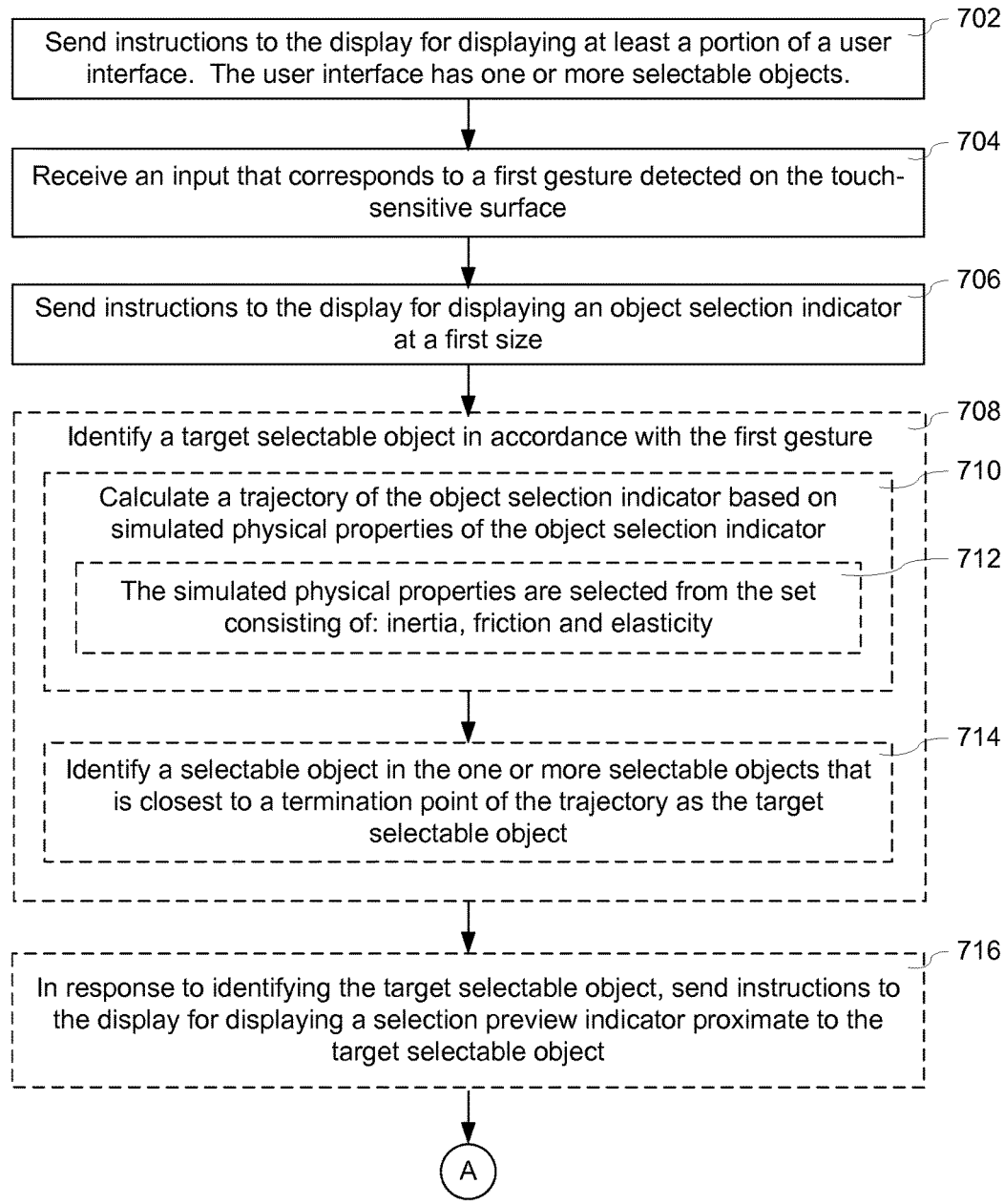
FIGS. 7A-7C are flow diagrams illustrating a method of resizing an object selection indicator based on a size of a target selectable object in accordance with some embodiments.
Figure 7B:
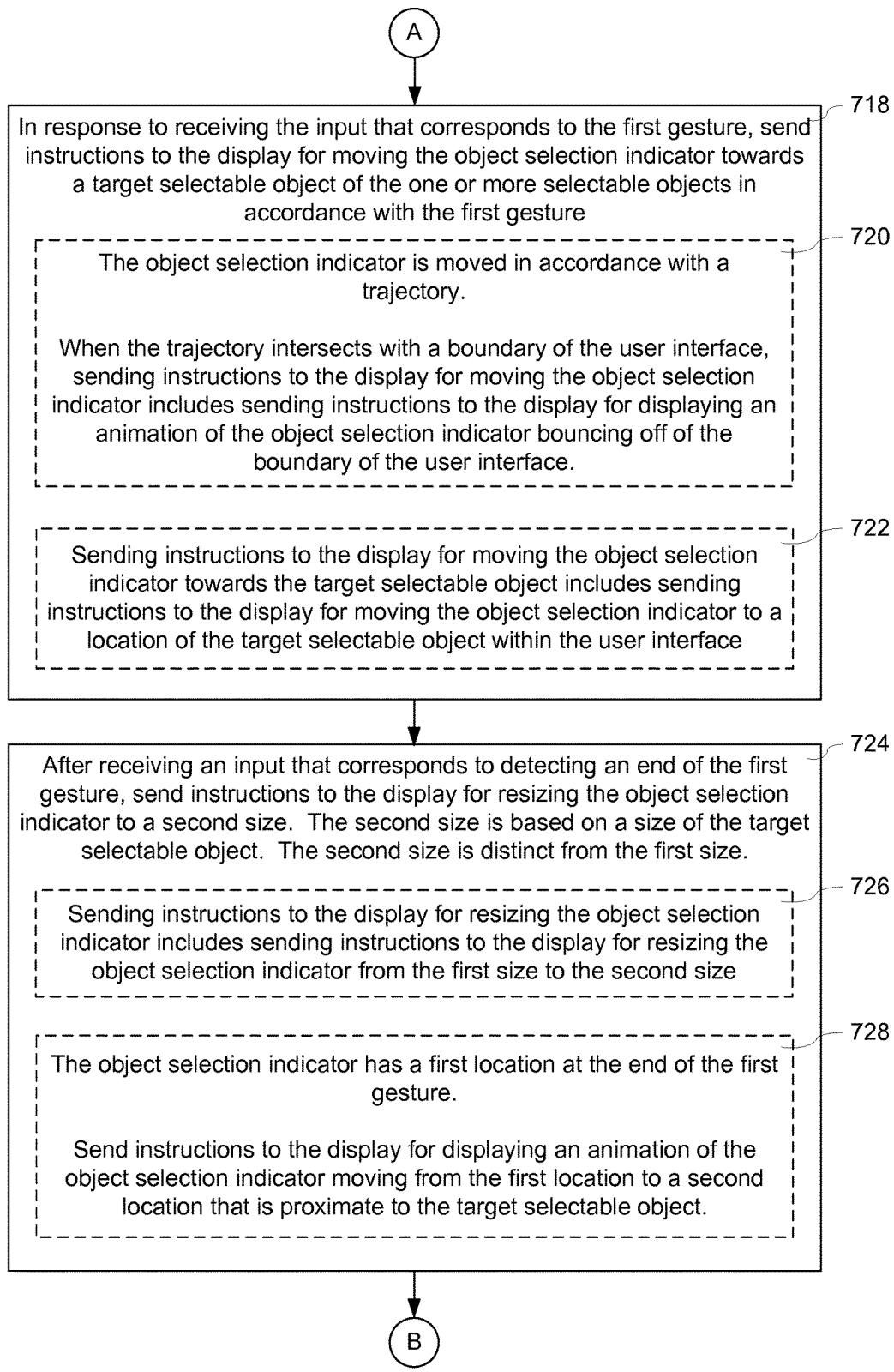
Figure 7C:
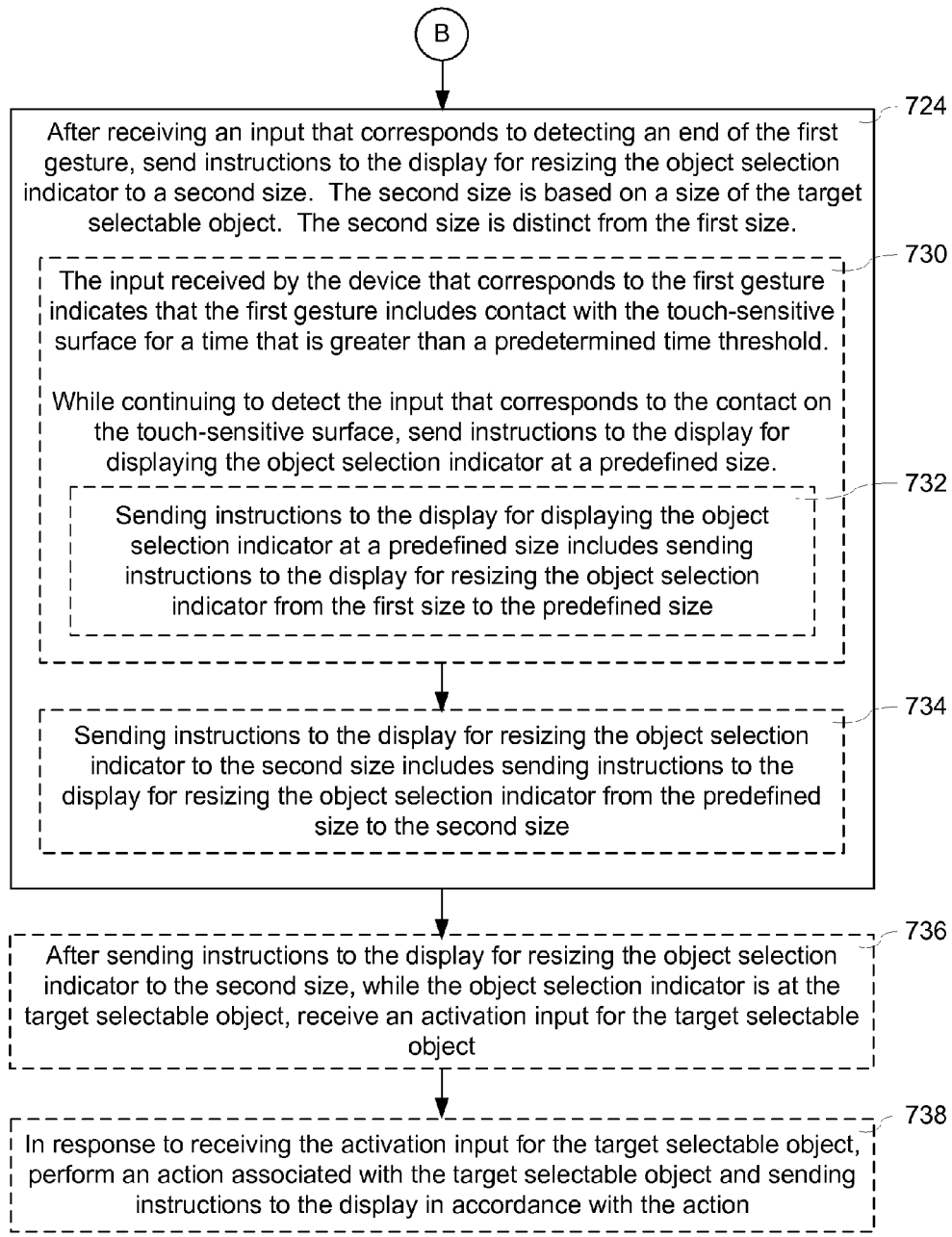
Figure 8A:
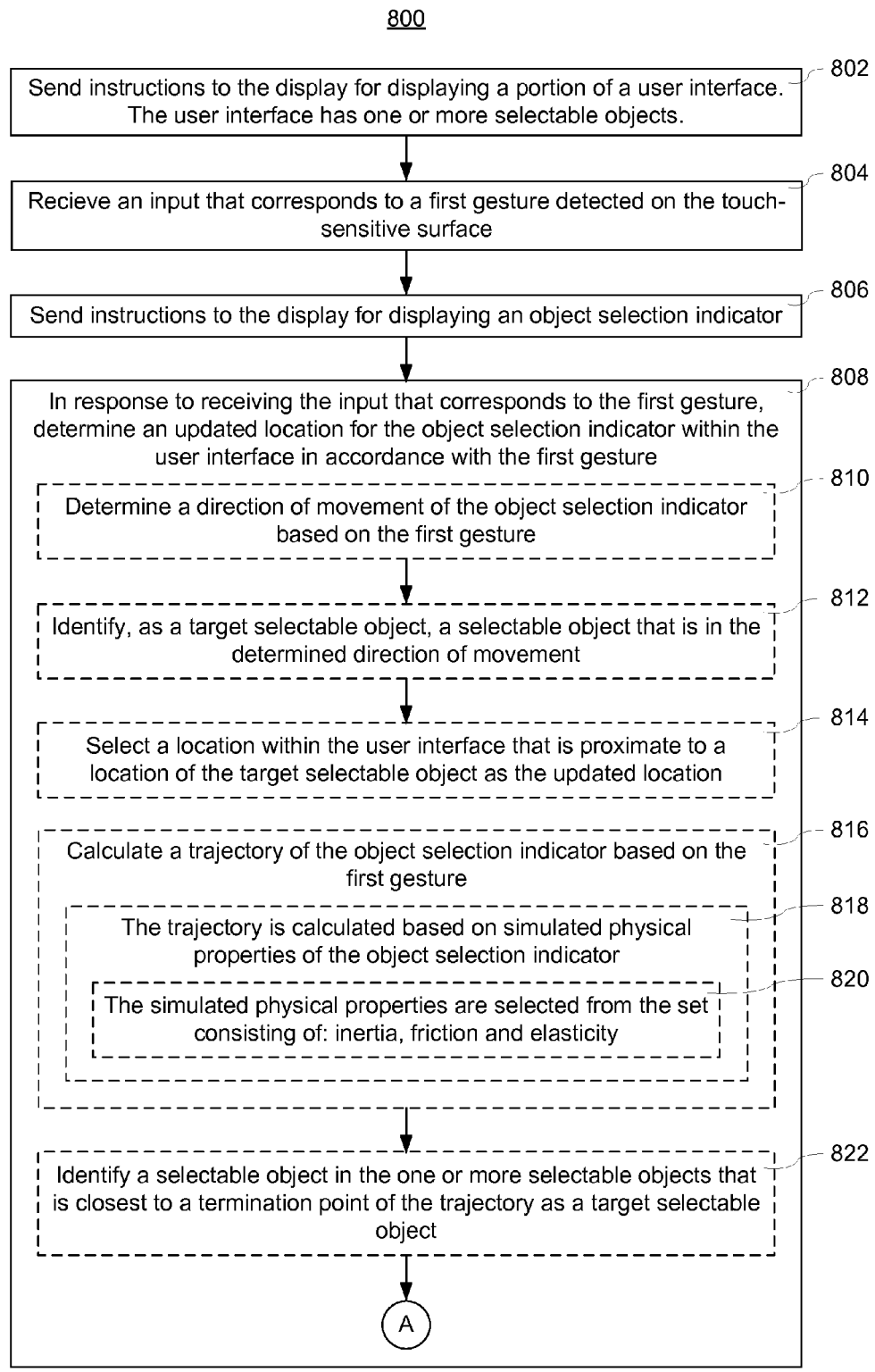
FIGS. 8A-8E are flow diagrams illustrating a method of moving an object selection indicator and scrolling a user interface in accordance with the movement of the object selection indicator in accordance with some embodiments.
Figure 8B:
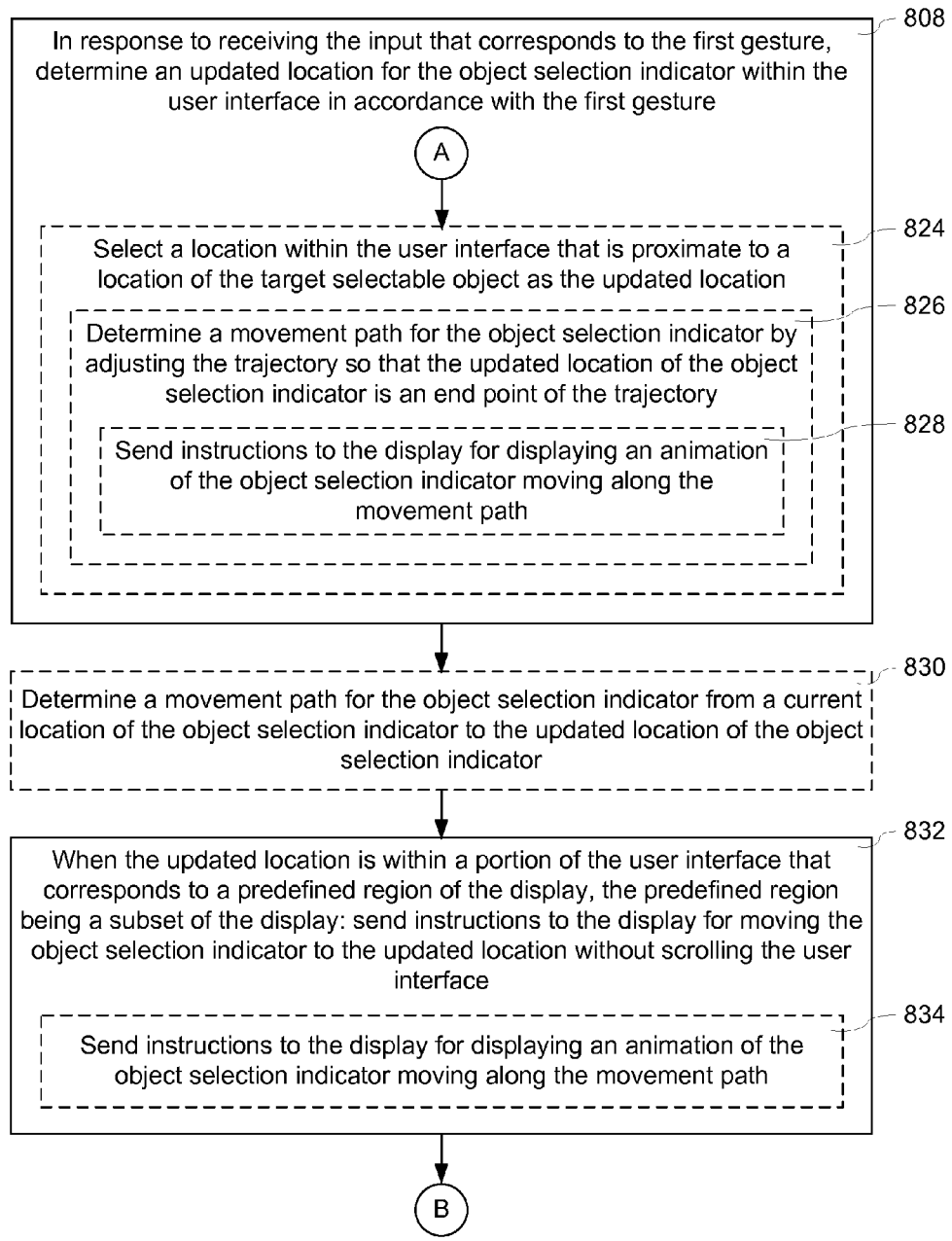
Figure 8C:
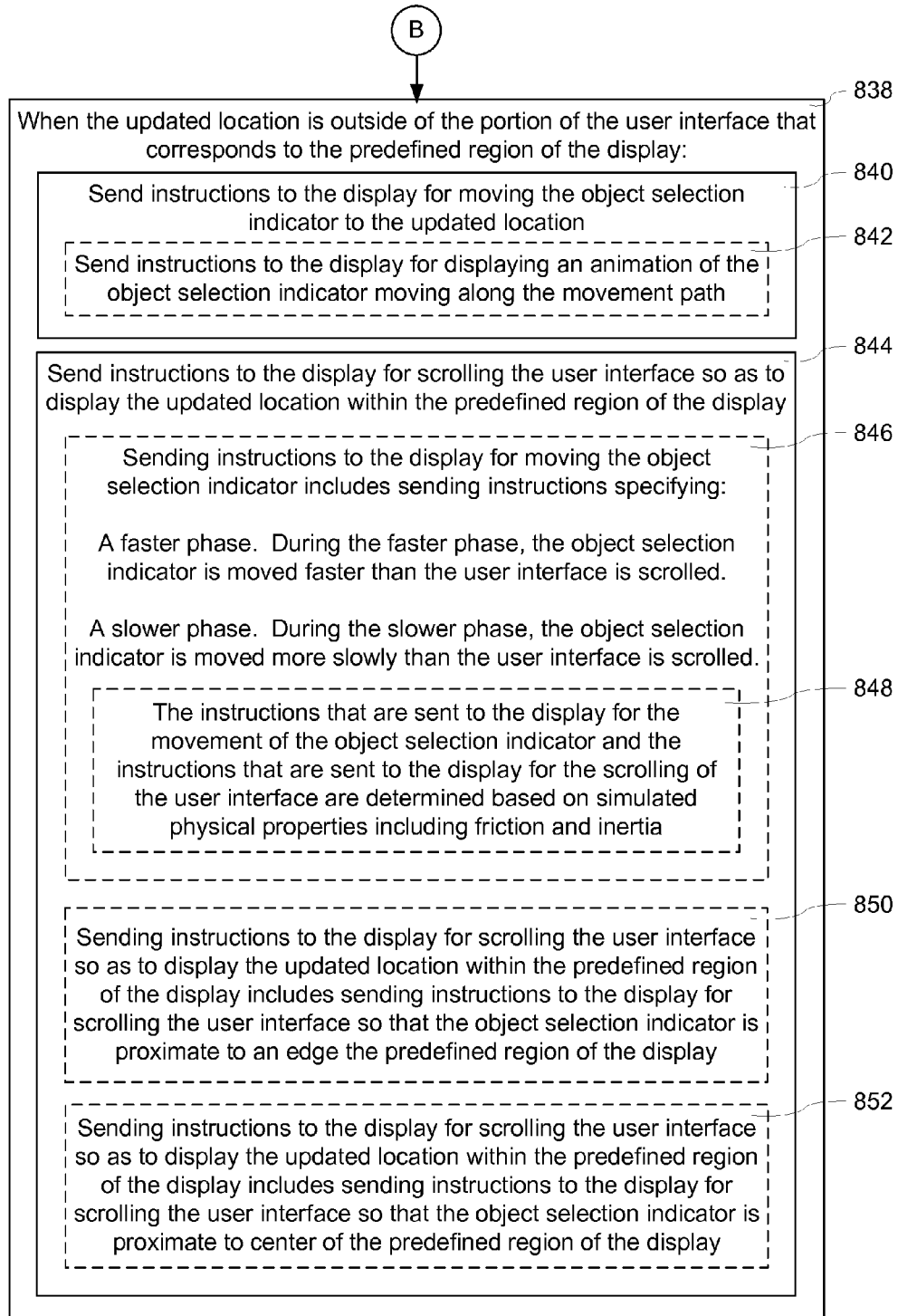
Figure 8D:
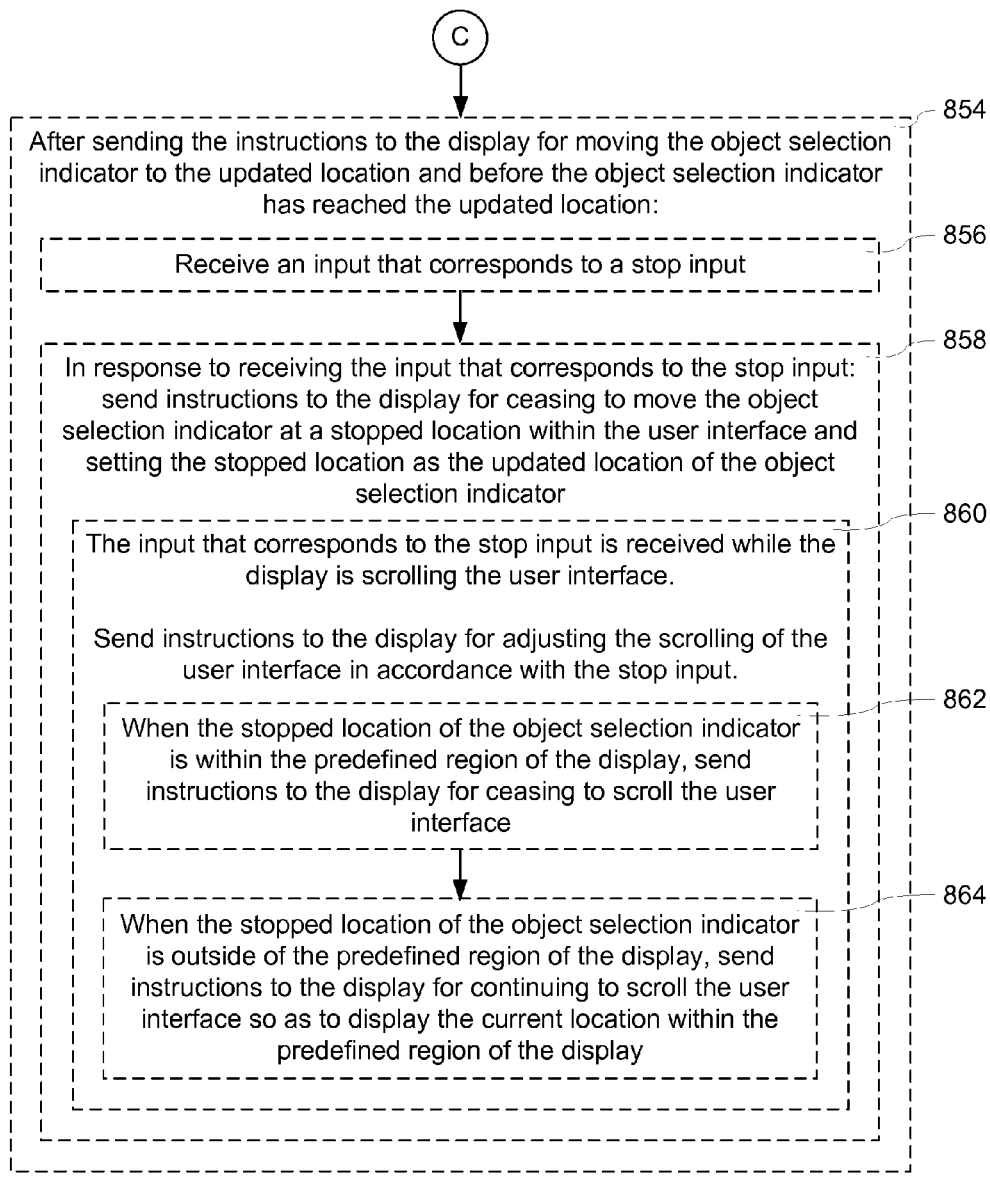
Figure 8E:
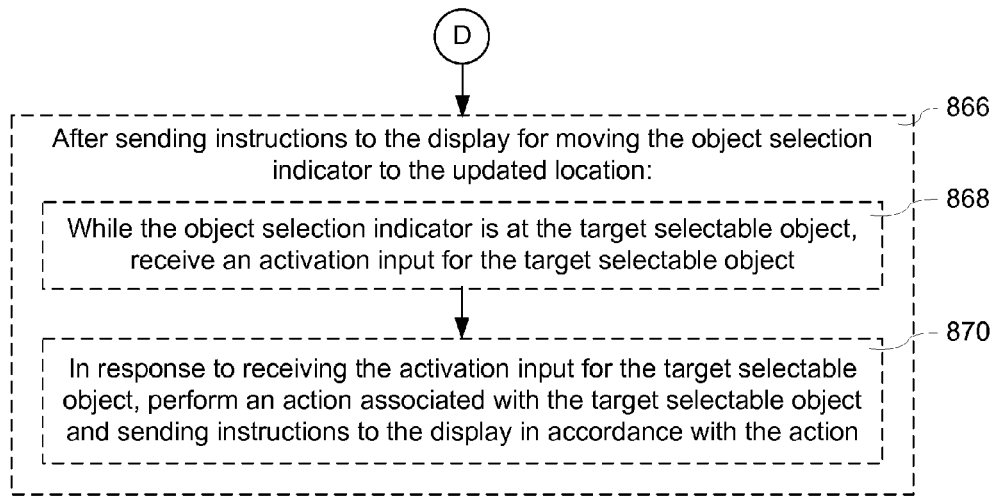
Figure 9A:
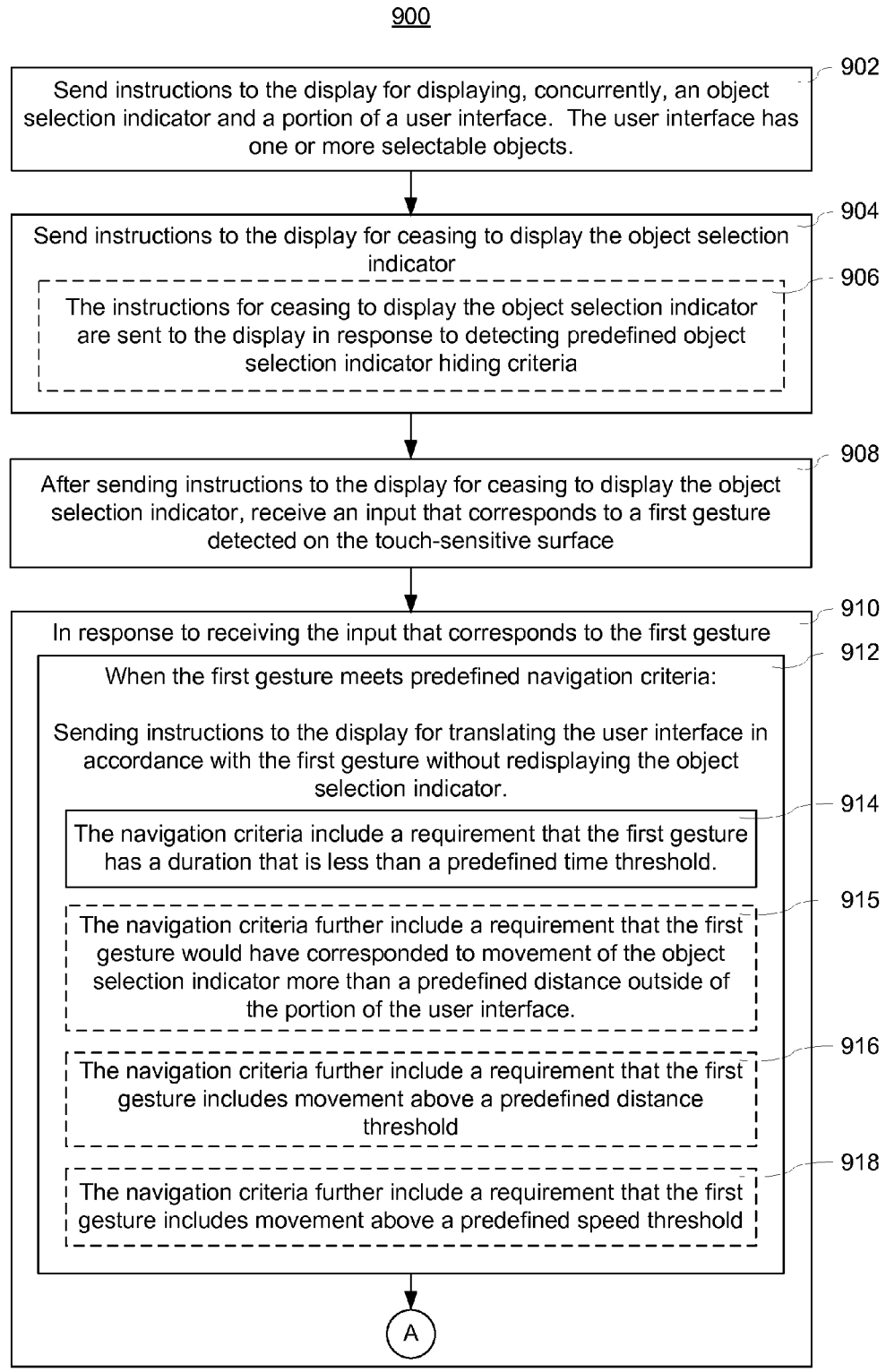
FIGS. 9A-9D are flow diagrams illustrating a method of navigating through a user interface by translating a user interface or redisplaying an object selection indicator in accordance with some embodiments.
Figure 9B:
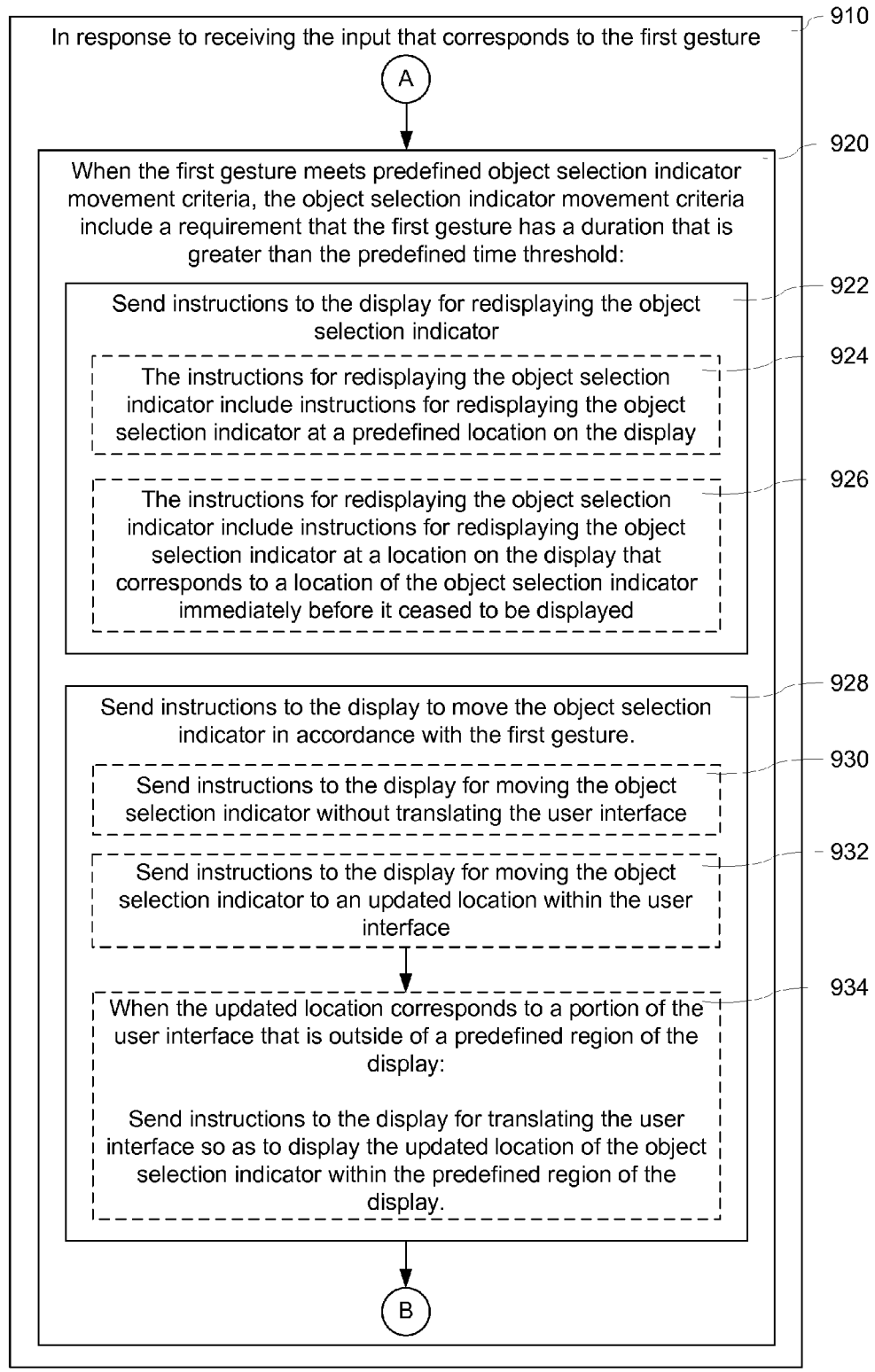
Figure 9C:
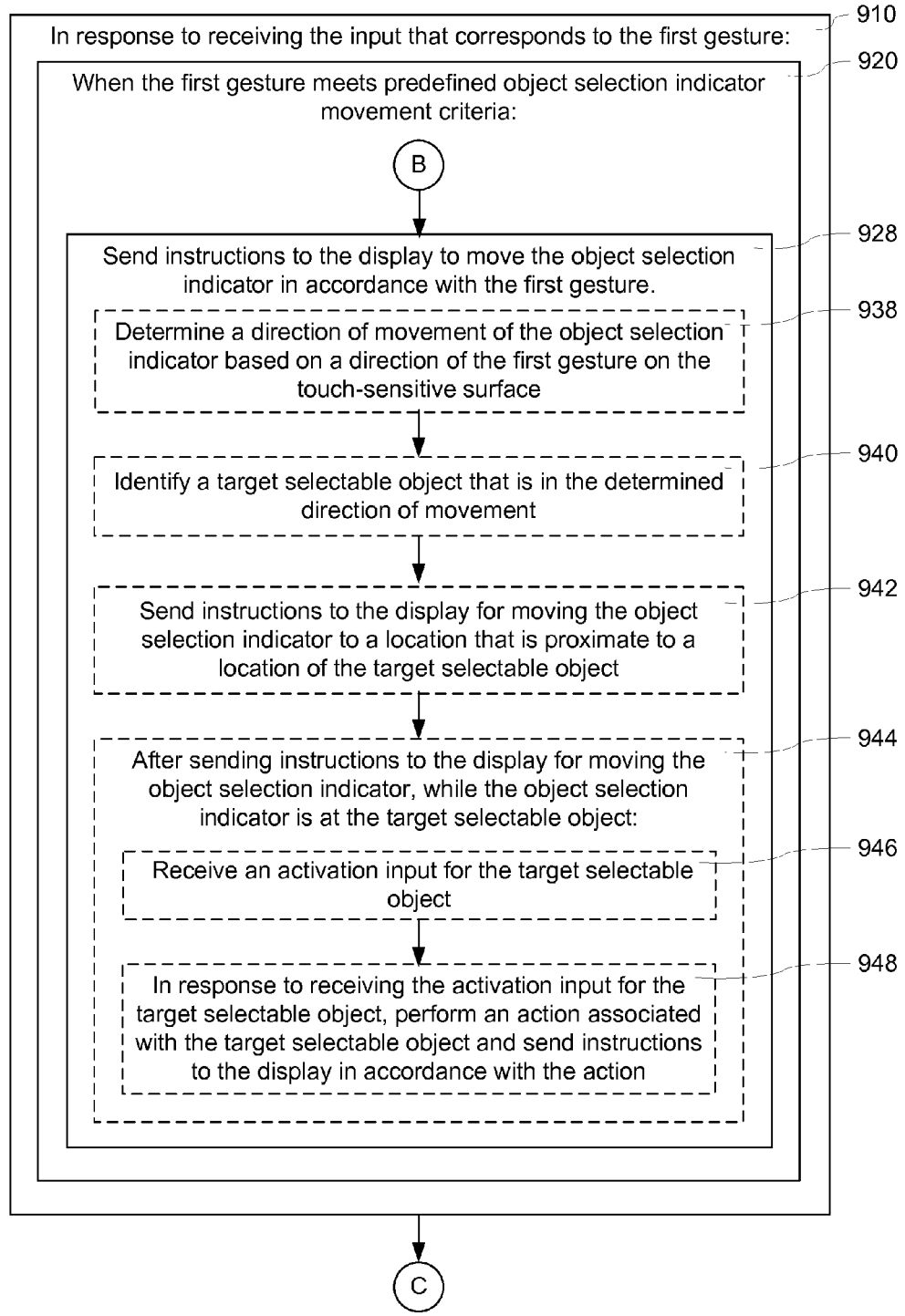
Figure 9D:
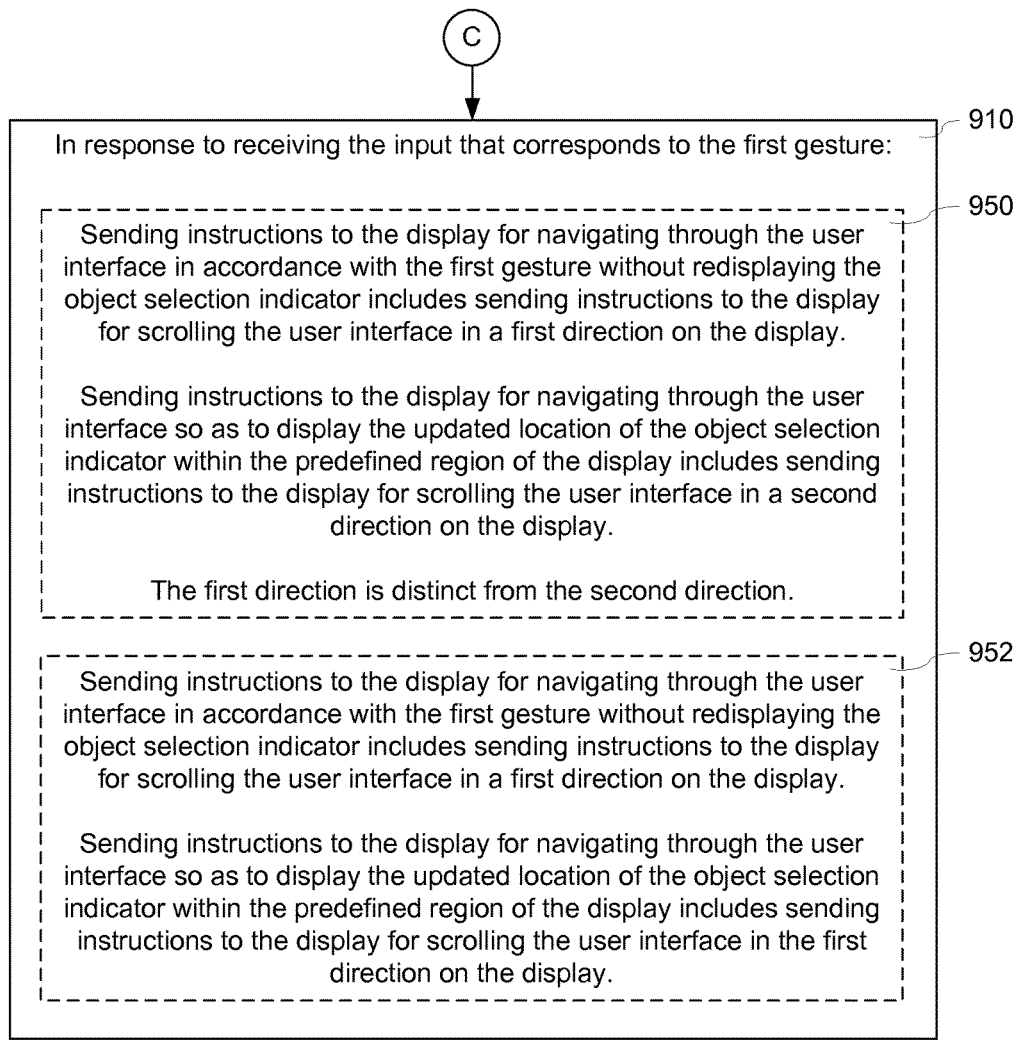

FIGS. 7A-7C are flow diagrams illustrating a method 700 of resizing an object selection indicator based on a size of a target selectable object in accordance with some embodiments. The method 700 is performed at a computing device (e.g., device 300, FIG. 3, or portable multifunction device 100, FIGS. 1A-1B) that is in communication with a display (e.g., 450 in FIGS. 5A-5SS) and a touch-sensitive surface (e.g., 452 in FIGS. 5A-5SS). In some embodiments, the display and/or the touch-sensitive surface are separate from the device (e.g., either as part of separate computing devices or wirelessly connected to the computing device). In some embodiments, the display and/or the touch-sensitive surface are integrated into the computing device. In some embodiments, the display is a touch screen display and the touch-sensitive surface is on the display. In some embodiments, the display is separate from the touch-sensitive surface. Some operations in method 700 may be combined and/or the order of some operations may be changed.

As described below, the method 700 provides an intuitive way to indicate the selection of a selectable object to a user of a computing device. The method reduces the cognitive burden on a user when selecting target selectable objects using an object selection indicator, thereby creating a more efficient human-machine interface. For battery-operated computing devices, enabling a user to select target selectable objects using an object selection indicator faster and more efficiently conserves power and increases the time between battery charges.

The computing device sends (702) instructions to the display 450 for displaying at least a portion of a user interface, the user interface having one or more selectable objects. For example, in FIG. 5A a portion of a webpage is displayed on the display 450. It should be understood that, although only a portion of the user interface is displayed in this example, in some embodiments the entire user interface is displayed on the display 450 (e.g., by displaying a smaller user interface or by displaying the user interface at a lower magnification). Additionally, while the examples described herein primarily refer to the user interface as a webpage, it should be understood that the user interface could be any user interface that includes selectable objects (e.g., an application user interface, an electronic document, an operating system user interface, etc.) The user interface has one or more selectable objects (e.g., 5006 in FIGS. 5A-5SS). In some embodiments, the user interface includes a plurality of selectable objects. In some embodiments, the user interface includes an electronic document with a plurality of selectable objects. In some embodiments, the selectable objects include one or more hyperlinks (e.g., 5006-1, 5006-2, 5006-3, 5006-4, 5006-5 in FIG. 5A), photos, advertisements (e.g., 5006-7 and 5006-8 in FIG. 5A) blocks of text, videos (e.g., 5006-8, 5006-9 in FIG. 5A), icons, text fields, option selection interfaces or the like.

The computing device receives (704) an input that corresponds to a first gesture detected on the touch-sensitive surface 452. In some embodiments, the gesture is a tap and hold gesture, a tap and drag gesture, a flick gesture or other contact-based gesture. In some embodiments, the input is received at the computing device from a remote device (e.g., either raw contact data or processed gesture outputs). For example in FIGS. 5I-5L, the touch-sensitive surface 452 detects a gesture including a contact 5024 on the touch-sensitive surface 452 and subsequent movement (e.g., from a first location 5024-a in FIGS. 5I-5J to a second location 5024-b in FIG. 5K to a third location 5024-c in FIG. 5L) of the contact 5024 across the touch-sensitive surface 452 and sends an input to the computing device that corresponds to the detected gesture. In some other embodiments, the input is received from a touch-sensitive surface 452 that is integrated with the computing device (e.g., a touchpad on a laptop or a touch screen display).

The computing device sends (706) instructions to the display 450 for displaying an object selection indicator at a first size (e.g., in FIG. 5I the object selection indicator 5010 is displayed at a first size that is sufficient to surround the "government" hyperlink 5006-5). In some embodiments, the object selection indicator is displayed in response to detecting the first gesture. In other words, in some embodiments, prior to detecting the contact (e.g., 5024 in FIG. 5I) the object selection indicator (e.g., 5010 in FIG. 5I) is not displayed. In some embodiments, the object selection indicator is a dynamic object selection indicator (e.g., an object selection indicator that changes size and/or shape in response to inputs received from the user to conform to the size and/or shape of a target selectable object, as described herein).

In some embodiments, the computing device identifies (708) the target selectable object in accordance with the first gesture. For example, in FIG. 5L, the computing device identifies a selectable object 5006-7 that is within a predefined radius 5028 of the object selection indicator 5010 as the target selectable object.

In some embodiments, the device fails to identify a target selectable object (e.g., within the predefined radius), and the object selection indicator is displayed at a location in the user interface that is determined based on the first gesture, as described above in greater detail above with reference to method 600. For example in FIGS. 5D-5G the computing device moves the object selection indicator 5010 to a location (e.g., location 5010 in FIG. 5G) within the user interface that is determined based on the first input (e.g., contact 5016 in FIG. 5D and subsequent movement of the contact across the touch-sensitive surface 452). In some embodiments, the object selection indicator ceases to be displayed after a predetermined period of time, as described in greater detail with reference to method 900 below. For example, the object selection indicator (e.g., 5010 in FIG. 5G) would cease to be displayed after a predetermined time period.

In some embodiments, identifying the target selectable object includes: calculating (710) a trajectory of the object selection indicator based on simulated physical properties of the object selection indicator, as described in greater detail above with reference to FIGS. 5A-5D. In some embodiments, the simulated physical properties are (712) selected from the set consisting of: inertia, friction and elasticity. In some embodiments, the identifying the target selectable object also includes identifying (714) a selectable object in the one or more selectable objects that is closest to a termination point of the trajectory as the target selectable object, as described in greater detail above with reference to FIGS. 5A-5D.

In some embodiments, in response to identifying the target selectable object, the computing device sends (716) instructions to the display 450 for displaying a selection preview indicator proximate to or at the target selectable object (e.g., the selection preview indicator is a box around a respective selectable object that indicates to the user that the respective selectable object will be the target selectable object if the device detects a selection input such as a mouse-up gesture or contact release gesture). In some embodiments, the object selection indicator is displayed at a predefined size (e.g., the size of the object selection indicator 5010 in FIG. 5L) in response to detecting predefined criteria (e.g., detecting a contact 5024 with the touch-sensitive surface 452 for more than a predefined period of time, such as 0.5 seconds, 1 second, 2 seconds or any reasonable period of time). In some embodiments, the selection preview indicator is displayed when the object selector is displayed at the predefined size (e.g., when the object selection indicator is in "cursor mode"). For example, in FIG. 5L, a selection preview indicator (e.g., the grey shading over the "advertisement 2" selectable object 5006-7 in FIG. 5L) is displayed, which indicates to the user that the respective selectable object (e.g., 5006-7 in FIG. 5L) will be the target selectable object if the contact is lifted off of the touch-sensitive surface 452 (e.g., as illustrated in FIG. 5M, where the object selection indicator 5010 is surrounding the "advertisement 2" selectable object 5006-7).

In response receiving the input that corresponds to the first gesture (e.g., contact 5024 and movement of the contact from a first location 5024-a in FIGS. 5I-5J to a second location 5024-b in FIG. 5K to a third location 5024-c in FIG. 5L), the computing device sends (718) instructions to the display 450 for moving the object selection indicator towards a target selectable object of the one or more selectable objects in accordance with the first gesture. In some embodiments, moving the object selection indicator towards a target selectable object includes moving the object selection indicator to a target selectable object. For example, in FIG. 5I, at the start of the first gesture (e.g., the tap-and-drag gesture including contact 5024) the object selection indicator is displayed at a first location in the user interface (e.g., the location of the object selection indicator 5010 in FIG. 5I), while after first gesture has ended (e.g., in FIG. 5M after detecting liftoff of the contact 5024), the object selection indicator (e.g., 5010 in FIG. 5M) is displayed surrounding the target selectable object (e.g., "advertisement 2" 5006-7 in FIG. 5M).

In some embodiments, the movement is in response to a flick gesture on the touch-sensitive surface 452 in a direction that corresponds to a direction on the display 450 towards the target selectable object (e.g., as described in greater detail above with reference to contact 5008 and subsequent movement of the contact across the touch-sensitive surface 452). In some embodiments, the movement is in response to a tap and drag gesture (e.g., contact 5024 in FIGS. 5I-5L) on the touch-sensitive surface 452 to a location on the touch-sensitive surface 452 that corresponds to a location (e.g., the location of the object selection indicator 5010 in FIG. 5L) on the display 450 that is proximate to the target selectable object (e.g., 5006-7 in FIG. 5L). It should be understood that operations that are performed in accordance with the first gesture are made in accordance with an input that corresponds to the first gesture (e.g., when the first gesture is detected at a touch-sensitive surface 452 that is distinct from the computing device and the touch-sensitive surface 452 sends the input to the computing device).

In some embodiments, the object selection indicator is moved in accordance with a trajectory. In some embodiments, when the trajectory intersects with a boundary of the user interface, sending instructions to the display 450 for moving the object selection indicator includes sending (720) instructions to the display 450 for displaying an animation of the object selection indicator bouncing off of the boundary of the user interface, as described in greater detail below with reference to FIGS. 5M-5O.

In some embodiments, sending instructions to the display 450 for moving the object selection indicator towards the target selectable object includes sending (722) instructions to the display 450 for moving the object selection indicator to a location of the target selectable object within the user interface (e.g., the instructions sent to the display 450 include instructions to resize the object selection indicator so as to encompass, border, enclose, or otherwise highlight the target selectable object). For example in FIGS. 5I-5M, the object selection indicator 5010 is moved to a location that corresponds to the target selectable object (e.g., in FIG. 5M the object selection indicator 5010 encompasses the "advertisement 2" selectable object 5006-7).

After receiving an input that corresponds to detecting an end of the first gesture, the computing device sends (724) instructions to the display 450 for resizing the object selection indicator to a second size, wherein the second size is based on a size of the target selectable object, and the second size is distinct from the first size. For example, in FIG. 5M, the computing device receives an input that corresponds to a liftoff of contact 5024-c (FIG. 5L) from the touch-sensitive surface 452. In this example, after (or in response to) detecting the liftoff of the contact, the computing device displays the object selection indicator (e.g., 5010 in FIG. 5M) at a second size that is different from the first size (e.g., the size of the object selection indicator 5010 in FIG. 5I). In some embodiments, there is only one selectable object, and then the single selectable object is the target object. In some embodiments, the object selection indicator also moves towards the target selectable object (e.g., the object selection indicator moves from a location 5010 in FIG. 5I that is proximate to a first selectable object 5006-5 in FIG. 5I to a location 5010 in FIG. 5M that is proximate to a second selectable object 5006-7 in FIG. 5M). In some embodiments, the resizing is performed in response to receiving an input that corresponds to detecting an end of the first gesture (e.g., the resizing is performed in response to receiving an input that corresponds to detecting liftoff of a contact 5024 from the touch-sensitive surface 452).

In some embodiments, sending instructions to the display 450 for resizing the object selection indicator includes sending (726) instructions to the display 450 for resizing the object selection indicator from the first size to the second size. In some embodiments, the device displays an animation of the object selection indicator resizing from the first size to the second size. For example in FIGS. 5A-5D the computing device sends instructions to the display to display the object selection indicator 5010 changing from a first size (e.g., as illustrated by object selection indicator 5010 in FIG. 5A) to a second size (e.g., as illustrated by object selection indicator 5010 in FIG. 5D). In some embodiments, the animation includes displaying the object selection indicator smoothly changing size (e.g., from 5010-a to 5010-b to 5010-c in FIG. 5C) as it moves from a first selectable object (e.g., 5006-3 in FIG. 5C) towards a second selectable object (e.g., 5006-6 in FIG. 5C). In some embodiments the animation shows the object selection indicator changing directly from the first size to the second size, as illustrated in FIGS. 5A-5D.

It advantageous to resize the object selection indicator dynamically to match a size of a target selectable object to clearly indicate to a user which object is currently selected by the object selection indicator. This visual feedback improves the ease with which the user understands the actions that will be performed by the computing device if the user chooses to activate the selectable object that is currently selected, thereby reducing the likelihood that the user will activate a selectable object by accident.

In some embodiments, the object selection indicator has a first location at the end of the first gesture; and the computing device sends (728) instructions to the display 450 for displaying an animation of the object selection indicator moving from the first location to a second location that is proximate to the target selectable object. For example in FIG. 5L the object selection indicator 5010 has a first location at the end of the first gesture (e.g., when the device determines that the contact 5024-c in FIG. 5L has been terminated, as illustrated in FIG. 5M), and thereafter the device instructs the display to display an animation of the object selection indicator transitioning from the first location (e.g., 5010 in FIG. 5L) to a second location (e.g., 5010 in FIG. 5M) where the object selection indicator is encompassing the target selectable object (e.g., the "advertisement 2" selectable object 5006-7 in FIG. 5M).

In some embodiments, the input received by the device that corresponds to the first gesture indicates that the first gesture includes contact with the touch-sensitive surface 452 for a time that is greater than a predetermined time threshold, and, while continuing to detect the input that corresponds to the contact on the touch-sensitive surface 452, the device sends (730) instructions to the display 450 for displaying the object selection indicator at a predefined size. For example, in FIG. 5I, the computing device detects an input that corresponds to a contact 5024-*a* with the touch-sensitive surface 452 while the object selection indicator is at a first size (e.g., 5010 in FIG. 5I). Continuing this example, after the contact has been detected for more than a predetermined time threshold (e.g., 0.1 seconds, 0.2 seconds, 0.3 seconds, 0.5 seconds, 1 second, 2 seconds or any reasonable threshold) on the touch-sensitive surface, the computing device determines the contact (e.g., 5024-*a* in FIG. 5J) has been detected for more than the predetermined time threshold, and in response the computing device sends instructions to the display 450 to display the object selection indicator at a predefined size (e.g., 5010 in FIG. 5J).

In some embodiments, sending instructions to the display 450 for displaying the object selection indicator at a predefined size includes sending (732) instructions to the display 450 for resizing the object selection indicator from the first size to the predefined size. In some of these embodiments, the computing device sends instructions to the display 450 for displaying an animation of the object selection indicator resizing from the first size to the predefined size. For example, in FIGS. 5I-5J the computing device would send instructions to the display 450 for displaying the object selection indicator shrinking from the first size (e.g., 5010 in FIG. 5I) to the predefined size (e.g., 5010 in FIG. 5J).

In some embodiments, while the computing device continues to detect that the contact (e.g., 5024 in FIGS. 5I-5L) is maintained on the touch-sensitive surface 452, the computing device continues to send instructions to the display 450 to display the object selection indicator at the predefined size (e.g., 5010 in FIGS. 5J-5L). In some embodiments, while the computing device continues to detect that the contact (e.g., 5024 in FIGS. 5I-5L) is maintained on the touch-sensitive surface 452, the computing device sends instructions to the display 450 to move the object selection indicator in accordance with movements of the contact. For example, in FIG. 5J the computing device receives an input on the touch-sensitive surface 452 (e.g., movement of contact 5024 from 5024-*a* in FIG. 5J to 5024-*b* in FIG. 5K) that corresponds to movement of the contact upwards on the display 450 and sends instructions to the display 450 to move the object selection indicator upwards on the display (e.g., from 5010 in FIG. 5J to 5010 in FIG. 5K). Continuing this example, in FIG. 5K the computing device receives an input that corresponds to movement of the contact to the left (e.g., from 5024-*b* in FIG. 5K to 5024-*c* in FIG. 5L) on the touch-sensitive surface 452 and sends instructions to the display to move the object selection indicator towards the left on the display (e.g., from 5010 in FIG. 5K to 5010 in FIG. 5L). Additionally, FIG. 5K and FIG. 5L also illustrate the display of a selection preview indicator (e.g., the shaded overlay over various selectable user interface objects within the user interface) indicating the selectable object (e.g., 5006-4 in FIGS. 5K and 5006-7 in FIG. 5L) that would be identified as the target selectable object if the computing device were to detect an input that corresponded to a liftoff of the contact from the touch-sensitive surface 452. For example, in FIG. 5K, the computing device determines (e.g., by identifying the closest selectable object to the object selection indicator 5010 that is within a predefined radius 5026 of the object selection indicator 5010 in FIG. 5K) that the "policy" hyperlink 5006-4 would be the target selectable object if the computing device were to receive an input that corresponded to a liftoff of contact 5024-*b* from the touch-sensitive surface and in response sends instructions to the display 450 for displaying shading over the "policy" hyperlink 5006-4.

In some embodiments, sending instructions to the display 450 for resizing the object selection indicator to the second size includes sending (734) instructions to the display 450 for resizing the object selection indicator from the predefined size to the second size (e.g., from the object selection indicator 5010 in FIG. 5L to the object selection indicator 5010 in FIG. 5M). In some embodiments, the computing device sends instructions to the display 450 for displaying an animation of the object selection indicator resizing from the predefined size to the second size. For example, the computing device sends instructions to the display 450 to display the object selection indicator expanding from the predefined size (e.g., 5010 in FIG. 5L) to the second size (e.g., 5010 in FIG. 5M). In other words, in some embodiments, when the computing device continues to receive input from the touch-sensitive surface 452 that corresponds to continuing to detect the contact, the computing device sends instructions to the display 450 such that the object selection indicator acts like a cursor (e.g., the object selection indicator has a predetermined size and moves in accordance with the movement of the contact and stops moving when the contact stops), as described in greater detail above with reference to FIGS. 5I-5M. In contrast, when the computing device receives an input that corresponds to just detecting a flick on the touch-sensitive surface 452, the computing device sends instructions to the display 450 such that the object selection indicator acts like a dynamic selection box (e.g., the object selection indicator moves in accordance with simulated physical properties and is resized directly from a first size to a second size as illustrated in FIGS. 5A-5D above).

In some embodiments, after sending instructions to the display 450 for resizing the object selection indicator to the second size, while the object selection indicator is at the target selectable object, the computing device receives (736) an activation input for the target selectable object (e.g., a single tap gesture, a double tap gesture, an "enter" command, etc.) from the touch-sensitive surface 452 or other input device. In response to receiving the activation input for the target selectable object, the computing device performs (738) an action associated with the target selectable object and sends instructions to the display 450 in accordance with the action (e.g., navigating to a user interface based on a hyperlink associated with the target selectable object, entering a text entry field, changing a state of a selection field such as a radio button, check box, etc.). For example, in FIG. 5M, the computing device receives an input that corresponds to a tap gesture (e.g., 5030 in FIG. 5M) on the touch-sensitive surface 452, and in response to receiving the input, the computing device accesses an advertisement associated with the "advertisement 2" selectable object 5006-7 and sends instructions to the display 450 to display the advertisement associated with the selectable object (not shown).

In some embodiments, the object selection indicator is moved in accordance with a trajectory. In some embodiments, when the trajectory intersects with a boundary of the user interface, sending instructions to the display 450 for moving the object selection indicator includes sending (720) instructions to the display 450 for displaying an animation of the object selection indicator bouncing off of the boundary of the user interface. For example, in FIG. 5M, the computing device receives an input that corresponds to a gesture detected on a touch-sensitive surface (e.g., contact 5032 and subsequent movement of the contact across the touch-sensitive surface 452 in FIG. 5M). In response to detecting the input, the computing device determines a trajectory (e.g., 5034 in FIG. 5N) of the object selection indicator (e.g., 5010 in FIGS. 5M-5N). In some embodiments the trajectory is determined in accordance with simulated physical properties of the object selection indicator as discussed in greater detail above. Continuing the example from above, as illustrated in FIG. 5N, the trajectory 5034 intersects with a top boundary of the user interface (e.g., a top of the webpage that is shown at the top of the display 450) and the trajectory 5034 reflects off of the boundary of the user interface. Consequently, in this example, when the object selection indicator moves along the trajectory (e.g., from a first location 5010-a in FIG. 5N to a second location 5010-b in FIG. 5N to a third location 5010-c in FIG. 5N to a fourth location 5010-d in FIG. 5N and final location 5010 in FIG. 5O) it appears to "bounce" off of the boundary of the user interface (e.g., as though the boundary was made of rubber and the object selection indicator is a physical object with inertia). Additionally, the object selection indicator 5010 in FIGS. 5M-5O is shown changing size from a first size (e.g., 5010 in FIG. 5M) that is based on a size of a first selectable object (e.g., 5006-7 in FIGS. 5M-5O) to a second size (e.g., 5010 in FIG. 5O) that is based on a size of a second selectable object (e.g., 5006-2 in FIGS. 5M-5O).

Note that details of other processes described herein with respect to methods 600, 800, 900 (e.g., FIGS. 6A-6C, 8A-8E, 9A-9D and 5A-5SS) are also applicable in an analogous manner to the method 700 described above. For example, the selectable objects 5006 (e.g., hyperlinks, advertisements, images, videos) and object selection indicator 5010 described with reference to FIGS. 7A-7C may have one or more of the characteristics of the various selectable objects 5006 and object selection indicator 5010 described herein with reference to any of methods 600, 800 and/or 900. For brevity, these details are not repeated here.

FIGS. 8A-8E are flow diagrams illustrating a method 800 of moving an object selection indicator and scrolling a user interface in accordance with the movement of the object selection indicator in accordance with some embodiments. The method 800 is performed at a computing device (e.g., device 300, FIG. 3, or portable multifunction device 100, FIGS. 1A-1B) that is in communication with a display (e.g., 450 in FIGS. 5A-5SS) and a touch-sensitive surface (e.g., 452 in FIGS. 5A-5SS). In some embodiments, the display and/or the touch-sensitive surface are separate from the device (e.g., either as part of separate computing devices or wirelessly connected to the computing device). In some embodiments, the display and/or the touch-sensitive surface are integrated into the computing device. In some embodiments, the display is a touch screen display and the touch-sensitive surface is on the display. In some embodiments, the display is separate from the touch-sensitive surface. Some operations in method 800 may be combined and/or the order of some operations may be changed.

As described below, the method 800 provides an intuitive way to navigate in a user interface by moving an object selection indicator and scrolling a user interface in accordance with the movement of the object selection indicator. The method reduces the cognitive burden on a user when navigating in a user interface, thereby creating a more efficient human-machine interface. For battery-operated computing devices, enabling a user to move an object selection indicator within a user interface faster and more efficiently conserves power and increases the time between battery charges.

The computing device sends (802) instructions to the display 450 for displaying a portion of a user interface, the user interface having one or more selectable objects. For example, in FIG. 5O, a portion of a webpage is displayed on the display 450. While the examples described herein primarily refer to the user interface as a webpage, it should be understood that the user interface could be any user interface that includes selectable objects (e.g., an application user interface, an electronic document, an operating system user interface, etc.) The user interface has one or more selectable objects (e.g., 5006 in FIGS. 5A-5SS). In some embodiments, the user interface includes a plurality of selectable objects. In some embodiments, the user interface includes an electronic document with a plurality of selectable objects. In some embodiments, the selectable objects include one or more hyperlinks (e.g., 5006-1, 5006-2, 5006-3, 5006-4, 5006-5 in FIG. 5O), photos, advertisements (e.g., 5006-7 and 5006-8 in FIG. 5A) blocks of text, videos (e.g., 5006-8, 5006-9 in FIG. 5O), icons, text fields, option selection interfaces or the like.

The computing device receives (804) an input that corresponds to a first gesture detected on the touch-sensitive surface 452. In some embodiments, the gesture is a tap and hold gesture, a tap and drag gesture, a flick gesture or other contact-based gesture. In some embodiments, the input is received at the computing device from a remote device (e.g., either raw contact data or processed gesture outputs). For example, in FIG. 5O, the touch-sensitive surface 452 detects a gesture that includes a contact 5036 on the touch-sensitive surface 452 and subsequent movement of the contact 5036 across the touch-sensitive surface 452 and sends an input to the computing device that corresponds to the detected gesture. In some other embodiments, the input is received from a touch-sensitive surface 452 that is integrated with the computing device (e.g., a touchpad on a laptop or a touch screen display).

The computing device sends (806) instructions to the display 450 for displaying an object selection indicator (e.g., 5010 in FIG. 5O). In some embodiments, the object selection indicator is displayed in response to detecting the first gesture. In other words, in some embodiments, the object selection indicator 5010 in FIG. 5O is not displayed on the display 450 until after the contact 5036 has been detected on the touch-sensitive surface 452.

In response to receiving the input that corresponds to the first gesture, the computing device determines (808) an updated location for the object selection indicator within the user interface in accordance with the first gesture. In some embodiments, the movement is a flick in a first direction (e.g., contact 5036 in FIG. 5O and subsequent movement of the contact across the touch-sensitive surface 452). In some embodiments, the movement is a tap and drag gesture that includes movement in a first direction.

It should be understood that the updated location can be any location within the user interface, not merely a location within the currently displayed portion of the user interface. Thus the updated location can be either within the currently displayed portion of the user interface (e.g., as described in greater detail above with reference to FIGS. 5O-5P) or in a portion of the user interface that is not currently displayed (e.g., as described in greater detail below with reference to FIGS. 5T-5W). In other words, the computing device treats the object selection indicator as though it is a physical object that can move within the entire user interface. In some embodiments, when the object selection indicator moves beyond the boundaries of the display 450, the display 450 translates laterally to show the new location of the object selection indicator (e.g., as illustrated in FIGS. 5T-5W and described in greater detail below). It should be understood that, in some embodiments, operations that are performed in accordance with the first gesture are made in accordance with an input that corresponds to the first gesture (e.g., the operations are performed when the first gesture is detected at a touch-sensitive surface 452 that is distinct from the computing device and the touch-sensitive surface 452 sends the input to the computing device).

In some embodiments, determining the updated location for the object selection indicator includes: determining (810) a direction of movement of the object selection indicator based on the first gesture; identifying (812), as a target selectable object, a selectable object that is in the determined direction of movement; and selecting (814) a location within the user interface that is proximate to or at a location of the target selectable object as the updated location. For example in FIG. 5P, after receiving the input that corresponds to the first gesture (e.g., contact 5036 in FIG. 5O and subsequent movement of the contact along the touch-sensitive surface 452), the computing device determines a direction of movement of the first gesture (e.g., down and to the left as illustrated in FIG. 5O) and moves the object selection indicator (e.g., 5010 in FIGS. 5P-5Q) in a direction that corresponds to the direction of movement of the first gesture. Continuing this example, the computing device selects a location within the user interface that is proximate to a location of the target selectable object (the "policy" hyperlink selectable user interface object 5006-4 in FIG. 5P) as the updated location (e.g., as illustrated by the location of the object selection indicator 5010 in FIG. 5Q).

In some embodiments, determining the updated location for the object selection indicator includes: calculating (816) a trajectory of the object selection indicator based on the first gesture. In some embodiments, the trajectory is calculated (818) based on simulated physical properties of the object selection indicator. In some embodiments, the simulated physical properties are selected (820) from the set consisting of: inertia, friction and elasticity. In some embodiments, determining the updated location for the object selection indicator further includes identifying (822) a selectable object in the one or more selectable objects that is closest to a termination point of the trajectory as a target selectable object. In some embodiments, the device selects (824) a location within the user interface that is proximate to a location of the target selectable object as the updated location. In some embodiments, the updated location of the object selection indicator is coextensive with the location of the identified selectable object. In some embodiments, the updated location of the object selection indicator is adjacent to the location of the identified selectable object. For example, in FIG. 5P, after receiving the input that corresponds to the first gesture, the computing device determines a trajectory (e.g., 5040 in FIG. 5P) for the object selection indicator (e.g., 5010 in FIGS. 5P-5Q), determines an endpoint of the trajectory (e.g., an end of the arrow representing the trajectory 5040 in FIG. 5P), identifies a radius (e.g., 5042 in FIG. 5P), and identifies an updated location for the object selection indicator (e.g., a location that corresponds to the "policy" hyperlink selectable user interface object 5006-4 in FIG. 5P).

In some embodiments, the computing device determines (826) a movement path for the object selection indicator by adjusting the trajectory so that the updated location of the object selection indicator is an end point of the trajectory. In other words, the trajectory (e.g., 5040 in FIG. 5P) of the object selection indicator 5010 does not have an endpoint that is precisely at the target selectable object (e.g., 5006-4 in FIG. 5P), and thus the computing device determines a movement path that does have an endpoint at or near the target selectable object (e.g., 5006-4 in FIG. 5P). In some embodiments, the computing device sends (828) instructions to the display 450 for displaying an animation of the object selection indicator moving along the movement path. For example, the computing device sends instructions to the display 450 for translating the object selection indicator from a first location to a second location (e.g., from the location of the object selection indicator 5010 in FIG. 5P to the location of the object selection indicator 5010 in FIG. 5Q). In some embodiments, the object selection indicator is resized as it moves along the movement path, as described in greater detail above with reference to method 700.

In some embodiments, the computing device determines (830) a movement path for the object selection indicator from a current location of the object selection indicator to the updated location of the object selection indicator. In other words, in accordance with some embodiments, the computing device determines a location (i.e., the updated location) within the user interface (e.g., a selectable object) to which the object selection indicator will move based on the input that corresponds to the first gesture, and then determines a movement path that will move the object selection indicator from its current location within the user interface to the updated location. In some embodiments, the current location of the object selection indicator is a location of the object selection indicator when the device receives an input that corresponds to detection of an end of the first gesture. In other words, if the first gesture is a flick gesture, the current location will typically be proximate to a starting location of the object selection indicator (e.g., the location of the object selection indicator 5010 in FIG. 5P). In contrast, if a first gesture is a tap and drag gesture (e.g., the gesture including contact 5024 described in greater detail above with reference to FIGS. 5I-5L), then the current location will typically be proximate to the updated location of the object selection indicator (e.g., the location of the object selection indicator 5010 in FIG. 5L).

When the updated location is within a portion of the user interface that corresponds to a predefined region (e.g., region 5038 in FIGS. 5O-5W) of the display 450, the predefined region being a subset of the display 450: the computing device sends (832) instructions to the display 450 for moving the object selection indicator to the updated location without scrolling the user interface. In some embodiments, the subset of the display 450 is a region (e.g., 5038 in FIGS. 5O-5W) of the display 450 that excludes a predefined region around the perimeter of the display 450 (e.g., a 1 inch margin around the edge of the display is excluded from the region of the display). It should be understood that while the embodiments are described herein primarily with respect to a region that is only a subset of the display, in some embodiments the region includes the whole display and, for a current view of the user interface, locations that are outside of the predefined region are locations within the user interface that are not displayed in the current view of the user interface on the display (e.g., selectable objects that are off the edge of the display). In some embodiments, the computing device sends (834) instructions to the display 450 for displaying an animation of the object selection indicator moving along the movement path. In some embodiments, the object selection indicator is resized as it moves along the movement path, as described in greater detail above with reference to method 700.

Operations 840-852 are performed (838) when the updated location is outside of the portion of the user interface that corresponds to the predefined region of the display 450 (e.g., outside of region 5038 in FIG. 5Q).

The computing device sends (840) instructions to the display 450 for moving the object selection indicator to the updated location. In some embodiments, the computing device sends (842) instructions to the display 450 for displaying an animation of the object selection indicator moving along the movement path. In some embodiments, the object selection indicator is resized as it moves along the movement path, as described in greater detail above with reference to method 700. For example, in FIG. 5Q, the computing device receives an input that corresponds to a first gesture (e.g., contact 5044 in FIG. 5Q and subsequent movement of the contact 5044 across the touch-sensitive surface 452). Continuing this example, the computing device determines a trajectory 5046 based on the input, determines an endpoint of the trajectory and identifies a selectable object (e.g., the "government" hyperlink selectable object 5006-5 in FIG. 5R) that is within a predefined radius (e.g., 5048 in FIG. 5R) from the endpoint. In this example, the computing device sends instructions to the display for moving the object selection indicator (e.g., 5010 in FIG. 5R) to the updated location (e.g., instructions to move the object selection indicator 5010 to a location in the user interface that is proximate to the "government" hyperlink selectable object 5006-5, as illustrated in FIG. 5S).

The computing device sends (844) instructions to the display 450 for scrolling the user interface so as to display the updated location within the predefined region of the display 450. For example in FIG. 5R the updated location (e.g., the location proximate to the "government" hyperlink selectable object 5006-5) is outside of the predefined region 5038, while in FIG. 5S the user interface has been scrolled upwards on the display 450 so that the updated location (e.g., the location that is proximate to the "government" hyperlink selectable object 5006-5) is within the predefined region 5038. In some embodiments, sending instructions to the display 450 for moving the object selection indicator includes sending (846) instructions specifying: a faster phase wherein, during the faster phase, the object selection indicator is moved faster than the user interface is scrolled; and a slower phase wherein, during the slower phase, the object selection indicator is moved more slowly than the user interface is scrolled. In some embodiments, the slower phase follows the faster phase. In some embodiments, the faster phase follows the slower phase. In other words, in some embodiments, the object selection indicator 5010 is initially moved within the user interface more quickly than the user interface is scrolled on the display 450, and subsequently the object selection indicator 5010 is moved within the user interface more slowly than the user interface is scrolled on the display 450 so that the scrolling of the user interface can catch up to the movement of the object selection indicator 5010. In contrast, in other embodiments, the object selection indicator 5010 is initially moved within the user interface more slowly than the user interface is scrolled on the display 450, and subsequently the object selection indicator 5010 is moved within the user interface more quickly than the user interface is scrolled on the display 450 so that the movement of the object selection indicator 5010 can catch up with the scrolling of the user interface.

In some embodiments, the instructions that are sent to the display 450 for the movement of the object selection indicator and the instructions that are sent to the display 450 for the scrolling of the user interface are determined (848) based on simulated physical properties including friction and inertia. In some embodiments, the coefficient of friction for the user interface is greater than the coefficient of friction for the object selection indicator (e.g., the speed of scrolling of the user interface increases/decreases more slowly than the speed of movement of the object selection indicator increases/decreases). In other words, the computing device sends instructions to the display 450 such that the object selection indicator will move off the screen and the user interface will scroll so as to "catch up" to the object selection indicator. In some embodiments, the coefficient of friction for the user interface is less than the coefficient of friction for the object selection indicator (e.g., the speed of scrolling of the user interface increases/decreases more quickly than the speed of movement of the object selection indicator increases/decreases). In other words, the computing device sends instructions to the display 450 such that the user interface will scroll to the updated location and the object selection indicator will move so as to "catch up" to the user interface. In some embodiments, the simulated physical properties of the object are adjustable (e.g., the user can determine the relative coefficient of friction of the object selection indicator and the user interface).

For example, in FIG. 5S, after detecting the input that corresponds to the first gesture (e.g., contact 5044 and subsequent movement of the contact across the touch-sensitive surface), the computing device sends instructions to move the object selection indicator (e.g., 5010 in FIGS. 5R-5S) within the user interface faster than the user interface is scrolled, as illustrated in FIGS. 5R-5S. Thus, in this example, the object selection indicator moves from a central location on the display to an edge of the display (e.g., because the object selection indicator 5010 is moving towards the selectable object 5006-5 faster than the portion of the user interface that includes the selectable object is being scrolled towards the center of the screen), as illustrated in FIG. 5S. Subsequently, in this example, the computing device sends instructions to move the object selection indicator (e.g., 5010 in FIGS. 5S-5T) within the user interface more slowly than the user interface is scrolled, as illustrated in FIGS. 5R-5S. Thus, in this example, the object selection indicator moves from a location near an edge of the display to location near the center of the display (e.g., because the object selection indicator 5010 has reached the selectable object 5006-5 and stopped moving and thus is moving more slowly than the portion of the user interface that includes the selectable object is being scrolled towards the center of the screen), as illustrated in FIG. 5T.

In some embodiments, sending instructions to the display 450 for scrolling the user interface so as to display the updated location within the predefined region of the display 450 includes sending (850) instructions to the display 450 for scrolling the user interface so that the object selection indicator is proximate to or at an edge the predefined region of the display 450 (e.g., the user interface is only scrolled as far as is necessary to place the object selection indicator just within the predefined region of the display 450). For example, in FIGS. 5Q-5S, in response to receiving an input that corresponds to a first gesture (e.g., contact 5044 and subsequent movement of the contact across the touch-sensitive surface) the object selection indicator 5010 is moved to the updated location (e.g., a location proximate to the "government" hyperlink 5006-5 in FIG. 5R), and the user interface is only scrolled upwards on the display as far as is necessary to display the object selection indicator 5010 within the predefined region 5038 (e.g., FIG. 5S), rather than continuing to scroll towards the center of the display (e.g., FIG. 5T).

In some embodiments, sending instructions to the display 450 for scrolling the user interface so as to display the updated location within the predefined region of the display 450 includes sending (852) instructions to the display 450 for scrolling the user interface so that the object selection indicator is proximate to or at center of the predefined region of the display 450 (e.g., the user interface is scrolled so that the object selection indicator is at the center of the display 450 when the predefined region is centered on the display 450). For example, in FIGS. 5Q-5T, in response to receiving an input that corresponds to a first gesture (e.g., contact 5044 and subsequent movement of the contact across the touch-sensitive surface 452 in FIG. 5Q) the object selection indicator 5010 is moved to the updated location (e.g., a location proximate to the "government" hyperlink 5006-5 in FIG. 5R), and the user interface scrolled upwards on the display (e.g., as illustrated in FIGS. 5S-5T) so as to display the object selection indicator 5010 proximate to the center of the predefined region 5038, as illustrated in FIG. 5T.

As another example of these embodiments, the computing device receives an input that corresponds to a gesture (e.g., contact 5050 in FIG. 5T and subsequent movement of the contact on the touch-sensitive surface 452), and in response to the gesture the computing device determines an updated location for the object selection indicator (e.g., by determining a trajectory 5052 in FIG. 5U of the object selection indicator 5010, and identifying a selectable object such as the "long remember" hyperlink selectable object 5006-10 in FIG. 5V that is proximate to an endpoint of the trajectory.) In this example, the computing device sends instructions to the display to move the object selection indicator 5010 from a current location within the user interface (e.g., the location of the object selection indicator 5010 in FIG. 5U) to the updated location within the user interface (e.g., the location of the object selection indicator 5010 in FIG. 5V) that is proximate to a target selectable object (e.g., "long remember" hyperlink selectable object 5006-10). It should be noted that, in this example, the updated location is at a location in the user interface that is not displayed on the display 450 when the gesture is detected. Continuing with this example, the computing device sends instructions to the display 450 to initially scroll the user interface on the display 450 more slowly than the object selection indicator is moved, so that the object selection indicator moves to an edge of the display 450 (or even entirely off of the display 450). Subsequently, the object selection indicator (e.g., 5010 in FIG. 5V) reaches the updated location (e.g., the "long remember" hyperlink selectable object 5006-10) and the object selection indicator stops moving within the user interface while the user interface continues to be scrolled on the display (e.g., as illustrated in FIGS. 5V-5W) until the object selection indicator (e.g., 5010 in FIG. 5W) is in the center of the predefined region (e.g., 5038 in FIG. 5W).

It is advantageous to scroll the user interface automatically when the updated location of the object selection indicator is outside of a predefined region of the display because such scrolling allows the user to move the object selection indicator and not perform additional inputs in order to scroll the user interface to show the current location of the object selection indicator, thereby creating a more efficient user interface by reducing the number of inputs required to perform user interface navigation operations. Additionally, it is advantageous to only scroll the user interface automatically when the updated location of the object selection indicator is outside of the predefined region, because such scrolling avoids scrolling the user interface when the user is making fine adjustments to the location of the object selection indicator, thereby reducing jitter and user confusion that would result from too frequent scrolling of the user interface.

In some embodiments, operations 856-864 are performed (854) after sending the instructions to the display 450 for moving the object selection indicator to the updated location and before the object selection indicator has reached the updated location. For example, the operations below are performed after receiving an input that corresponds to a gesture (e.g., contact 5054 (FIG. 5W) and subsequent movement of the contact across the touch-sensitive surface 452) on the touch-sensitive surface 452 but before the updated location has been reached (e.g., while the object selection indicator is still moving along a trajectory 5056 (FIG. 5X) that was determined based on the gesture on the touch-sensitive surface 452). The computing device receives (856) an input that corresponds to a stop input (e.g., a tap and hold gesture 5058 in FIG. 5Y or 5060 in FIG. 5Z that is detected anywhere on the touch-sensitive surface 452). In these embodiments, in response to receiving the input that corresponds to the stop input, the computing device sending (858) instructions to the display 450 for ceasing to move the object selection indicator at a stopped location within the user interface and sets the stopped location as the updated location of the object selection indicator. For example, if the computing device received an input that corresponds to a stop input (e.g., tap gesture 5058 in FIG. 5Y) while the object selection indicator (e.g., 5010 in FIG. 5Y) is moving along a trajectory (e.g., 5056 in FIG. 5Y) the computing device sends instructions to the display to stop moving the object selection indicator (e.g., at a current location of the object selection indicator 5010 in FIG. 5Y within the user interface).

In some embodiments, an input that corresponds to the stop input is received while the display 450 is scrolling the user interface, and the method further comprises sending (860) instructions to the display 450 for adjusting the scrolling of the user interface in accordance with the stop input (e.g., the computing device instructs the display to stop scrolling or scroll more slowly or in a different direction in response to receiving an input that corresponds to a stop input on the touch-sensitive surface 452). In some embodiments, sending instructions to the display 450 for adjusting the scrolling of the user interface includes: when the stopped location of the object selection indicator is within the predefined region of the display 450, sending (862) instructions to the display 450 for ceasing to scroll the user interface; and when the stopped location of the object selection indicator is outside of the predefined region of the display 450, sending (864) instructions to the display 450 for continuing to scroll the user interface so as to display the current location within the predefined region of the display 450. In other words, the movement of the object selection indicator within the user interface stops immediately, and the user interface is only scrolled as far as is necessary to display the object selection indicator within the predefined region 5038 of the display 450.

Figure 5Z:
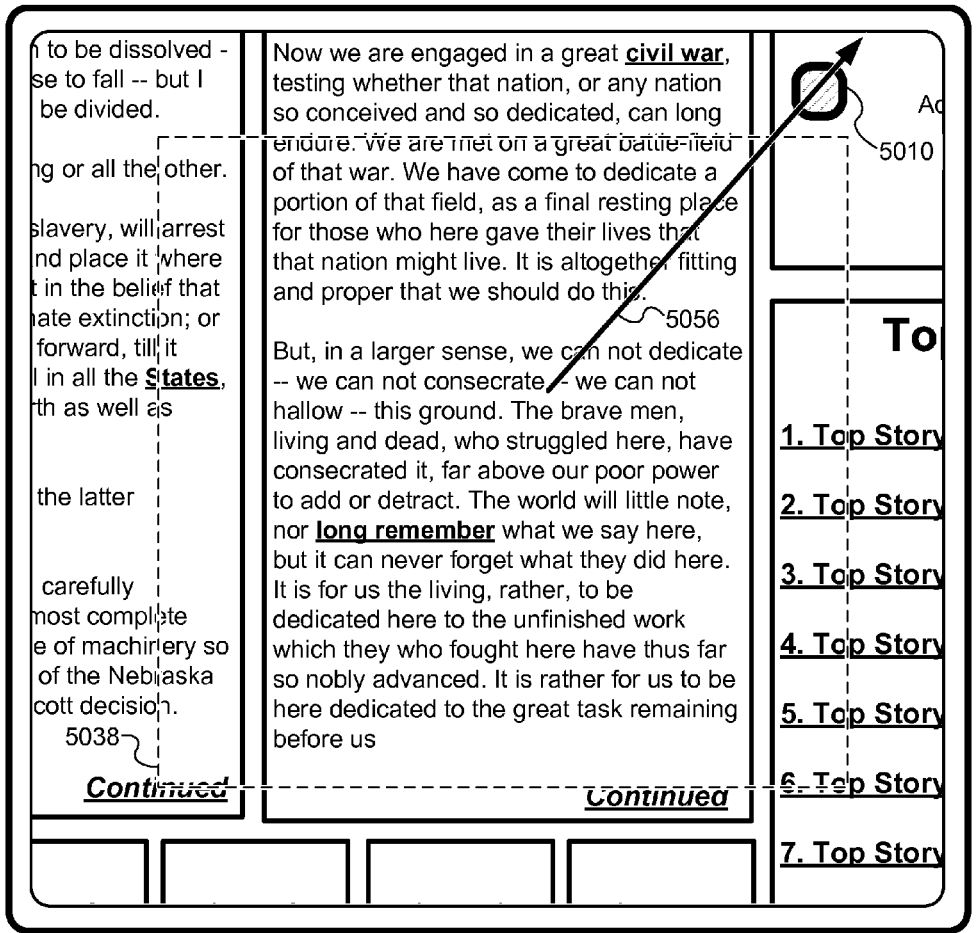
Figure 5Z:
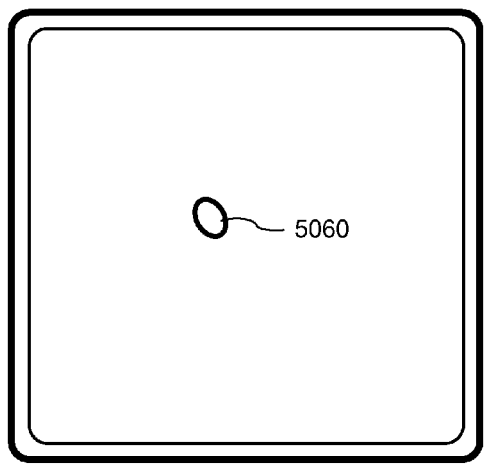
Figure 5A:
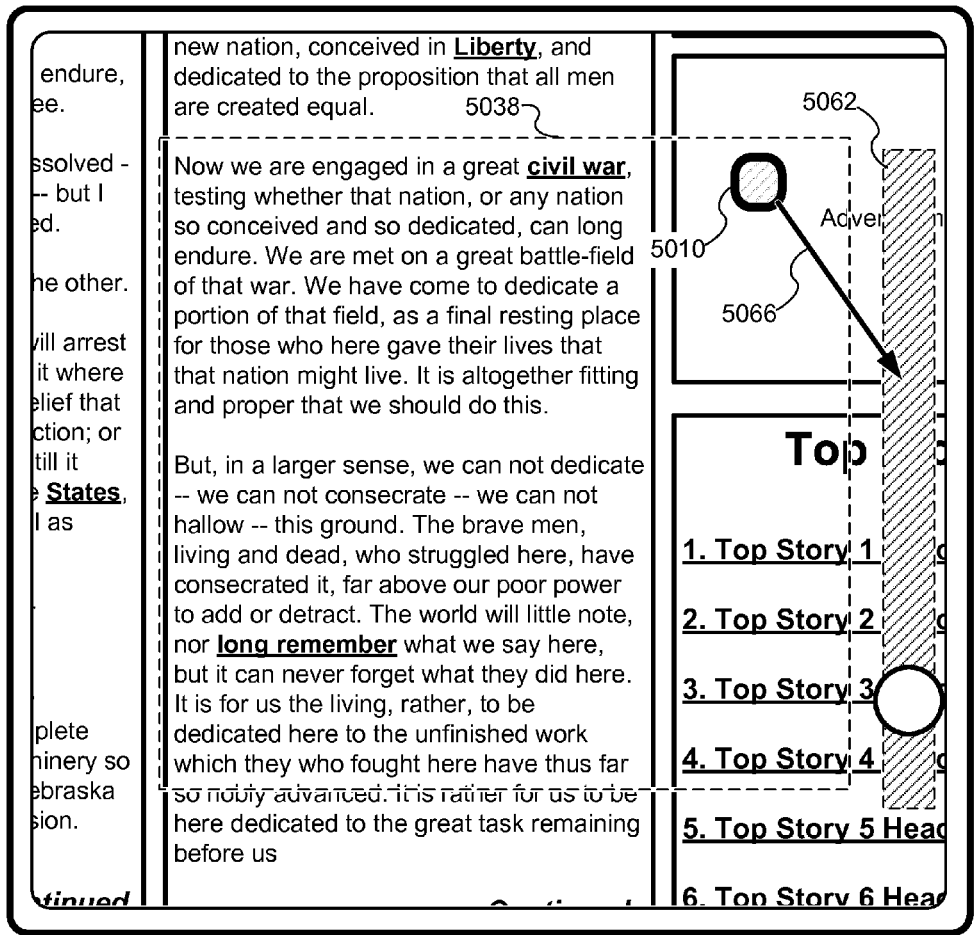
Figure 5A:
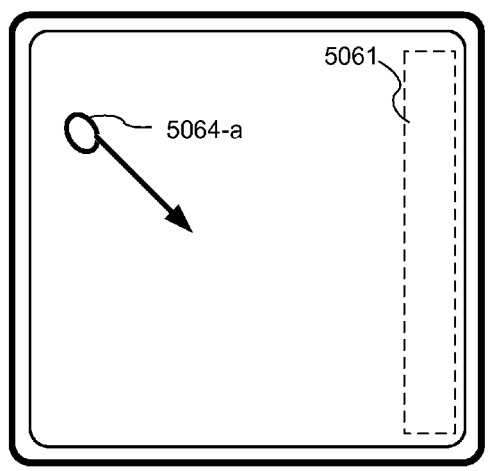
Figure 5B:
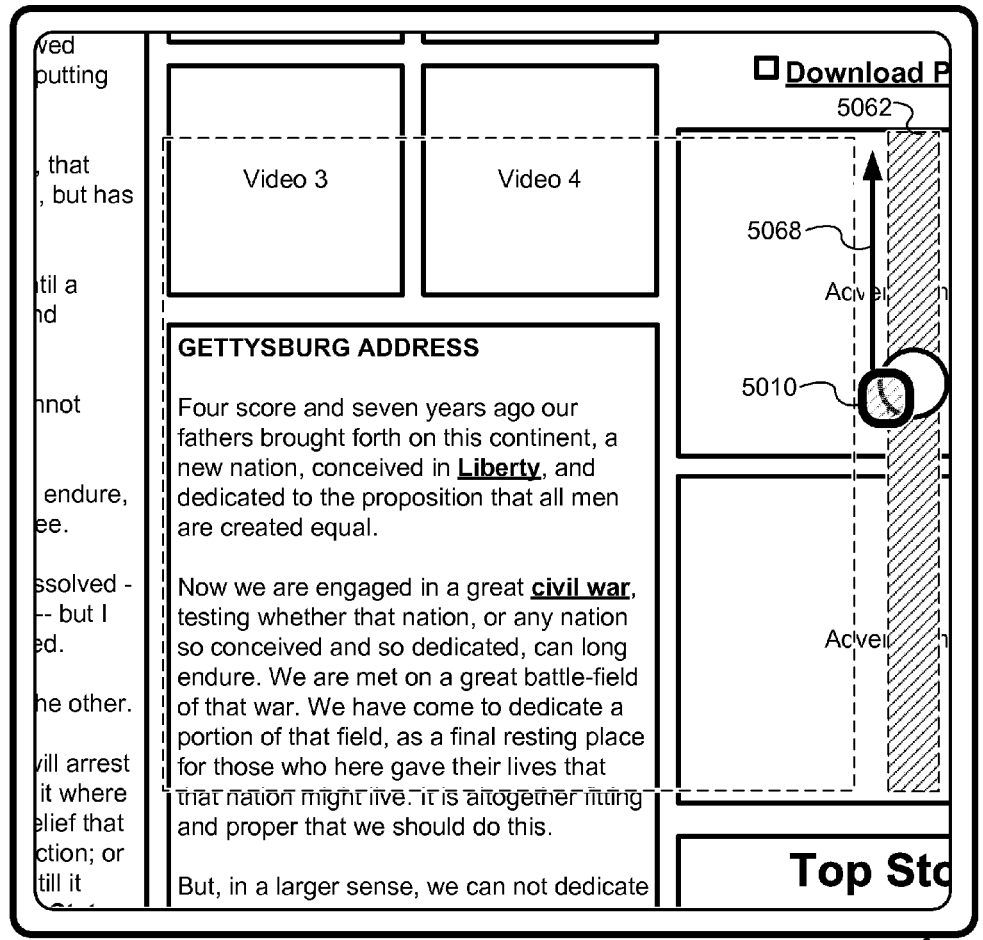
Figure 5B:
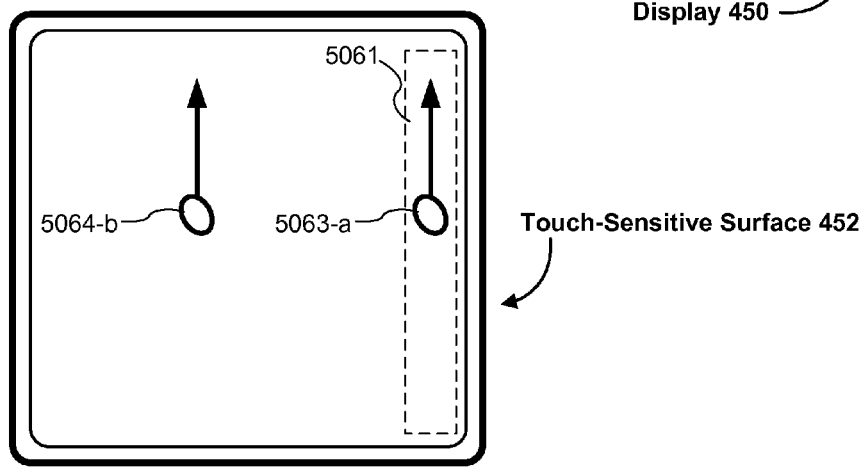
Figure 5C:
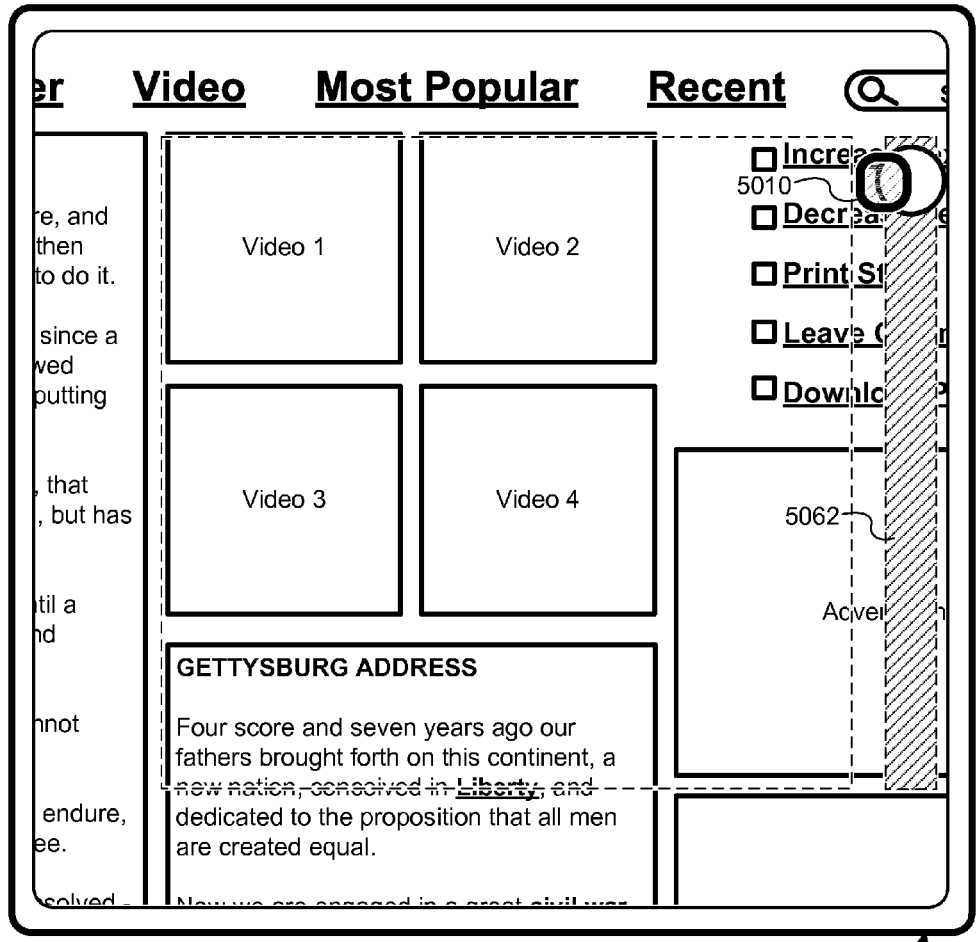
Figure 5C:
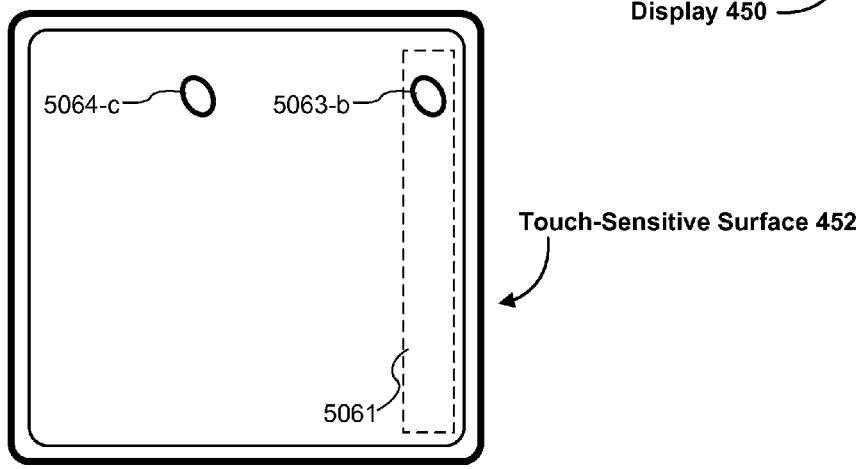
Figure 5D:
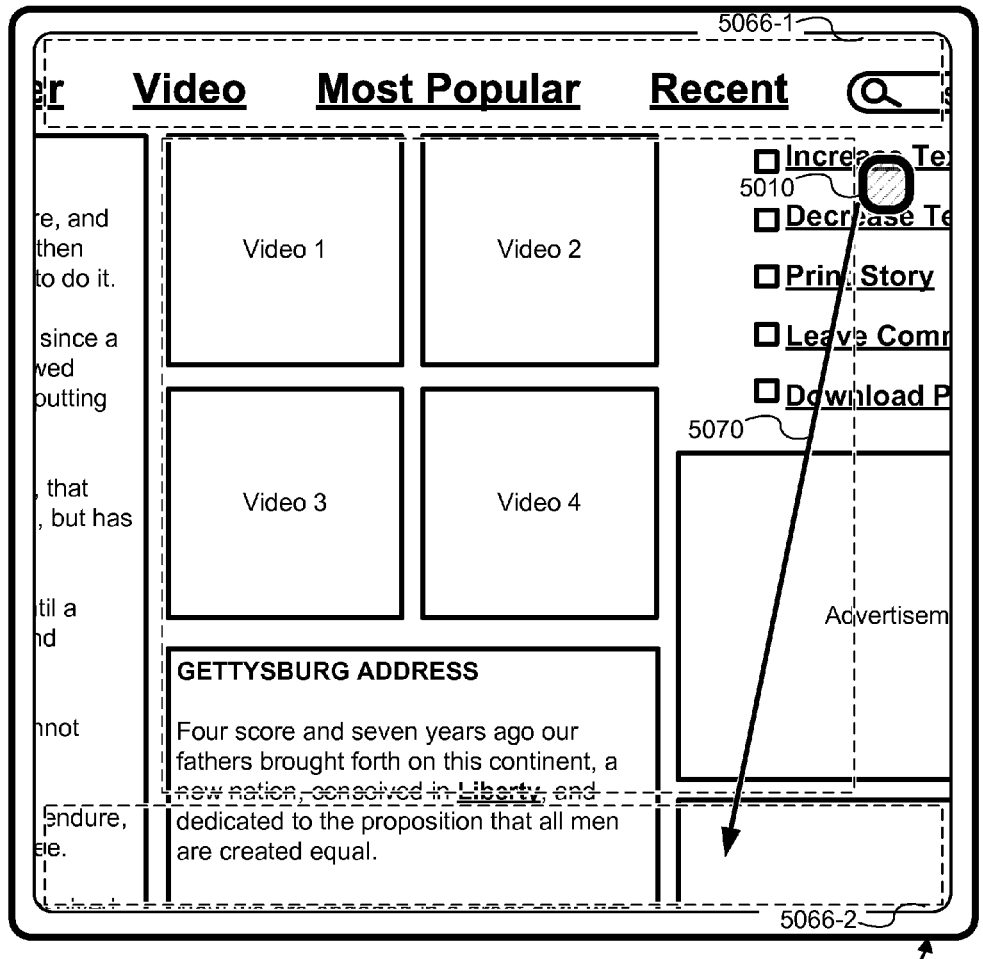
Figure 5D:
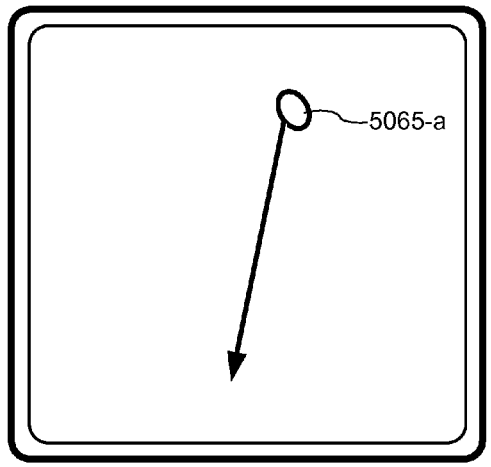
Figure 5E:
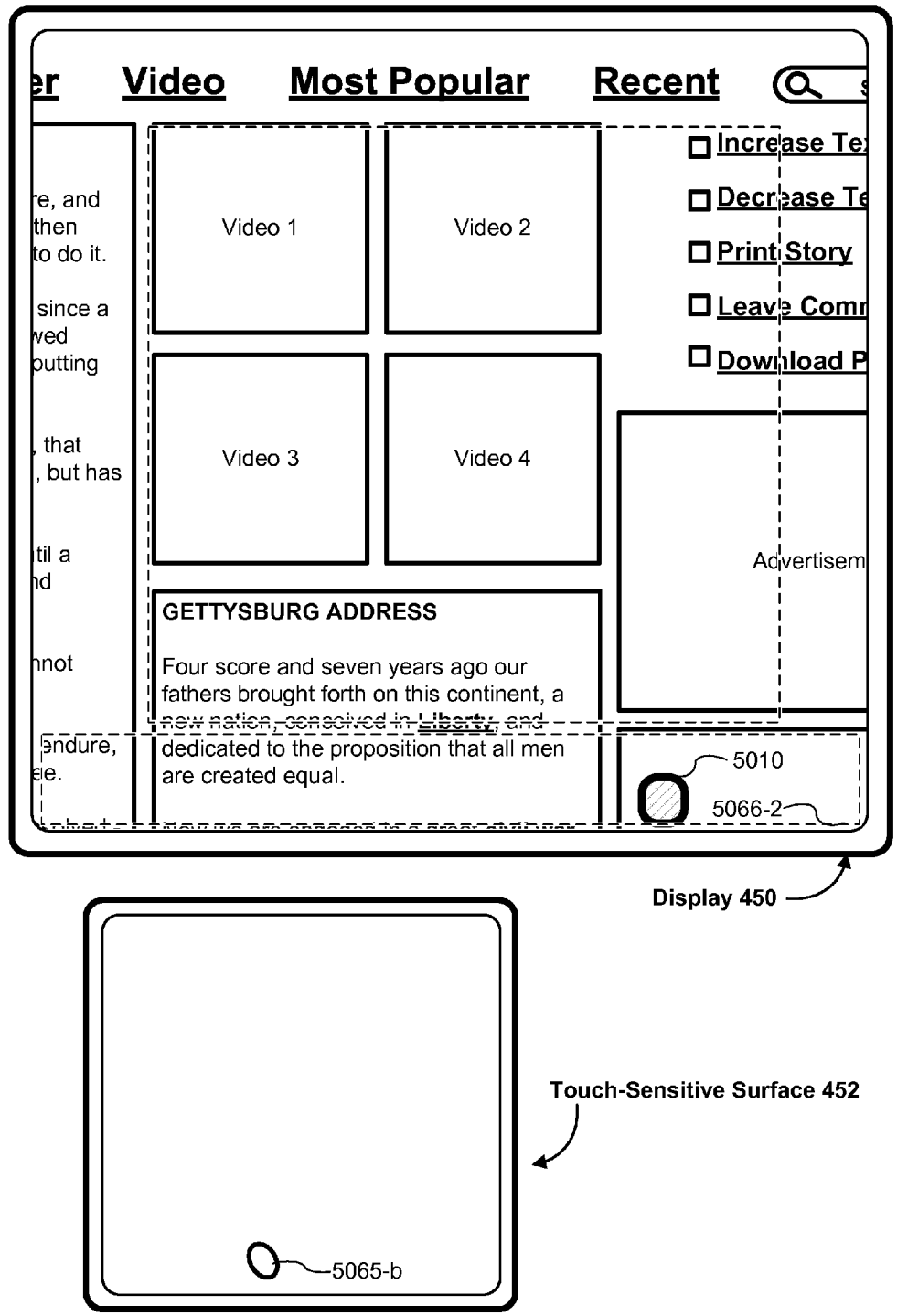
Figure 5F:
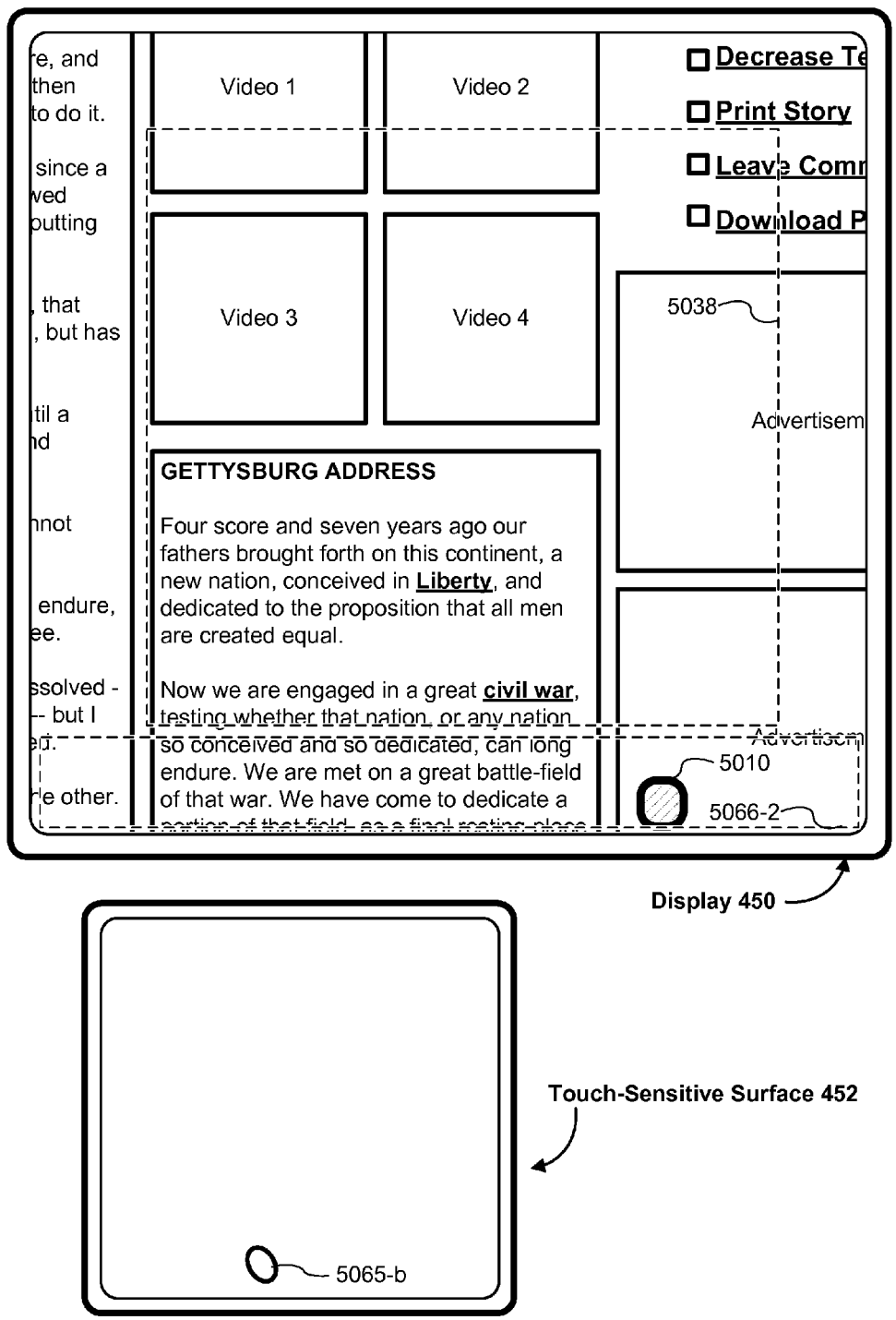
Figure 5G:
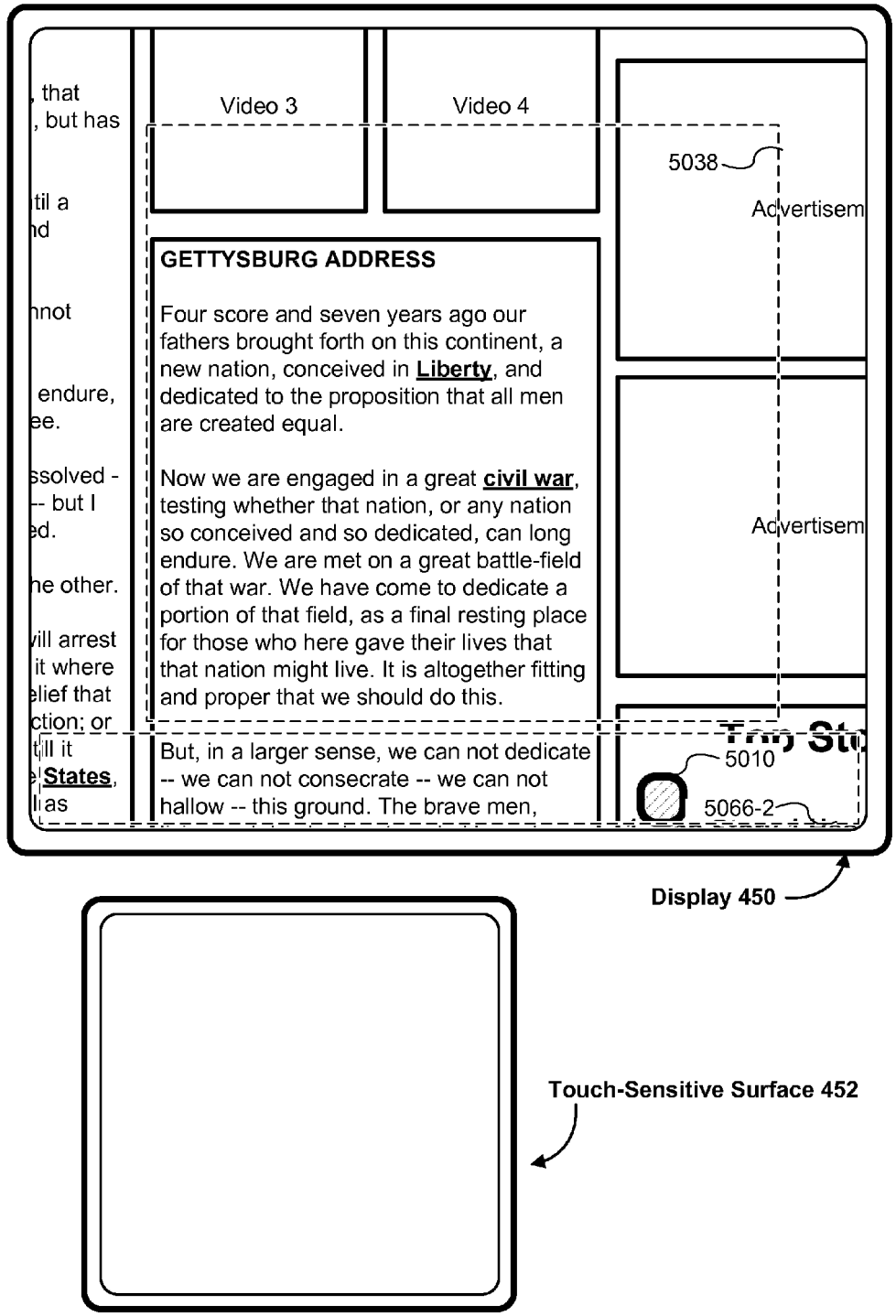
Figure 5H:
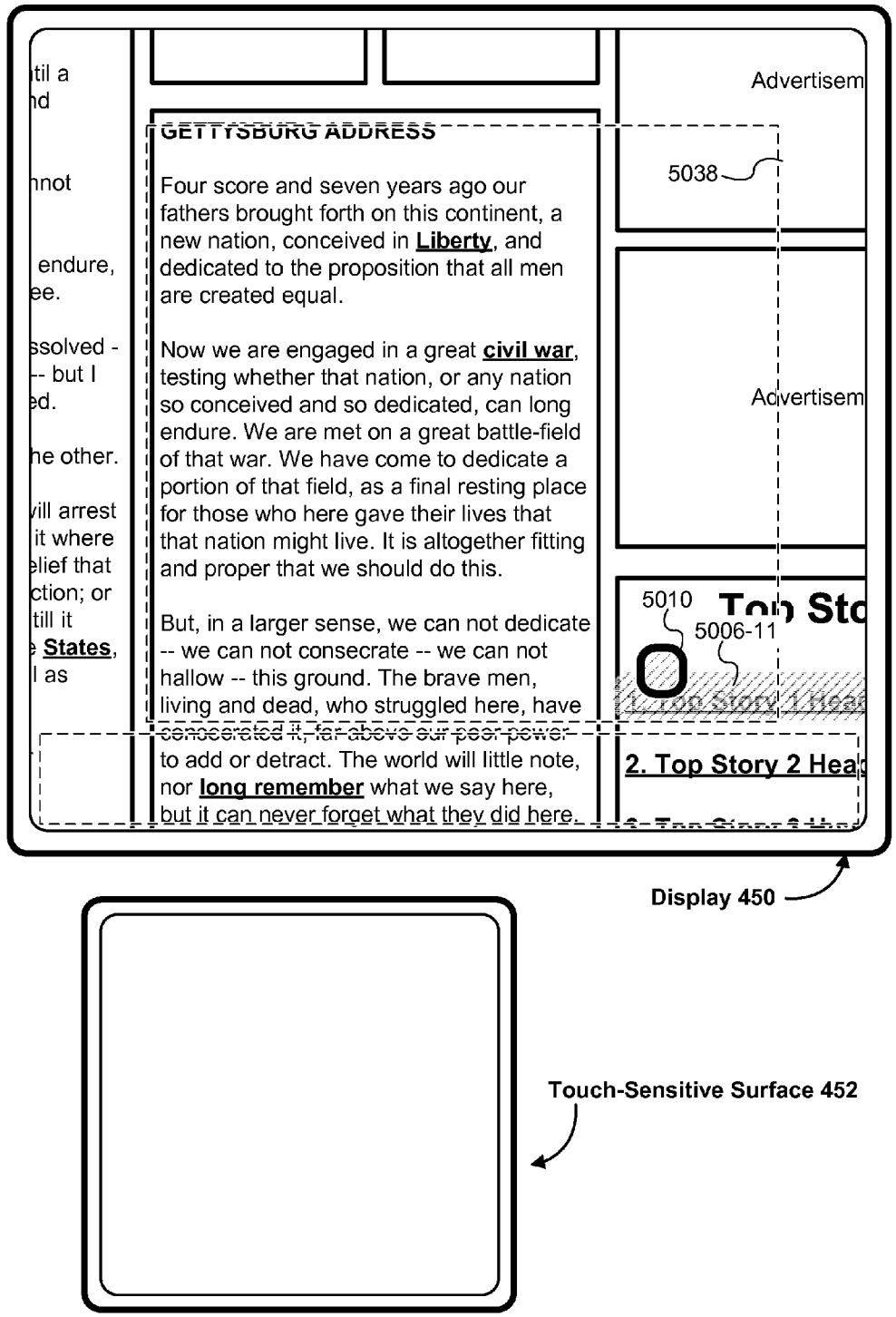
Figure 5I:
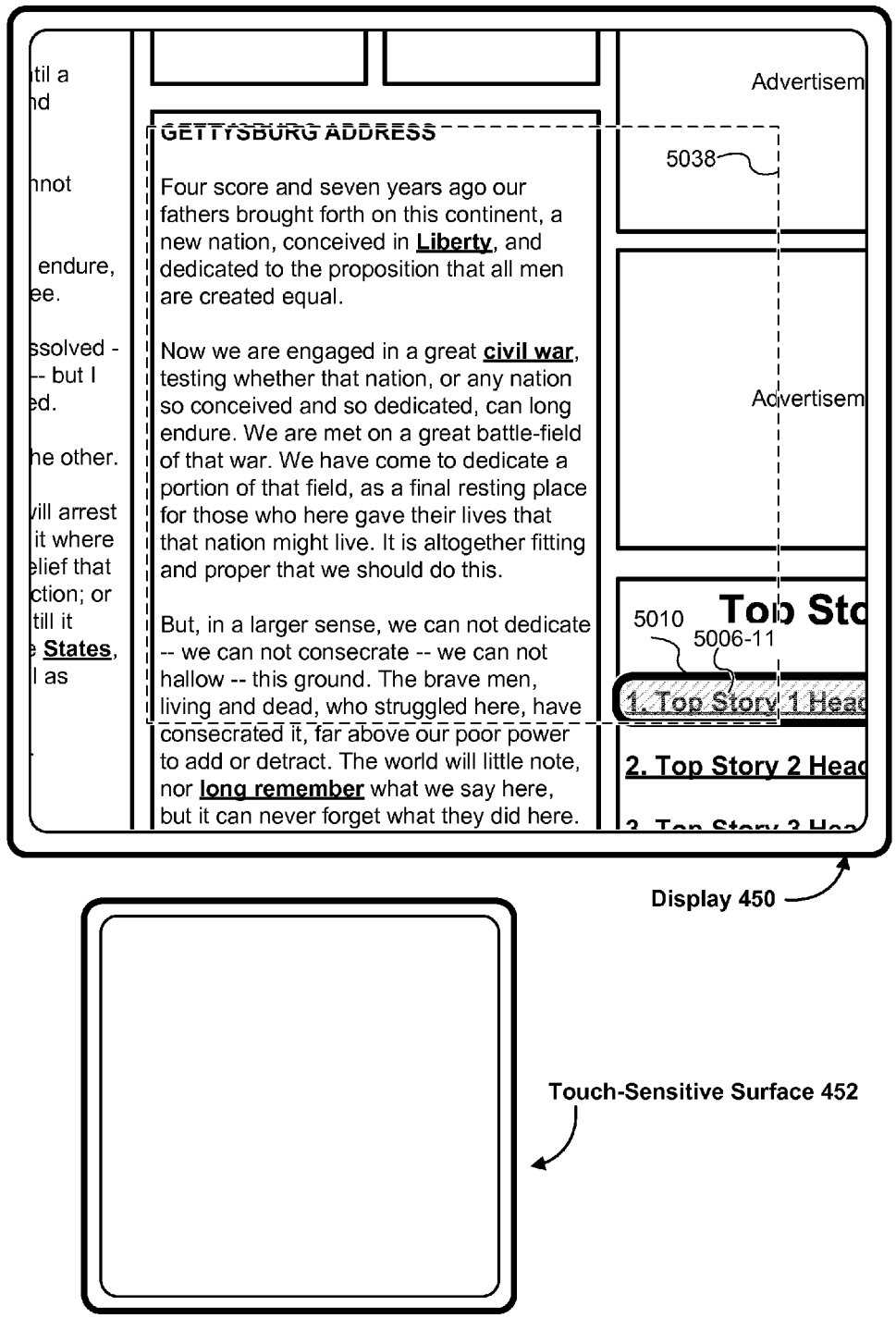
Figure 5J:
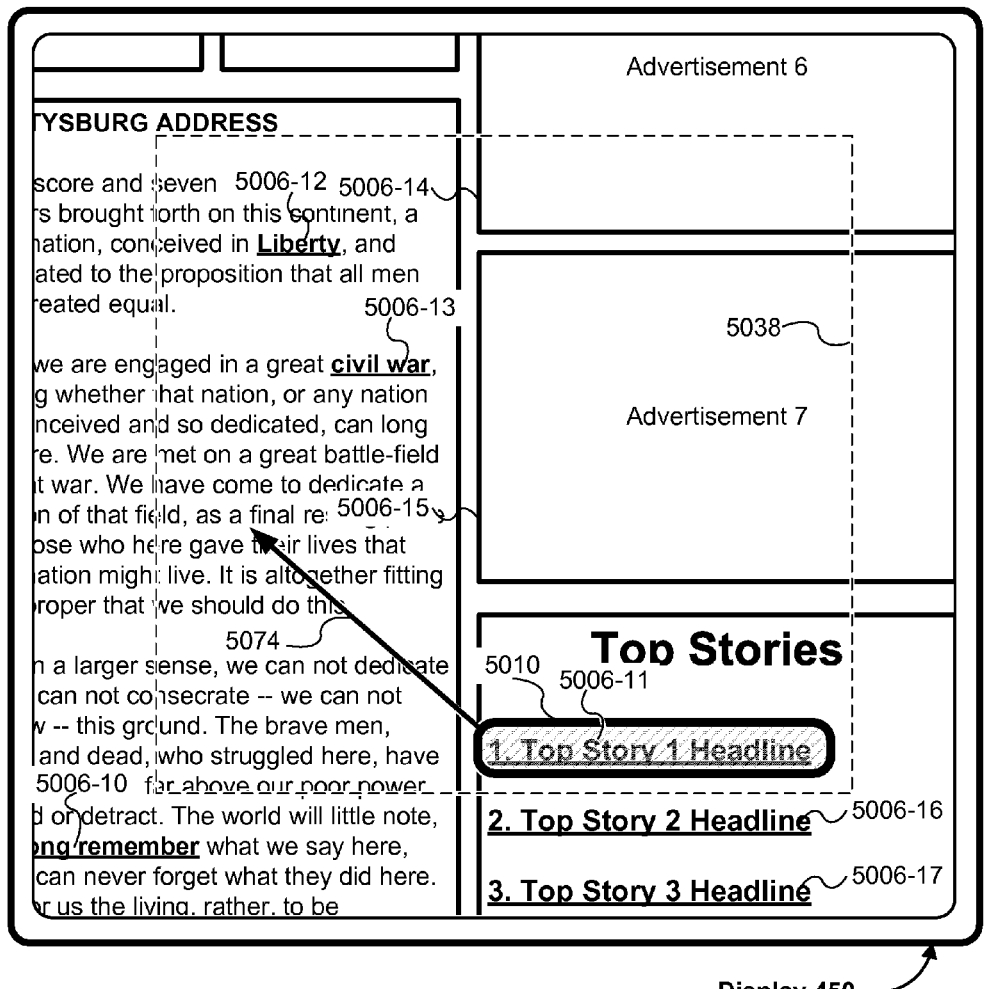
Figure 5J:
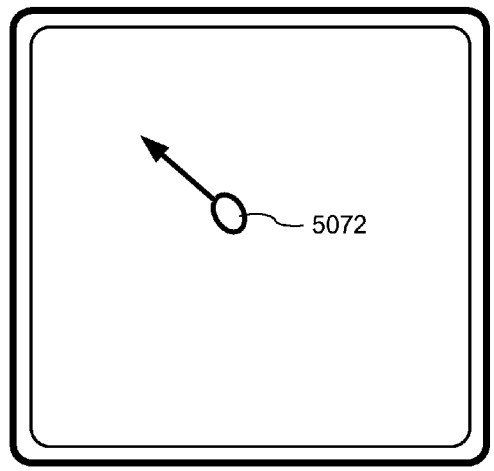
Figure 5K:
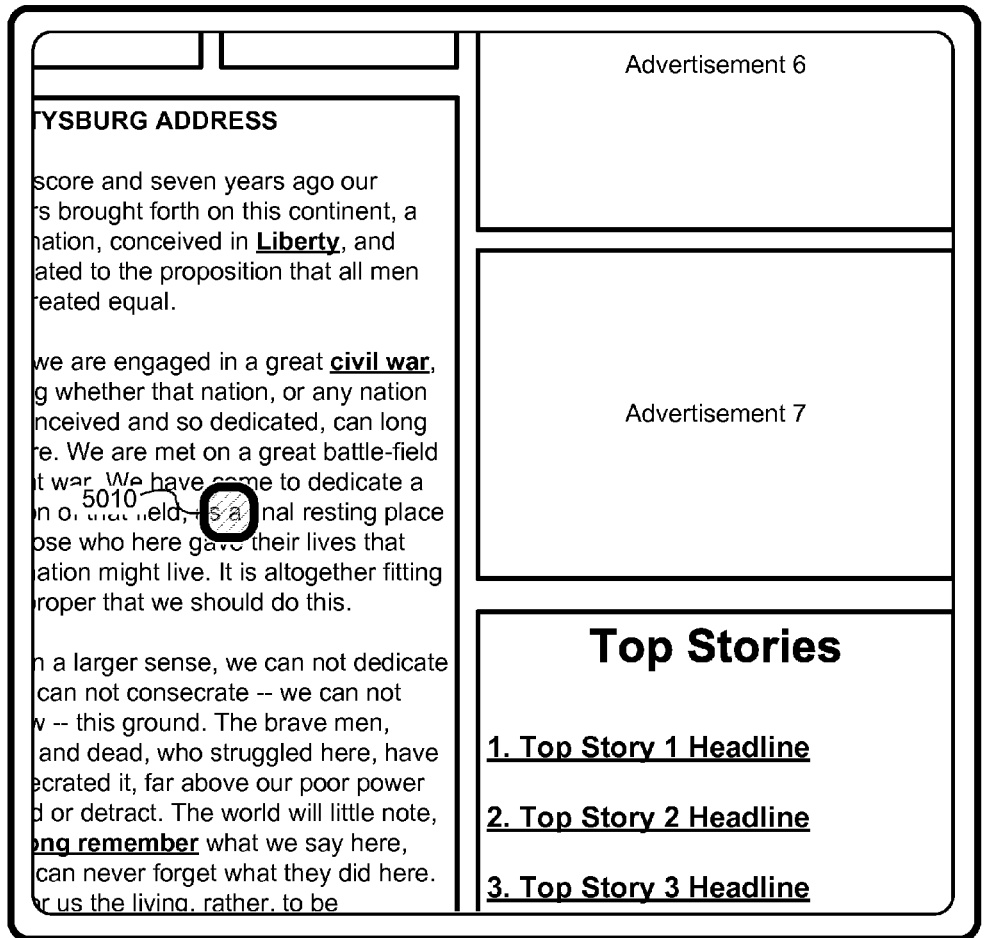
Figure 5L:
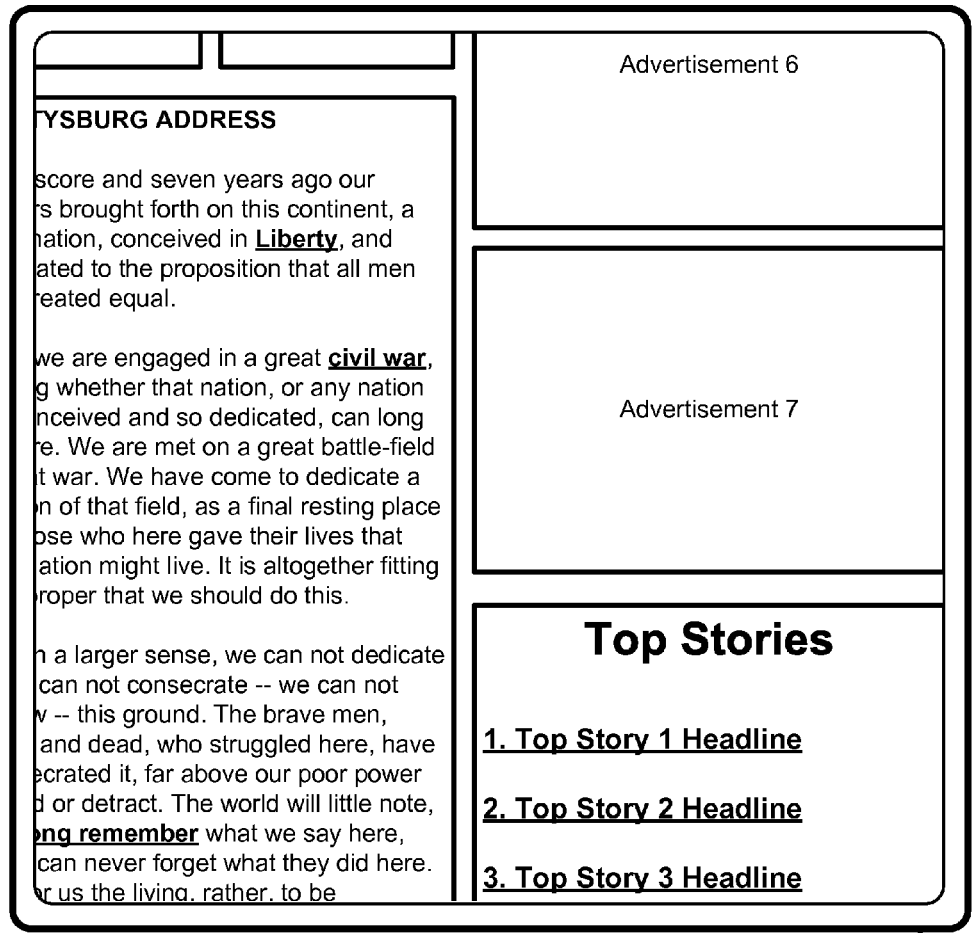
Figure 5L:
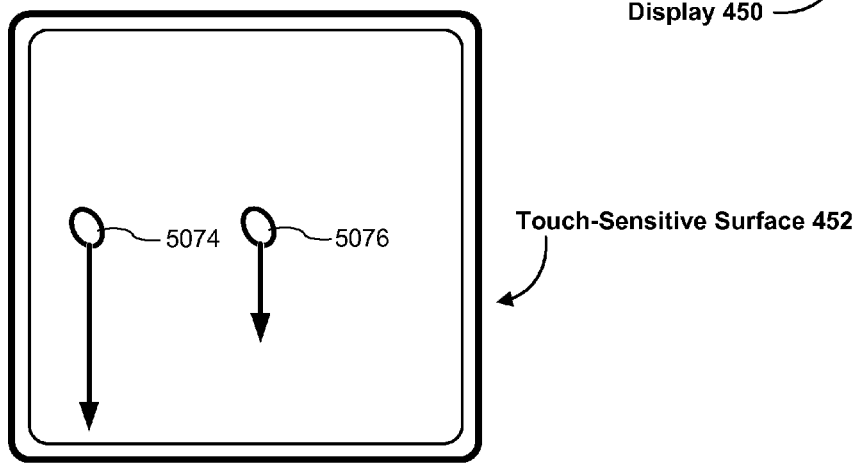
Figure 5M:
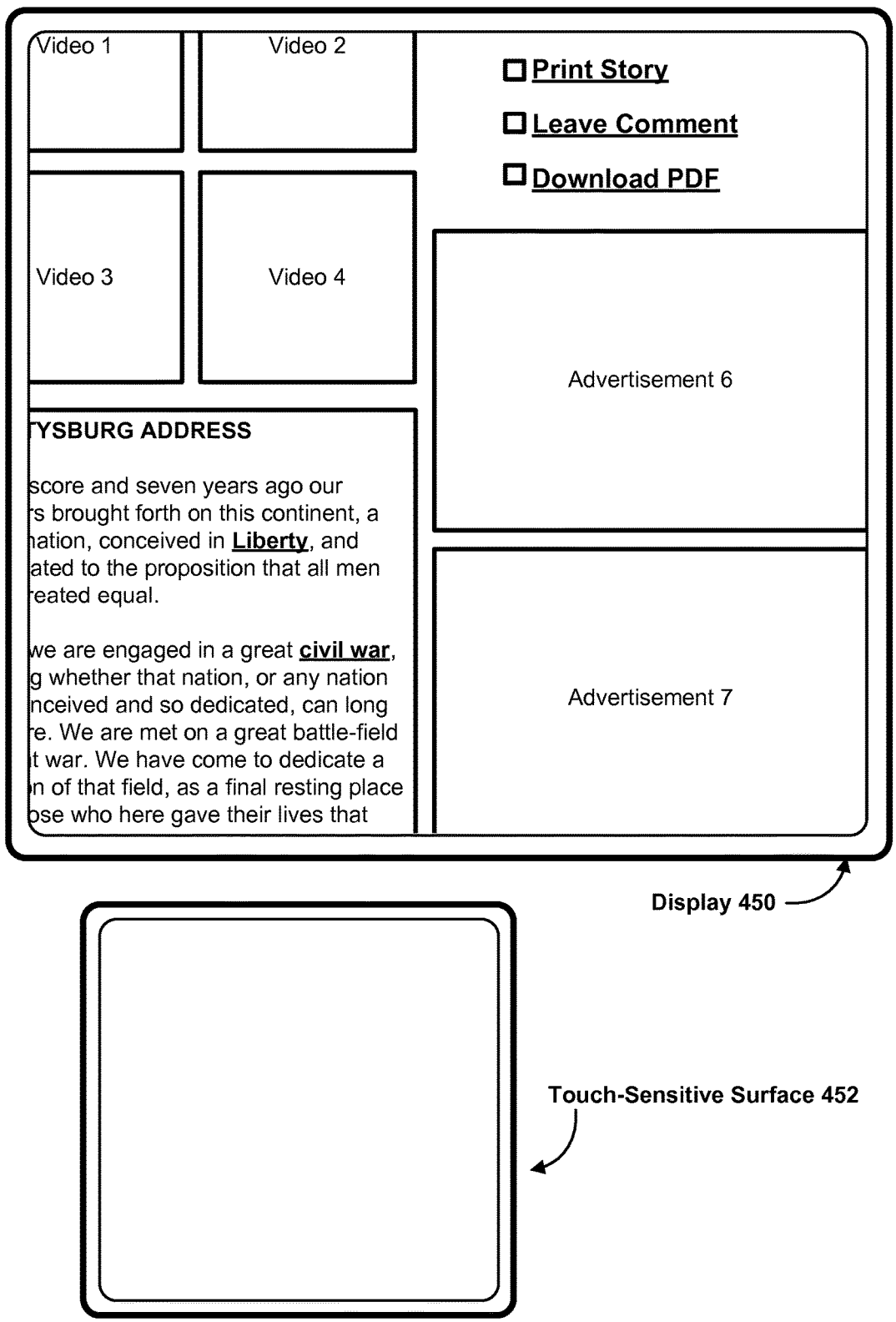
Figure 5N:
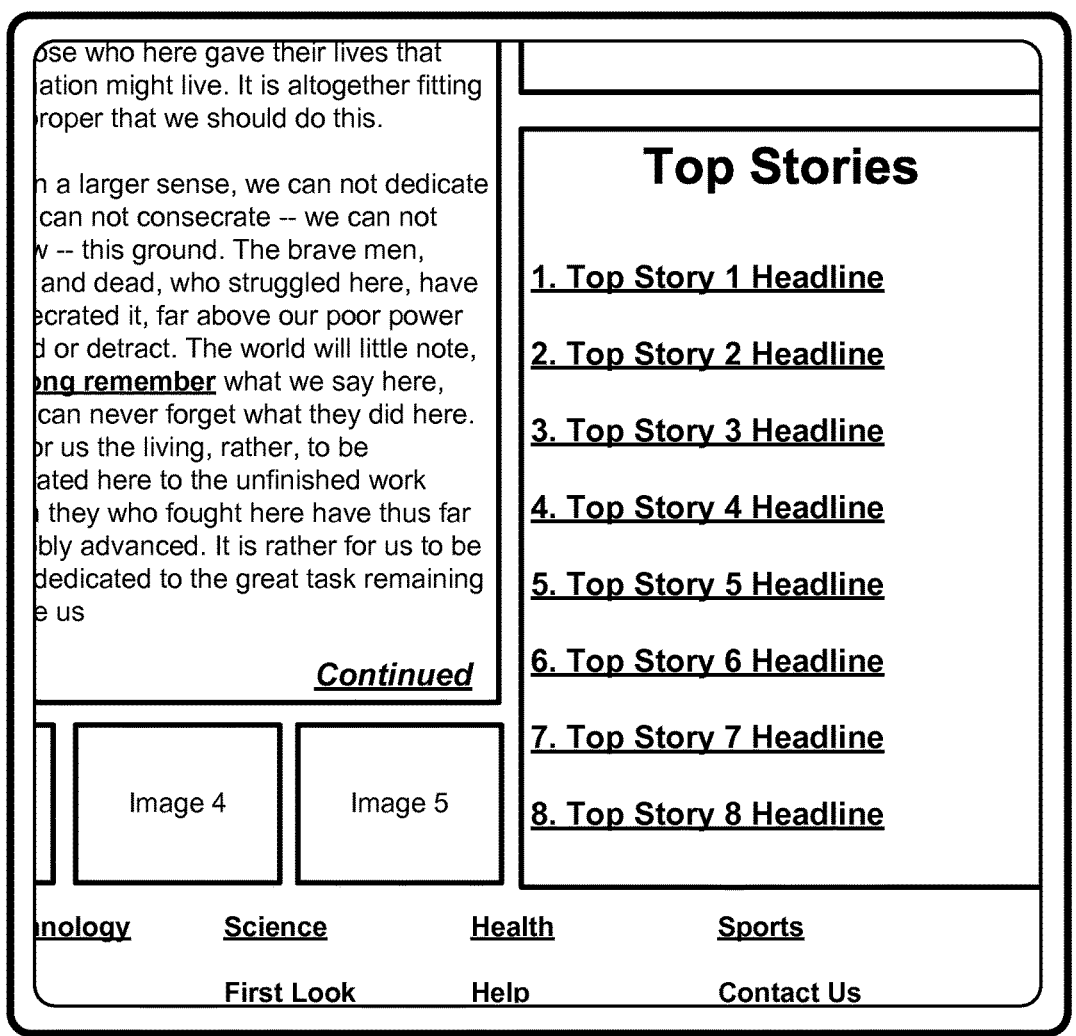
Figure 5O:
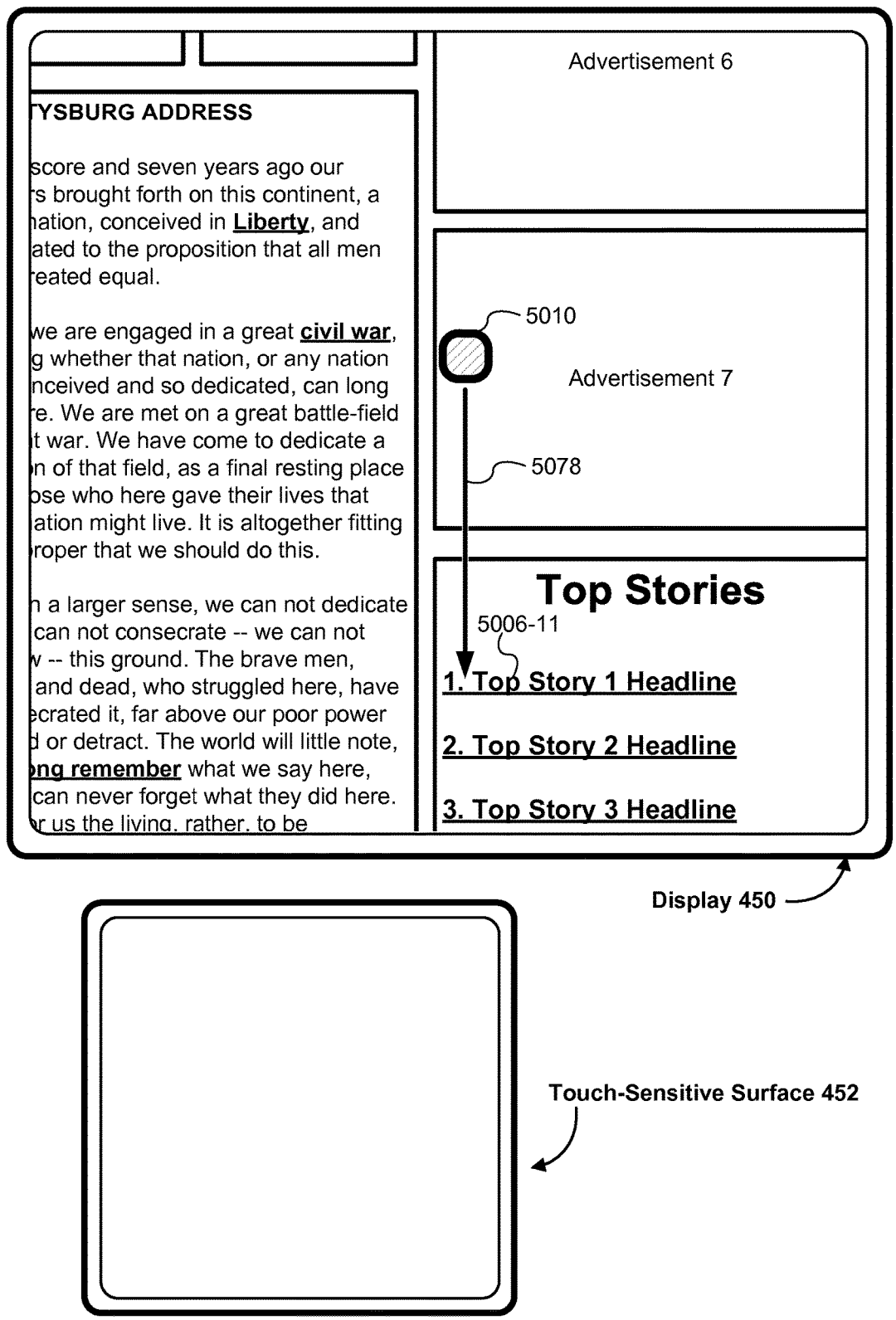
Figure 5P:
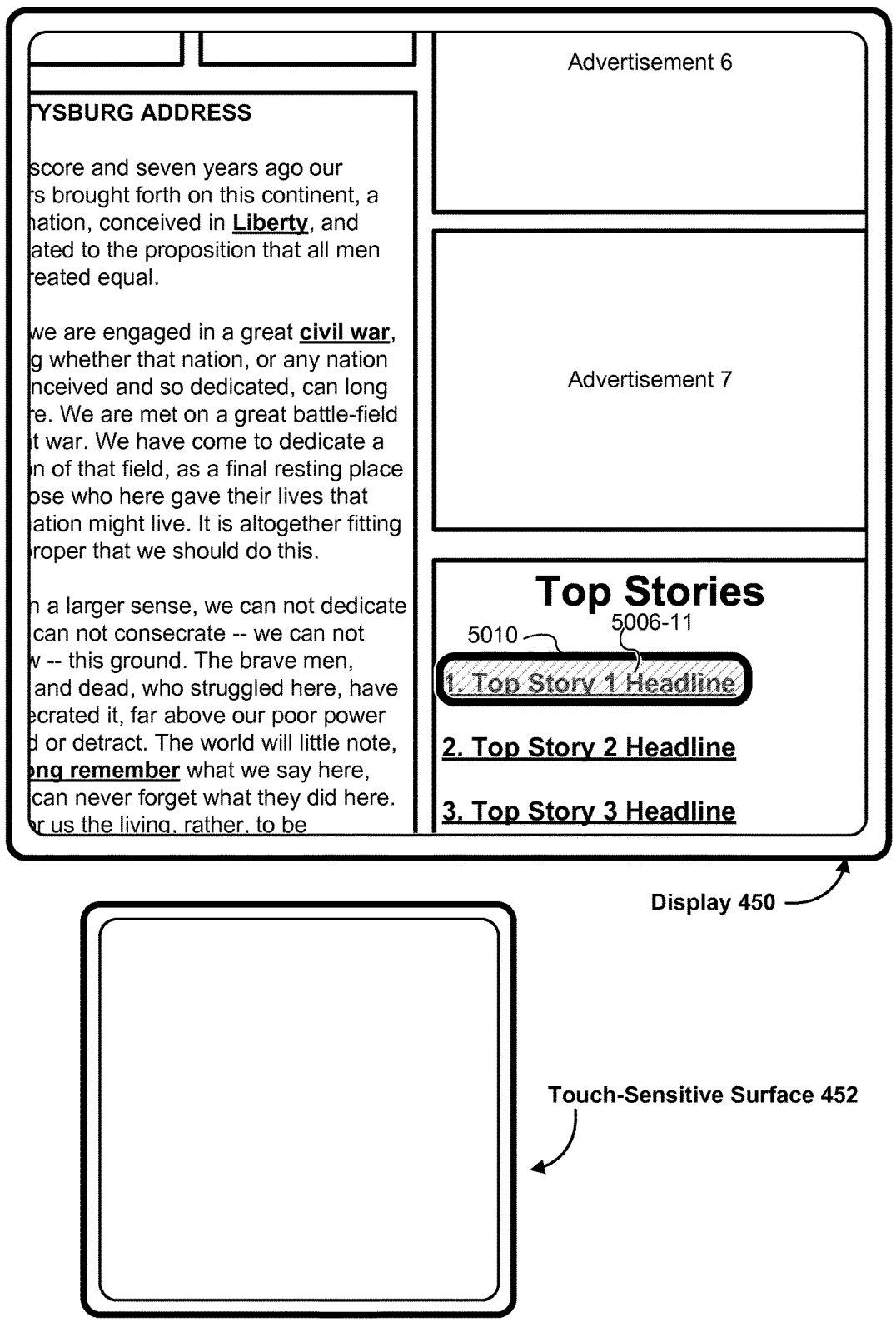
Figure 5Q:
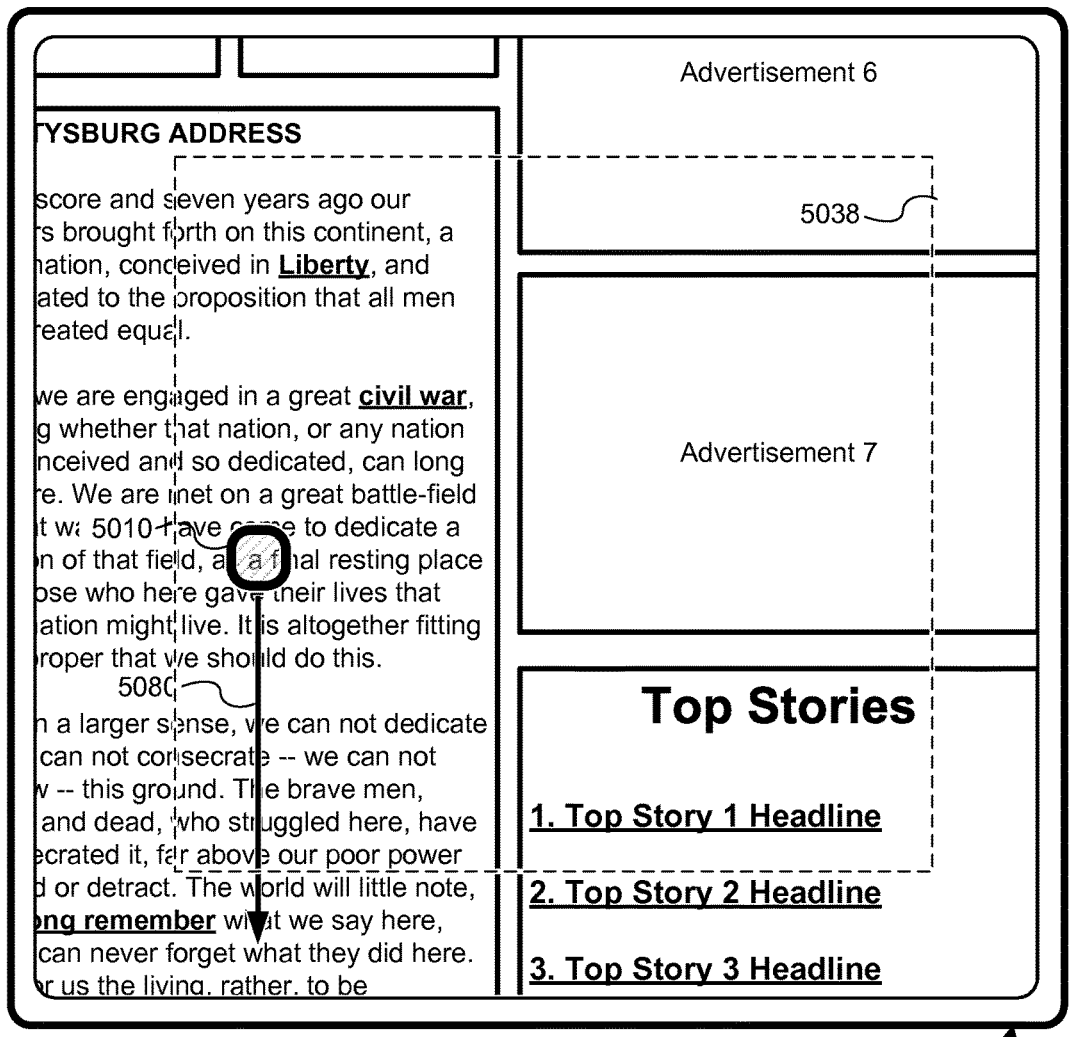
Figure 5Q:
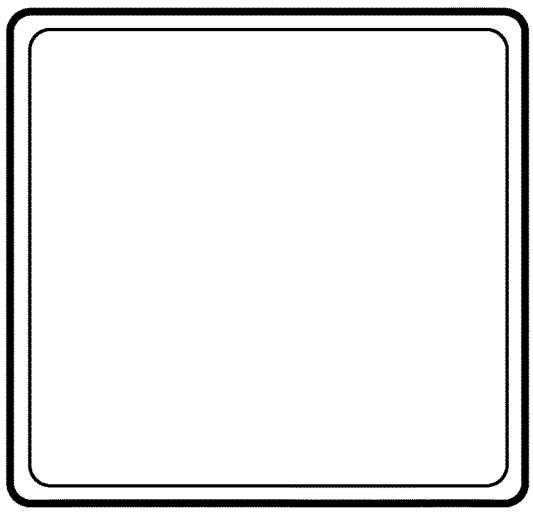
Figure 5R:
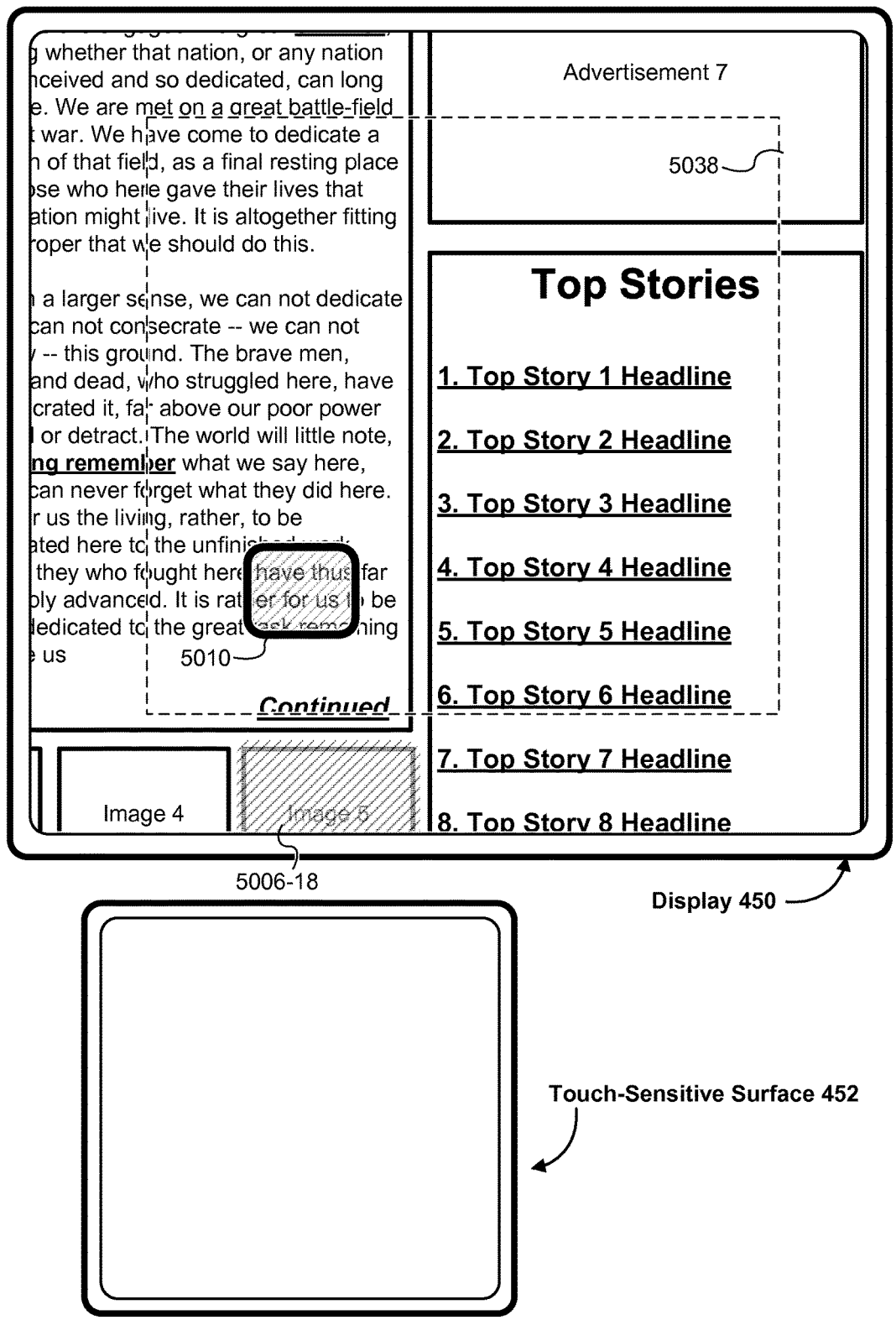
Figure 5S:
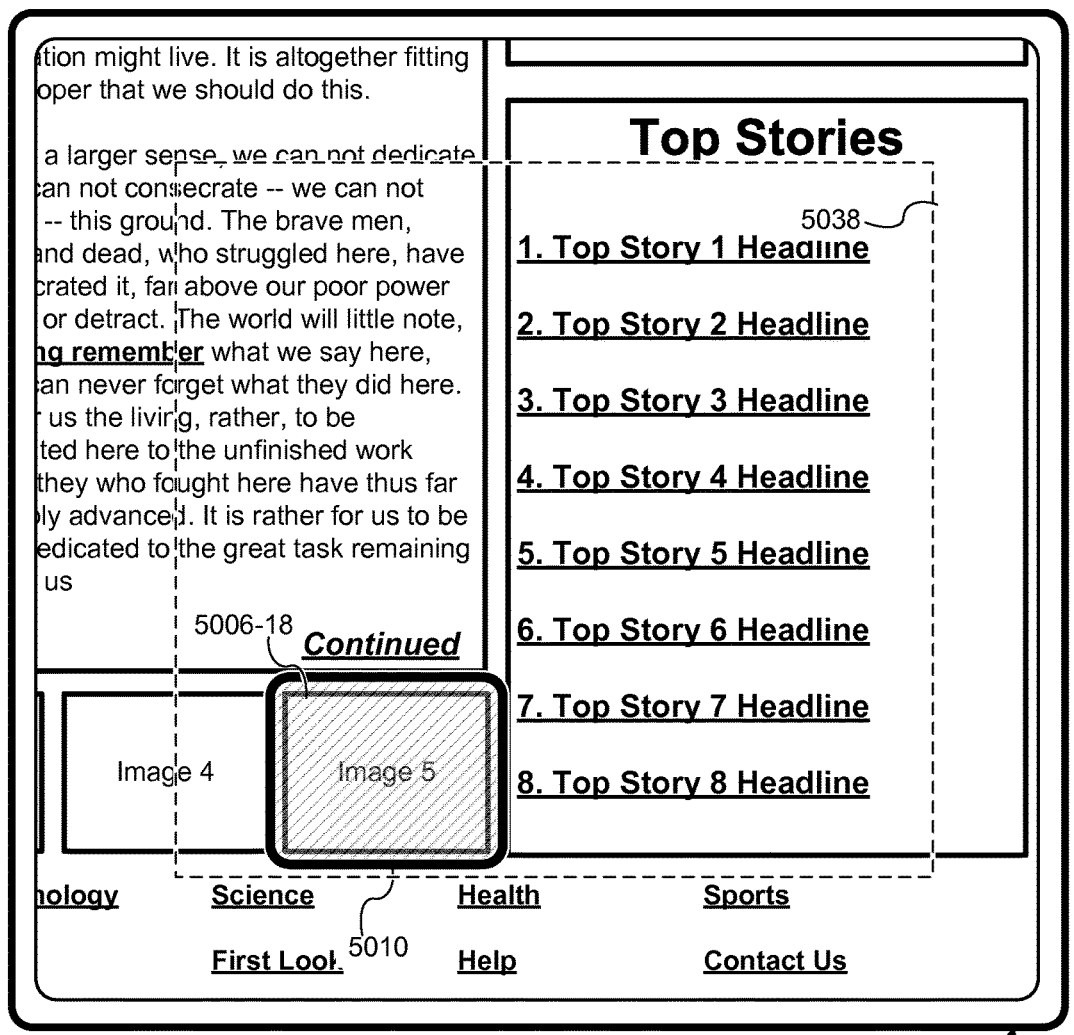
Figure 5S:
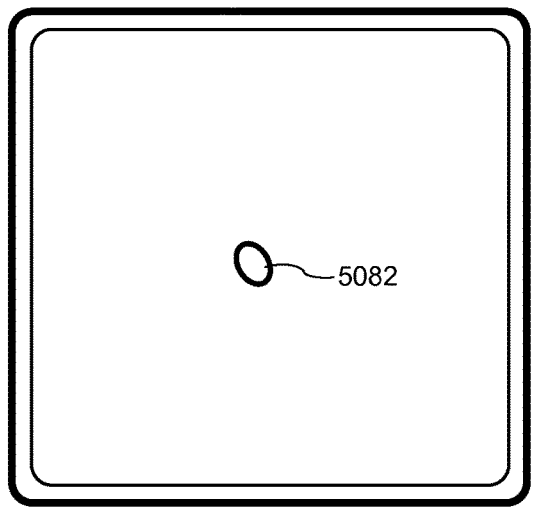

For example, if the computing device received an input that corresponds to a stop input (e.g., tap gesture 5058 in FIG. 5Y) while the object selection indicator (e.g., 5010 in FIG. 5Y) is moving along a trajectory (e.g., 5056 in FIG. 5Y) while the object selection indicator (e.g., 5010 in FIG. 5Y) is within the predefined region 5038, the computing device sends instructions to the display 450 to stop moving the object selection indicator (e.g., at a current location of the object selection indicator 5010 in FIG. 5Y within the user interface) and ceasing to scroll the user interface (e.g., all movement of the user interface on the display stops immediately). As another example, if the computing device received an input that corresponds to a stop input (e.g., tap gesture 5060 in FIG. 5Z) while the object selection indicator (e.g., 5010 in FIG. 5Z is moving along a trajectory 5056 in FIG. 5Z) while the object selection indicator (e.g., 5010 in FIG. 5Z) is outside of the predefined region 5038, the computing device sends instructions to the display 450 to stop moving the object selection indicator (e.g., at a current location of the object selection indicator 5010 in FIG. 5Z within the user interface) and to continue to scroll the user interface on the display 450 so that the object selection indicator (e.g., 5010 in FIG. 5AA) is moved within the predefined region (e.g., 5038 in FIG. 5AA), so as to provide a gentle slow down of movement of the user interface on the display 450. This gentle slow down is advantageous because it less jarring to a user than a harsh "full stop" that would be caused by simply stopping the scrolling of the user interface immediately upon receiving a stop input.

In some embodiments, operations 686-870 are performed (866) after sending instructions to the display 450 for moving the object selection indicator to the updated location. In some of these embodiments, while the object selection indicator is at the target selectable object, the device receives (868) an activation input for the target selectable object (e.g., a single tap gesture, a double tap gesture, an "enter" command, etc. from the touch-sensitive surface 452 or other input device). The touch-sensitive surface 452 can be either integrated with the computing device or part of a separate device that is in communication with the computing device. In response to receiving the activation input for the target selectable object, the device performs (870) an action associated with the target selectable object and sends instructions to the display 450 in accordance with the action (e.g., navigating to a user interface based on a hyperlink associated with the target selectable object, entering a text entry field, changing a state of a selection field such as a radio button, check box, etc.). For example, in FIG. 5X, the computing device receives an input that corresponds to a tap gesture (e.g., 5053 in FIG. 5X) on the touch-sensitive surface 452. In response to receiving the input, the computing device accesses a webpage that is associated with the "long remembered" hyperlink selectable object 5006-10 and sends instructions to the display 450 to display the webpage associated with the selectable object (not shown).

In some embodiments, the touch-sensitive surface 452 includes a predefined scrubbing region for scrubbing through the user interface. When the object selection indicator is moved within a scrubbing region (e.g., 5061 in FIGS. 5AA-5CC) that is parallel to a vertical edge of the touch-sensitive surface 452, inputs that correspond to gestures on the touch-sensitive surface 452 within the scrubbing region (e.g., 5061 in FIGS. 5AA-5CC) are interpreted as scrubbing commands. These inputs are received by the computing device and cause the computing device to send instructions to the display 450 for scrolling through the user interface in accordance with a position of the contact within the scrubbing region 5061. For example, in FIG. 5BB, the computing device receives an input (e.g., a contact 5063 at a location 5063-*a* in FIG. 5BB on the touch sensitive surface 452) that corresponds to a location on the touch-sensitive surface 452 that is within the scrubbing region 5061. In response, the computing device sends instructions to the display 450 to scroll the user interface so as to display a portion of the user interface that corresponds to the location of the object selection indicator within the scrubbing region 5061 (e.g., as illustrated in FIG. 5BB). As another example, in response to detecting an input that corresponds to movement within the scrubbing region 5061 (e.g., movement of a contact 5063 from a first location 5063-*a* in FIG. 5BB to a second location 5063-*b* in FIG. 5CC on the touch sensitive surface 452), the computing device sends instructions to the display 450 to scroll through the user interface in accordance with the movement of the contact 5063 within the scrubbing region 5061 on the touch-sensitive surface (e.g., scrolling to the top of the user interface when the object selection indicator is at the top of the scrubbing region 5061, as illustrated in FIG. 5CC).

In some embodiments, the display 450 includes a predefined scrubbing region for scrubbing through the user interface. When the object selection indicator is moved within a scrubbing region (e.g., 5062 in FIGS. 5AA-5CC) that is parallel to a vertical edge of the display 450, inputs that correspond to gestures on the touch-sensitive surface 452 are interpreted as scrubbing commands (e.g., movement of the contact that corresponds to movement of the object selection indicator from the bottom of the scrubbing region to the top of the scrubbing region). These inputs are received by the computing device and cause the computing device to send instructions to the display 450 for scrolling through the user interface in accordance with a speed of movement of the contact. For example, in FIG. 5AA, the computing device receives an input (e.g., movement of a contact 5064 from a first location 5064-*a* in FIG. 5AA to a second location 5064-*b* in FIG. 5BB on the touch sensitive surface 452) that corresponds to a request to move (e.g., along a trajectory 5066 that is determined based on the input received from the touch-sensitive surface 452) the object selection indicator (e.g., 5010 in FIG. 5AA) into the scrubbing region (e.g., 5062 in FIG. 5AA). In response, the computing device sends instructions to the display 450 to move the object selection indicator 5010 into the scrubbing region and scroll the user interface so as to display a portion of the user interface that corresponds to the location of the object selection indicator within the scrubbing region (e.g., as illustrated in FIG. 5BB). As another example, in response to detecting an input (e.g., movement of a contact 5064 from a second location 5064-*b* in FIG. 5BB to a third location 5064-*c* in FIG. 5CC on the touch sensitive surface 452) that corresponds to a request to move (e.g., along a trajectory 5068 that is determined based on the input received from the touch-sensitive surface 452) the object selection indicator (e.g., 5010 in FIG. 5BB) within the scrubbing region (e.g., 5062 in FIG. 5BB), the computing device sends instructions to the display 450 to move the object selection indicator (e.g., 5010 in FIG. 5BB) within the scrubbing region (e.g., 5062 in FIG. 5BB) and scroll through the user interface accordingly (e.g., scrolling to the top of the user interface when the object selection indicator is at the top of the scrubbing region 5062, as illustrated in FIG. 5CC).

In some embodiments, the display 450 includes a scroll speed control region for scrolling through the user interface at a predetermined scrolling speed. In some of these embodiments, when the object selection indicator is within a scroll speed control region (e.g., a region 5066-1 at a top edge of the display or a region 5066-2 at bottom edge of the display 450) and the object selection indicator remains in the scroll speed control region for at least a predetermined amount of time, the computing device sends instructions to the display 450 for scrolling the user interface at a predetermined scroll speed in a direction that is determined based on a location of the contact within the scroll speed control region (e.g., when the object selection indicator is in a scroll speed control region 5066-1 at the top of the display 450, the computing device sends instructions to the display 450 for scrolling up/down at a predefined rate, while when the object selection indicator is in a scroll speed control region 5066-2 at the bottom of the display 450, the computing device sends instructions to the display 450 for scrolling down/up at the predefined rate, etc.).

For example, in FIG. 5DD, the computing device receives an input (e.g., movement of a contact 5065 from a first location 5065-*a* in FIG. 5DD to a second location 5065-*b* in FIG. 5EE on the touch sensitive surface 452) that corresponds to a request to move (e.g., along a trajectory 5070 that is determined based on the input received from the touch-sensitive surface 452) the object selection indicator (e.g., 5010 in FIG. 5DD) into the scroll speed control region (e.g., 5066-2 in FIG. 5DD). In response, the computing device moves object selection indicator into the scroll speed control region. In some embodiments, once the object selection indicator (e.g., 5010 in FIG. 5EE) is within the scroll speed control region (e.g., 5066-2 in FIGS. 5EE-5GG), the computing device continues to send instructions to the display to scroll through the user interface (e.g., at a predetermined speed in a predetermined direction) until the computing device receives an input that corresponds to an request to move the object selection indicator out of the scroll speed control region. Continuing the example from above, while the object selection indicator (e.g., 5010 in FIGS. 5EE-5FF) continues to be displayed in the scroll speed control region (e.g., 5066-2 in FIG. 5EE-5FF), the computing device continues to send instructions to the display 450 to scroll through the user interface, however once the computing device receives an input that is indicative of an end of the contact with the touch-sensitive surface (e.g., liftoff of the contact 5065-*b* in FIGS. 5FF-5GG), the computing device sends instructions to the display 450 to stop moving the object selection indicator through the user interface, and to scroll the user interface only as far as is needed to display the object selection indicator (e.g., 5010 in FIG. 5HH) within the predefined region (e.g., 5038 in FIG. 5HH).

In some embodiments, once the computing device receives an input that indicates that the input with the touch-sensitive surface 452 has ended, the computing device sends instructions to the display 450 to move and resize the object selection indicator to a location and size of a target selectable object (e.g., "Top Story 1" hyperlink selectable object 5006-11 in FIG. 5HH), and the device moves and resizes the object selection indicator (e.g., 5010 in FIG. 5II) so as to encompass the target selectable object (e.g., "Top Story 1" hyperlink selectable object 5006-11 in FIG. 5HH). In some embodiments, the computing device sends instructions to the display 450 to scroll the user interface only as far as is needed to display the object selection indicator (e.g., 5010 in FIG. 5JJ) within the predefined region (e.g., 5038 in FIG. 5JJ).

Note that details of other processes described herein with respect to methods 600, 700, 900 (e.g., FIGS. 6A-6C, 7A-7C, 9A-9D and 5A-5SS) are also applicable in an analogous manner to the method 800 described above. For example, the selectable objects 5006 (e.g., hyperlinks, advertisements, images, videos) and object selection indicator 5010 described with reference to FIGS. 8A-8E may have one or more of the characteristics of the various selectable objects 5006 and object selection indicator 5010 described herein with reference to any of methods 600, 700, and/or 900. For brevity, these details are not repeated here.

FIGS. 9A-9D are flow diagrams illustrating a method 900 of navigating through a user interface by translating a user interface or redisplaying an object selection indicator in accordance with some embodiments. The method 900 is performed at a computing device (e.g., device 300, FIG. 3, or portable multifunction device 100, FIGS. 1A-1B) that is in communication with a display (e.g., 450 in FIGS. 5A-5SS) and a touch-sensitive surface (e.g., 452 in FIGS. 5A-5SS). In some embodiments, the display and/or the touch-sensitive surface are separate from the device (e.g., either as part of separate computing devices or wirelessly connected to the computing device). In some embodiments, the display and/or the touch-sensitive surface are integrated into the computing device. In some embodiments, the display is a touch screen display and the touch-sensitive surface is on the display. In some embodiments, the display is separate from the touch-sensitive surface. Some operations in method 900 may be combined and/or the order of some operations may be changed.

As described below, the method 900 provides an intuitive way to navigate through a user interface by translating a user interface or redisplaying an object selection indicator. The method reduces the cognitive burden on a user when navigating through a user interface, thereby creating a more efficient human-machine interface. For battery-operated computing devices, enabling a user to navigate through a user interface faster and more efficiently conserves power and increases the time between battery charges.

The computing device sends (902) instructions to the display 450 for displaying, concurrently, an object selection indicator and a portion of a user interface, the user interface having one or more selectable objects. While the examples described herein primarily refer to the user interface as a webpage, it should be understood that the user interface could be any user interface that includes selectable objects (e.g., an application user interface, an electronic document, an operating system user interface, etc.) The user interface has one or more selectable objects (e.g., 5006 in FIGS. 5A-5SS). In some embodiments, the user interface includes a plurality of selectable objects. In some embodiments, the user interface includes an electronic document with a plurality of selectable objects. In some embodiments, the selectable objects include one or more hyperlinks (e.g., 5006-10, 5006-11, 5006-12, 5006-13, 5006-16, 5006-17 in FIG. 5JJ), photos, advertisements (e.g., 5006-14 and 5006-15 in FIG. 5JJ) blocks of text, videos, icons, text fields, option selection interfaces or the like. In some embodiments, the object selection indicator is displayed in response to detecting a first gesture.

The computing device sends (904) instructions to the display 450 for ceasing to display the object selection indicator. In some embodiments, the instructions for ceasing to display an object selection indicator are sent (906) to the display 450 in response to detecting predefined object selection indicator hiding criteria (e.g., the predefined condition is that the object selection indicator is not currently associated with any of the selectable objects and a predetermined amount of time has passed, such as 0.2 seconds, 0.5 seconds, 1 second, etc). For example, in FIG. 5JJ the computing device receives an input that corresponds to a swipe gesture on a touch-sensitive surface (e.g., contact 5072 in FIG. 5JJ and subsequent movement of the contact 5072 across the touch-sensitive surface 452). In response to detecting the input, the computing device sends instructions to the display to move the object selection indicator (e.g., 5010 in FIG. 5JJ) in accordance with a trajectory (e.g., 5074 in FIG. 5JJ) that is determined based on the swipe gesture. In some embodiments, the computing device attempts to identify a target selectable object as described in greater detail above with reference to method 600. However, in this example, the computing device fails to identify any target selectable object, and so the computing device sends instructions to the display 450 to move the object selection indicator (e.g., 5010 in FIG. 5KK) to a location that is proximate to a termination point of the trajectory without selecting any of the selectable objects. In this example, after a predetermined period of time (e.g., 0.5 seconds), the object selection indicator ceases to be displayed (e.g., as illustrated in FIG. 5LL), where no object selection indicator is displayed.

After sending instructions to the display 450 for ceasing to display the object selection indicator (e.g., as illustrated in FIG. 5LL where the object selection indicator has ceased to be displayed), the computing device receives (908) an input that corresponds to a first gesture detected on the touch-sensitive surface 452. As one example, the first gesture includes contact 5074 and subsequent movement of the contact 5074 across the touch-sensitive surface 452 or the first gesture includes contact 5076 and subsequent movement of the contact 5076 across the touch-sensitive surface 452, as illustrated in FIG. 5LL. In some embodiments, the gesture is a tap and hold gesture, a tap and drag gesture, a flick gesture or other contact-based gesture. In some embodiments, the first gesture is a single contact swipe gesture (e.g., the swipe gesture including contact 5074 in FIG. 5LL or the swipe gesture including contact 5076 in FIG. 5LL). In some embodiments, the first gesture is a multi-contact swipe gesture. In some embodiments, the first gesture includes lateral movement of one or more contacts in a same direction on the touch-sensitive surface 452. In some embodiments, the input is received at the computing device from a remote device (e.g., either raw contact data or processed gesture outputs). For example, in FIG. 5LL, the touch-sensitive surface 452 detects a gesture including a contact 5074 on the touch-sensitive surface 452 and subsequent movement of the contact 5024 across the touch-sensitive surface 452 and sends an input to the computing device that corresponds to the detected gesture. In some embodiments, the input is received from a touch-sensitive surface 452 that is integrated with the computing device (e.g., a touchpad on a laptop or a touch screen display).

Operations 912-952 are performed (910) in response to receiving the input that corresponds to the first gesture (e.g., an input that corresponds to the swipe gesture including contact 5074 or the swipe gesture including contact 5076).

When the first gesture meets predefined navigation criteria, the device sends (912) instructions to the display 450 for translating the user interface (e.g., lateral translation of the user interface by one dimensional scrolling or two dimensional scrolling) in accordance with the first gesture without redisplaying the object selection indicator. The navigation criteria include (914) a requirement that the first gesture has a duration that is less than a predefined time threshold (e.g., 0.05 seconds, 0.1 seconds, 0.2 seconds, or any reasonable time threshold). For example, in FIG. 5LL, if the first gesture is the swipe gesture including contact 5074 and the first gesture has a duration that is less than 0.05 seconds, the computing device sends instructions to translate the user interface in accordance with the first gesture. In some embodiments, navigating through the user interface includes scrolling from the displayed portion of the user interface to a different portion of the user interface. In other words, the user interface is a single contiguous user interface (i.e., not a set of linked user interfaces such as a set of separate tabs in a browser or sequential screens in an application). For example, in FIG. 5MM, in response to detecting the swipe gesture that includes contact 5074, the computing device sends instructions to the display to scroll the user interface downwards on the display (e.g., so as to display a portion of the webpage that is closer to the top of the webpage). As another example, in FIG. 5NN, in response to the swipe gesture including contact 5074, the computing device sends instructions to the display to scroll the user interface upwards on the display (e.g., so as to display a portion of the webpage that is closer to the bottom of the webpage). It is advantageous to not redisplay the object selection indicator when the user has provided an indication that the user wants to scroll through content rather than select any particular object (e.g., by providing a quick swipe gesture rather than a slower swipe gesture).

In some embodiments, the navigation criteria further include (915) a requirement that the first gesture would have corresponded to movement of the object selection indicator more than a predefined distance outside of the portion of the user interface that was displayed immediately prior to detecting the first gesture (e.g., more than 0.5 times the width or 0.5 times the height of the portion of the user interface). For example, if the user interface is a 4,000 pixel wide by 10,000 pixel high webpage, and the portion of the user interface that is displayed is 1920 pixels wide by 1080 pixels high (e.g., a webpage displayed on a 1080 p, 16:9 aspect ratio display), and the computing device receives an input that corresponds to an upwards swipe gesture on the touch-sensitive surface 452 that would have corresponded to moving the object selection indicator to a position in the webpage that is more than 540 pixels above the top of the displayed portion of the webpage, if the object selection indicator were still displayed (e.g., at its last displayed location or at a predefined position such as a center of the portion of the user interface), then the webpage would be scrolled on the display 450 without redisplaying the object selection indicator. In some embodiments, the navigation criteria further include (916) a requirement that the first gesture includes movement above a predefined distance threshold (e.g., movement on the touch-sensitive surface 452 that corresponds to movement of the object selection indicator on the display 450 that is greater than 1000 pixels, 1500 pixels, 2000 pixels or any reasonable distance threshold). In some embodiments, the navigation criteria further include (918) a requirement that the first gesture includes movement above a predefined speed threshold (e.g., movement on the touch-sensitive surface 452 that corresponds to movement of the object selection indicator at a speed that is greater than 50 pixels/second, 75 pixels/second, 125 pixels/second or any reasonable speed threshold on the display 450).

Operations 922-948 are performed (920) when the first gesture meets predefined object selection indicator movement criteria. The object selection indicator movement criteria including a requirement that the first gesture has a duration that is greater than the predefined time threshold. For example, the operations described below with reference to FIGS. 5OO-5PP or FIGS. 5QQ-5SS are performed when the first gesture is the swipe gesture including contact 5076 in FIG. 5LL, and the first gesture has a duration that is greater than 0.05 seconds. It is advantageous to redisplay the object selection indicator when the user has provided an indication that the user wants to select an object rather than merely scroll through the user interface (e.g., by providing a slow swipe gesture rather than a relatively quick swipe gesture).

The computing device sends (922) instructions to the display 450 for redisplaying the object selection indicator. For example, in FIG. 5OO, after detecting the swipe gesture including contact 5076, the computing device sends instructions to the display 450 to redisplay the object selection indicator (e.g., 5010 in FIG. 5OO). In some embodiments, the instructions for redisplaying the object selection indicator include instructions for redisplaying (924) the object selection indicator at a predefined location on the display 450 (e.g., the object selection indicator is redisplayed at the center of the display 450). For example, in FIG. 5OO, the object selection indicator (e.g., 5010 in FIG. 5OO) is redisplayed in the center of the display 450. In some embodiments, the instructions for redisplaying the object selection indicator include instructions for redisplaying (926) the object selection indicator at a location on the display 450 that corresponds to a location of the object selection indicator immediately before it ceased to be displayed (e.g., the object selection indicator is redisplayed at the last-known-location on the display 450). For example, in FIG. 5QQ, the object selection indicator (e.g., 5010 in FIG. 5QQ) is redisplayed at the same location that the object selection indicator was displayed immediately before it previously ceased to be displayed (e.g., the location of the object selection indicator 5010 in FIG. 5KK).

The computing device sends (928) instructions to the display 450 to move the object selection indicator in accordance with the first gesture. It should be understood that operations that are performed in accordance with the first gesture are made in accordance with an input that corresponds to the first gesture (e.g., the first gesture is detected at a touch-sensitive surface 452 that is distinct from the computing device and the touch-sensitive surface 452 sends the input to the computing device). For example, in FIG. 5LL the touch-sensitive surface 452 detects a swipe gesture including contact 5076 that meets the object selection indicator movement criteria and sends an input that corresponds to the detected swipe gesture that includes contact 5076 to the computing device. Continuing this example, in FIG. 5OO, the computing device sends instructions to the display 450 to move the redisplayed object selection indicator (e.g., 5010 in FIG. 5OO) in accordance with a trajectory (e.g., 5078 in FIG. 5OO) that is determined based on the first input (e.g., the swipe gesture including contact 5076 in FIG. 5LL).

In some embodiments, sending instructions to the display 450 for moving the object selection indicator in accordance with the first gesture includes sending (930) instructions to the display 450 for moving the object selection indicator without translating the user interface (e.g., without any lateral translation of the user interface). For example, in FIG. 5OO the object selection indicator (e.g., 5010 in FIG. 5OO) is redisplayed in a center of the display and moves along a trajectory 5078, towards a selectable object (e.g., "Top Story 1" hyperlink selectable object 5006-11 in FIG. 5OO). Continuing this example, the selectable object (e.g., 5006-11 in FIG. 5OO) is identified as a target selectable object and the object selection indicator is resized (e.g., to a size of the object selection indicator 5010 in FIG. 5PP) and moved to a location (e.g., a location of the object selection indicator 5010 in FIG. 5PP) that is proximate to the selectable object (e.g., "Top Story 1" hyperlink selectable object indicator in FIG. 5PP) without scrolling the user interface.

In some embodiments, sending instructions to the display 450 for moving the object selection indicator in accordance with the first gesture includes sending (932) instructions to the display 450 for moving the object selection indicator to an updated location within the user interface. When the updated location corresponds to a portion of the user interface that is outside of a predefined region (e.g., region 5038 in FIG. 5QQ) of the display 450, the computing device sends (934) instructions to the display 450 for translating the user interface (e.g., lateral translation of the user interface by one dimensional scrolling or two dimensional scrolling) so as to display the updated location of the object selection indicator within the predefined region of the display 450 (e.g., as described in greater detail above with reference to method 800). For example in FIG. 5QQ the computing device sends instructions to the display 450 to move the object selection indicator (e.g., 5010 in FIG. 5QQ) to an updated location that is outside of the predefined region (e.g., 5038 in FIG. 5QQ). In the example illustrated in FIG. 5QQ-5SS the updated location is a location proximate to the "image 5" selectable object 5006-18 in FIGS. 5RR-5SS, which is not displayed on the display 450 in FIG. 5QQ and thus is outside of the predefined region 5038 in FIG. 5QQ. Thus, the computing device sends instructions to the display 450 to scroll the user interface so as to display the updated location of the object selection indicator (e.g., 5010 in FIG. 5SS) within the predefined region (e.g., 5038 in FIG. 5SS). In some embodiments, the computing device sends instructions to the display to display 450 an animation of the object selection indicator resizing and moving across the display (e.g., from object selection indicator 5010 in FIG. 5QQ to object selection indicator 5010 in FIG. 5RR to object selection indicator 5010 in FIG. 5SS) while the user interface is being scrolled on the display. Additionally, as described in greater detail above, in some embodiments the predefined region of the display is only a subset of the display, while in other embodiments the predefined region of the display includes the entire display.

In some embodiments, sending instructions to the display 450 for moving the object selection indicator in accordance with the first gesture includes: determining (938) a direction of movement of the object selection indicator based on a direction of the first gesture on the touch-sensitive surface 452; identifying (940) a target selectable object that is in the determined direction of movement; and sending (942) instructions to the display 450 for moving the object selection indicator to a location that is proximate to or at a location of the target selectable object (e.g., as described in greater detail above with reference to method 800). For example, in FIGS. 5QQ-5SS, the computing device determines a direction of movement of the object selection indicator (e.g., 5010 in FIGS. 5QQ-5SS) that is based on a direction of movement of the first gesture (e.g., the first gesture is a downward swipe gesture including contact 5076 in FIG. 5LL and the object selection indicator 5010 in FIGS. 5QQ-5RR is moved towards a bottom of the webpage) to a location that is proximate to a target selectable object (e.g., the "Image 5" selectable object 5006-18 in FIGS. 5RR-5SS), as illustrated in FIGS. 5RR-5SS.

In some embodiments, operations 946-948 are performed (944) after sending instructions to the display 450 for moving the object selection indicator. In some of these embodiments, while the object selection indicator is at the target selectable object, the device receives (946) an activation input for the target selectable object (e.g., a single tap gesture, a double tap gesture, an "enter" command, etc. from the touch-sensitive surface 452 or other input device). It should be understood that the touch-sensitive surface 452 can be either integrated with the computing device or part of a separate device that is in communication with the computing device. In some of these embodiments, in response to receiving the activation input for the target selectable object, the computing device performs (948) an action associated with the target selectable object and sends instructions to the display 450 in accordance with the action (e.g., navigating to a user interface based on a hyperlink associated with the target selectable object, entering a text entry field, changing a state of a selection field such as a radio button, check box, etc.). For example, in FIG. 5SS, the computing device receives an input that corresponds to a tap gesture (e.g., 5082 in FIG. 5SS) on the touch-sensitive surface 452. In response to receiving the input, the computing device accesses an advertisement associated with the "Image 5" selectable object 5006-18 and sends instructions to the display 450 to display a user interface (e.g., a news story, an image viewing interface, a webpage, etc.) associated with the selectable object (not shown).

It should be understood that the discussion above with respect to FIGS. 5U-5W show, in response to a swipe gesture in FIG. 5T on the touch-sensitive surface 452, redisplaying the object selection indicator, moving the object selection indicator and scrolling the user interface as necessary to display the object selection indicator within the predefined region of the display 450. In contrast, the discussion above with respect to FIGS. 5MM-5NN shows, in response to a swipe gesture in FIG. 5LL detected on the touch-sensitive surface 452, scrolling the user interface on the display 450 in accordance with the swipe gesture without redisplaying the object selection indicator. In other words, if the object selection indicator is displayed (as shown in FIGS. 5T-5W), a swipe gesture on the touch-sensitive surface 452 while the object selection indicator is displayed causes the object selection indicator to move and the user interface is scrolled if necessary to display the object selection indicator on the display 450; in contrast, if the object selection indicator is not displayed (as shown in FIGS. 5LL-5NN, a swipe gesture on the touch-sensitive surface causes the user interface to be scrolled in accordance with the swipe gesture without redisplaying the object selection indicator. Additionally, it should also be understood that, in some embodiments, a respective gesture that includes movement below a predefined threshold (e.g., a gesture that corresponds to a movement of the object selection indicator within the predefined region of the display): when the respective gesture is detected while the object selection indicator is displayed the object selection indicator is moved without scrolling the user interface on the display; and when the respective gesture is detected while the object selection indicator is not displayed, user interface is scrolled in accordance with the respective gesture.

In some embodiments, sending instructions to the display 450 for navigating through the user interface in accordance with the first gesture without redisplaying the object selection indicator includes sending (950) instructions to the display 450 for scrolling the user interface in a first direction on the display 450; and sending instructions to the display 450 for navigating through the user interface so as to display the updated location of the object selection indicator within the predefined region of the display 450 includes sending instructions to the display 450 for scrolling the user interface in a second direction on the display 450, wherein the first direction is distinct from the second direction. In some embodiments, the first direction is opposite or substantially opposite from the second direction. For example, in FIGS. 5LL-5MM in response to detecting the input that corresponds to a gesture (e.g., swipe gesture including contact 5074 in FIG. 5LL) that meets the predefined navigation criteria, the user interface is scrolled downwards on the display 450 so as to show a top portion of the user interface on the display 450; in contrast, in FIGS. 5RR-5SS, in response to detecting the input that corresponds to a gesture (e.g., swipe gesture including contact 5076 in FIG. 5LL) that meets the object selection indicator movement criteria, the user interface is scrolled upwards on the display 450 so as to show a bottom portion of the user interface on the display 450. In other words, in these embodiments, the direction of scrolling the user interface is dependant on both the direction of the swipe gesture and whether the swipe gesture meets predefined navigation criteria or object selection indicator movement criteria.

In contrast, in other embodiments, sending instructions to the display 450 for navigating through the user interface in accordance with the first gesture without redisplaying the object selection indicator includes sending (952) instructions to the display 450 for scrolling the user interface in a first direction on the display 450; and sending instructions to the display 450 for navigating through the user interface so as to display the updated location of the object selection indicator within the predefined region 5038 of the display 450 includes sending instructions to the display 450 for scrolling the user interface in the first direction on the display 450. For example, in FIGS. 5LL and 5NN, in response to detecting the input that corresponds to a gesture (e.g., swipe gesture including contact 5074 in FIG. 5LL) that meets the predefined navigation criteria, the user interface is scrolled downward so as to show a bottom portion of the user interface on the display 450. Similarly, in FIGS. 5RR-5SS, in response to detecting the input that corresponds to a gesture (e.g., swipe gesture including contact 5076 in FIG. 5LL) that meets the object selection indicator movement criteria the user interface is also scrolled upwards on the display so as to show a bottom portion of the user interface on the display 450. In other words, in these embodiments, the direction of scrolling the user interface is dependant on the direction of the swipe gesture.

Note that details of other processes described herein with respect to methods 600, 700, 800 (e.g., FIGS. 6A-6C, 7A-7C, 8A-8E and 5A-5SS) are also applicable in an analogous manner to the method 900 described above. For example, the selectable objects 5006 (e.g., hyperlinks, advertisements, images, videos) and object selection indicator 5010 described with reference to FIGS. 9A-9D may have one or more of the characteristics of the various selectable objects 5006 and object selection indicator 5010 described herein with reference to any of methods 600, 700 and/or 800. For brevity, these details are not repeated here.

The operations in the information processing methods described above may be implemented by running one or more functional modules in information processing apparatus such as general purpose processors or application specific chips. These modules, combinations of these modules, and/or their combination with hardware (e.g., as described above with respect to FIGS. 1A, 1B and 3) are all included within the scope of protection of the invention.

The operations described above with reference to FIGS. 6A-6C, 7A-7C, 8A-8E and 9A-9D may be implemented by one or more of the components depicted in FIGS. 1A-1C, 3 and 4E. For example, receiving operation 604, sending operation 606, and sending operation 630 may be implemented by user interface navigation logic 480 (e.g., event sorter 170, event recognizer 180, and/or event handler 190). In some embodiments, a touch-sensitive surface is part of a device that includes an event monitor 171 in event sorter 170 that detects a contact on touch-sensitive surface 452, and event dispatcher module 174 delivers the event information to application 136-1 on the computing device that includes the user interface navigation logic 480. In some embodiments, a respective event recognizer 180 of application 136-1 on the computing device compares the event information to respective event definitions 186, and determines whether a first contact at a first location on the touch-sensitive surface corresponds to a predefined event or sub-event, such movement of an object selection indicator 5010 within the user interface. When a respective predefined event or sub-event is detected, event recognizer 180 activates an event handler 190 associated with the detection of the event or sub-event. Event handler 190 may utilize or call data updater 176, object updater 177 or GUI updater 178 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1C.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computing device that is in communication with a display and a touch-sensitive surface, comprising:
    one or more processors;
    memory; and
    one or more programs, wherein the one or more programs are stored in the memory and configured to be executed by the one or more processors, the one or more programs including instructions for:
        sending instructions to the display for displaying at least a portion of a user interface, the user interface having one or more selectable objects;
        receiving an input that corresponds to a first gesture detected on the touch-sensitive surface, wherein the first gesture includes lateral movement of a respective contact on the touch-sensitive surface and liftoff of the respective contact from the touch-sensitive surface;
        sending instructions to the display for displaying an object selection indicator; and
        in response to receiving at least a portion of the input that corresponds to the first gesture:
            moving the object selection indicator in accordance with the first gesture while the respective contact is detected on the touch-sensitive surface;
            after detecting liftoff of the respective contact from the touch-sensitive surface,
            determining a termination point of movement of the object selection indicator based on the first gesture;
            searching for a target selectable object; and
            sending instructions to the display for moving the object selection indicator, wherein:
                when a target selectable object is identified, moving the object selection indicator includes continuing to move the object selection indicator towards the target selectable object after detecting liftoff of the respective contact from the touch-sensitive surface, wherein the target selectable object is at a location that is different than a location of the termination point; and
                when a target selectable object is not identified, moving the object selection indicator includes continuing to move the object selection indicator towards the termination point after detecting liftoff of the respective contact from the touch-sensitive surface.

2. The device of claim 1, wherein searching for the target selectable object includes searching for the target selectable object in accordance with the first gesture.

3. The device of claim 1, wherein sending instructions to the display for moving the object selection indicator towards the termination point includes:
    calculating a trajectory of the object selection indicator based on the first gesture, wherein the termination point corresponds to an end of the trajectory; and
    sending instructions to the display for moving the object selection indicator to the termination point.

4. The device of claim 1, wherein searching for the target selectable object includes:
    calculating a trajectory of the object selection indicator based on the first gesture, wherein the termination point corresponds to an end of the trajectory;
    searching for one or more candidate selectable objects that meet predefined candidate criteria; and
    when one or more candidate selectable objects are found, identifying a respective candidate selectable object as the target selectable object.

5. The device of claim 4, wherein the respective candidate selectable object is identified as the target selectable object based on proximity of the respective candidate selectable object to the termination point.

6. The device of claim 4, wherein, when no candidate selectable objects are found, sending instructions to the display for moving the object selection indicator in accordance with the first gesture includes sending instructions to the display for moving the object selection indicator to the termination point.

7. The device of claim 4, wherein the trajectory is calculated based on simulated physical properties of the object selection indicator.

8. The device of claim 4, wherein the candidate criteria are met for a respective selectable object if the respective selectable object is within a predefined distance of the termination point.

9. The device of claim 4, wherein identifying one of the candidate selectable objects as the target selectable object includes selecting a respective candidate selectable object that is closest to the termination point as the target selectable object.

10. A method comprising:
    at a computing device with one or more processors and memory, wherein the device is in communication with a display and a touch-sensitive surface:
        sending instructions to the display for displaying at least a portion of a user interface, the user interface having one or more selectable objects;
        receiving an input that corresponds to a first gesture detected on the touch-sensitive surface, wherein the first gesture includes lateral movement of a respective contact on the touch-sensitive surface and liftoff of the respective contact from the touch-sensitive surface;
        sending instructions to the display for displaying an object selection indicator; and
        in response to receiving at least a portion of the input that corresponds to the first gesture:
            moving the object selection indicator in accordance with the first gesture while the respective contact is detected on the touch-sensitive surface;

after detecting liftoff of the respective contact from the touch-sensitive surface,
determining a termination point of movement of the object selection indicator based on the first gesture;
searching for a target selectable object; and
sending instructions to the display for moving the object selection indicator, wherein:
when a target selectable object is identified, moving the object selection indicator includes continuing to move the object selection indicator towards the target selectable object after detecting liftoff of the respective contact from the touch-sensitive surface, wherein the target selectable object is at a location that is different than a location of the termination point; and
when a target selectable object is not identified, moving the object selection indicator includes continuing to move the object selection indicator towards the termination point after detecting liftoff of the respective contact from the touch-sensitive surface.

11. The method of claim 10, wherein searching for the target selectable object includes:
calculating a trajectory of the object selection indicator based on the first gesture, wherein the termination point corresponds to an end of the trajectory;
searching for one or more candidate selectable objects that meet predefined candidate criteria; and
when one or more candidate selectable objects are found, identifying a respective candidate selectable object as the target selectable object.

12. The method of claim 11, wherein the respective candidate selectable object is identified as the target selectable object based on proximity of the respective candidate selectable object to the termination point.

13. The method of claim 11, wherein, when no candidate selectable objects are found, sending instructions to the display for moving the object selection indicator in accordance with the first gesture includes sending instructions to the display for moving the object selection indicator to the termination point.

14. The method of claim 11, wherein the trajectory is calculated based on simulated physical properties of the object selection indicator.

15. A non-transitory computer readable storage medium storing one or more programs, the one or more programs comprising instructions, which when executed by a computing device that is in communication with a display and a touch-sensitive surface, cause the device to:
send instructions to the display for displaying at least a portion of a user interface, the user interface having one or more selectable objects, wherein the first gesture includes lateral movement of a respective contact on the touch-sensitive surface and liftoff of the respective contact from the touch-sensitive surface;
receive an input that corresponds to a first gesture detected on the touch-sensitive surface;
send instructions to the display for displaying an object selection indicator; and
in response to receiving at least a portion of the input that corresponds to the first gesture:
move the object selection indicator in accordance with the first gesture while the respective contact is detected on the touch-sensitive surface;
after detecting liftoff of the respective contact from the touch-sensitive surface,
determine a termination point of movement of the object selection indicator based on the first gesture;
search for a target selectable object; and
send instructions to the display for moving the object selection indicator, wherein:
when a target selectable object is identified, moving the object selection indicator includes continuing to move the object selection indicator towards the target selectable object after detecting liftoff of the respective contact from the touch-sensitive surface, wherein the target selectable object is at a location that is different than a location of the termination point; and
when a target selectable object is not identified, moving the object selection indicator includes continuing to move the object selection indicator towards the termination point after detecting liftoff of the respective contact from the touch-sensitive surface.

16. The computer readable storage medium of claim 15, wherein searching for the target selectable object includes:
calculating a trajectory of the object selection indicator based on the first gesture, wherein the termination point corresponds to an end of the trajectory;
searching for one or more candidate selectable objects that meet predefined candidate criteria; and
when one or more candidate selectable objects are found, identifying a respective candidate selectable object as the target selectable object.

17. The computer readable storage medium of claim 16, wherein the respective candidate selectable object is identified as the target selectable object based on proximity of the respective candidate selectable object to the termination point.

18. The computer readable storage medium of claim 16, wherein, when no candidate selectable objects are found, sending instructions to the display for moving the object selection indicator in accordance with the first gesture includes sending instructions to the display for moving the object selection indicator to the termination point.

19. The computer readable storage medium of claim 16, wherein the trajectory is calculated based on simulated physical properties of the object selection indicator.

* * * * *